United States Patent
Zhou et al.

(10) Patent No.: US 12,556,314 B2
(45) Date of Patent: *Feb. 17, 2026

(54) UPLINK SIGNAL CONTROL

(71) Applicant: Comcast Cable Communications, LLC, Philadelphia, PA (US)

(72) Inventors: Hua Zhou, Vienna, VA (US); Esmael Hejazi Dinan, McLean, VA (US); Alireza Babaei, Fairfax, VA (US); Ali Cagatay Cirik, Chantilly, VA (US); Hyoungsuk Jeon, Centreville, VA (US); Kyungmin Park, Vienna, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,397

(22) Filed: Aug. 1, 2023

(65) Prior Publication Data

US 2024/0014946 A1  Jan. 11, 2024

Related U.S. Application Data

(63) Continuation of application No. 17/689,024, filed on Mar. 8, 2022, now Pat. No. 11,777,664, which is a
(Continued)

(51) Int. Cl.
*H04L 1/18* (2023.01)
*H04L 1/1812* (2023.01)
(Continued)

(52) U.S. Cl.
CPC .......... *H04L 1/1819* (2013.01); *H04L 5/0092* (2013.01); *H04W 72/23* (2023.01);
(Continued)

(58) Field of Classification Search
CPC ... H04W 72/042; H04W 72/14; H04W 76/28; H04W 76/11; H04W 80/02; H04L 5/0092
See application file for complete search history.

(56) References Cited

U.S. PATENT DOCUMENTS

| | | |
|---|---|---|
| 10,785,791 B1 | 9/2020 | Eyuboglu |
| 2018/0176903 A1 | 6/2018 | Lee et al. |

(Continued)

FOREIGN PATENT DOCUMENTS

| | | | |
|---|---|---|---|
| WO | 2018175420 A1 | 9/2018 | |
| WO | WO-2022083625 A1 * | 4/2022 | ........... H04L 1/1822 |

OTHER PUBLICATIONS

R2-164253 3GPP TSG RAN WG2 Meeting #94, Nanjing, China, May 23-27, 2016, Source: Huawei, HiSilicon, Title: The UE handling on the dropped UL HARQ transmission.
(Continued)

*Primary Examiner* — Shukri Taha
(74) *Attorney, Agent, or Firm* — Banner & Witcoff, Ltd.

(57) ABSTRACT

A base station may cancel or delay (e.g., pre-empt) a transmission from a wireless device by sending a pre-emption indication to the wireless device. Based on receiving the pre-emption indication, the wireless device may cancel the transmission, store an indication associated with the cancelled transmission, and/or store the cancelled transmission in a data buffer. The base station may request transmission of the data unit (e.g., at a later time) by transmitting another indication.

49 Claims, 39 Drawing Sheets

Related U.S. Application Data continuation of application No. 16/785,100, filed on Feb. 7, 2020, now Pat. No. 11,336,400.

(60) Provisional application No. 62/802,450, filed on Feb. 7, 2019.

(51) Int. Cl.
   *H04L 5/00*     (2006.01)
   *H04W 72/23*    (2023.01)
   *H04W 76/11*    (2018.01)
   *H04W 76/28*    (2018.01)
   *H04W 80/02*    (2009.01)

(52) U.S. Cl.
   CPC ............ *H04W 76/11* (2018.02); *H04W 76/28* (2018.02); *H04W 80/02* (2013.01)

(56) References Cited

U.S. PATENT DOCUMENTS

| | | | |
|---|---|---|---|
| 2018/0278368 A1 | 9/2018 | Kim et al. | |
| 2018/0324816 A1 | 11/2018 | Islam et al. | |
| 2019/0098612 A1 | 3/2019 | Babaei et al. | |
| 2019/0254067 A1* | 8/2019 | Al-Imari | H04W 72/1268 |
| 2019/0268930 A1 | 8/2019 | Rudolf et al. | |
| 2020/0154411 A1* | 5/2020 | Liu | H04L 1/1864 |
| 2021/0168783 A1* | 6/2021 | Islam | H04L 5/0053 |

OTHER PUBLICATIONS

Jun. 8, 2020—European Extended Search Report—EP 20156189.1.
R1-1707664 3GPP TSG RAN WG1 Meeting #89, Hangzhou, P.R. China, May 15-19, 2017, Source: LG Electronics, Title: Discussion on pre-emption indication design.
R1-1718218 3GPP TSG RAN WG1 Meeting 90bis; Prague, CZ Oct. 9-13, 2017—NTT DOCOMO, Inc "Signalling design for CBG-based (re)transmission".
Feb. 16, 2022—European Office Action—EP 20156189.1.
R1-1804450 3GPP TSG RAN WG1 Meeting #92bis, Sanya, China 16th-20th, 2018, Source: Institute for Information Industry (III), Title: Uplink Pre-emption for URLLC Reliability.
R1-1808213 3GPP TSG RAN WG1 Meeting #94, Gothenburg, Sweden, Aug. 20-24, 2018, Source: ZTE, Title: Enhanced UL grant-free transmissions.
R1-1808250 3GPP TSG RAN WG1 Meeting #94, Gothenburg, Sweden, Aug. 20-24, 2018, Source: vivo, Title: Enhanced UL grant-free transmission for URLLC.
R1-1808412 3GPP TSG RAN WG1 Meeting #94, Gothenburg, Sweden, Aug. 20-24, 2018, Source: CATT, Title: On enhancements UL grant operation.
R1-1808570 3GPP TSG RAN WG1 Meeting #94, Gothenburg, Sweden, Aug. 20-24, 2018, Source: Nokia, Nokia Shanghai Bell, Title: On Configured Grant enhancements for NR URLLC.
R1-1812161 3GPP TSG RAN WG1 Meeting #95, Spokane, USA, Nov. 12-16, 2018, Source: Ericsson, Title: Inter-UE Prioritization and Multiplexing of UL Transmission.
R1-1812318 3GPP TSG RAN WG1 Meeting #95, Spokane, USA, Nov. 12-16, 2018, Source: vivo, Title: UL inter-UE Tx prioritization for URLLC.
R1-1812389 3GPP TSG RAN WG1 Meeting #95, Spokane, USA, Nov. 12-16, 2018, Source: ZTE, Title: On UL inter UE Tx prioritization/multiplexing.
R1-1812415 3GPP TSG RAN WG1 Meeting #95, Spokane, USA, Nov. 12-16, 2018, Source; Fujitsu, Title: Discussion on uplink preemption indication.
R1-1812577 3GPP TSG RAN WG1 Meeting #95, Spokane, USA, Nov. 12-16, 2018, Source: LG Electronics, Title: Discussion on UL inter UE Tx prioritization.
R1-1812745 3GPP TSG RAN WG1 Meeting #95, Spokane, USA, Nov. 12-16, 2018, Source: Sony, Title: Inter-UE uplink multiplexing of URLLC & eMBB traffics.
R1-1812819 3GPP TSG RAN WG1 Meeting #95, Spokane, USA, Nov. 12-16, 2018, Source: OPPO, Title: Consideration on UL inter UE Tx prioritization and multiplexing.
R1-1812998 3GPP TSG RAN WG1 Meeting #95, Spokane, USA, Nov. 12-16, 2018, Source: Samsung, Title: Uplink inter UE multiplexing/prioritization for enhanced URLLC.
R1-1813098 3GPP TSG RAN WG1 Meeting #95, Spokane, USA, Nov. 12-16, 2018, Source: ETRI, Title: UL inter UE Tx prioritization/multiplexing.
R1-1813117 3GPP TSG RAN WG1 Meeting #95, Spokane, USA, Nov. 12-16, 2018, Source: Nokia, Nokia Shanghai Bell, Title: Solution for UL inter-UE multiplexing between eMBB and URLLC.
R1-1813328 3GPP TSG RAN WG1 Meeting #95, Spokane, USA, Nov. 12-16, 2018, Source: NTT DOCOMO, Inc., Title: UL inter UE transmission multiplexing.
R1-1813385 3GPP TSG RAN WG1 Meeting #95, Spokane, USA, Nov. 12-16, 2018, Source: Mitsubishi Electric, Title: Views on pre-emption for UL inter UE Tx multiplexing.
R1-1813437 3GPP TSG RAN WG1 Meeting #95, Spokane, USA, Nov. 12-16, 2018, Source: Qualcomm Incorporated, Title: UL inter UE Tx prioritization/multiplexing.
R1-1900048 3GPP TSG RAN WG1 Ad-Hoc Meeting 1901, Taipei, Taiwan, Jan. 21-25, 2019, Source: Huawei, HiSilicon, Title: UL inter-UE transmission prioritization and multiplexing.
R1-1900074 3GPP TSG RAN WG1 Ad-Hoc Meeting 1901, Taipei, Taiwan, Jan. 21-25, 2019, Source: ZTE, Title: UL inter-UE multiplexing between eMBB and URLLC.
R1-1900131 3GPP TSG RAN WG1 Ad-Hoc Meeting 1901, Taipei, Taiwan, Jan. 21-25, 2019, Source: vivo, Title: UL inter-UE Tx prioritization for URLLC.
R1-1900165 3GPP TSG RAN WG1 Ad-Hoc Meeting 1901, Taipei, Taiwan, Jan. 21-25, 2019, Source: Ericsson, Title: Inter-US Prioritization and Multiplexing of UL Transmission.
R1-1900212 3GPP TSG RAN WG1 Ad-Hoc Meeting 1901, Taipei, Taiwan, Jan. 21-25, 2019, Source: MediaTek Inc., Title: Inter-UE uplink Tx prioritization and multiplexing.
R1-1900256 3GPP TSG RAN WG1 Ad-Hoc Meeting 1901, Taipei, Taiwan, Jan. 21-25, 2019, Source: Fujitsu, Title: Discussion on uplink preemption indication.
R1-1900286 3GPP TSG RAN WG1 Ad-Hoc Meeting 1901, Taipei, Taiwan, Jan. 21-25, 2019, Source: OPPO, Title: Consideration on UL inter UE Tx prioritization and multiplexing.
R1-1900335 3GPP TSG RAN WG1 Ad-Hoc Meeting 1901, Taipei, Taiwan, Jan. 21-25, 2019, Source: CATT, Title: considerations on inter-UE UL multiplexing.
R1-1900351 3GPP TSG RAN WG1 Ad-Hoc Meeting 1901, Taipei, Taiwan, Jan. 21-25, 2019, Source: NEC, Title: UL inter-UE Tx prioritization and multiplexing.
R1-1900352 3GPP TSG RAN WG1 Ad-Hoc Meeting 1901, Taipei, Taiwan, Jan. 21-25, 2019, Source: TCL Communication, Title: Multiplexing eMBB over URLLC Resources.
R1-1900374 3GPP TSG RAN WG1 Ad-Hoc Meeting 1901, Taipei, Taiwan, Jan. 21-25, 2019, Source: Sony, Title: Considerations on inter-UE transmission multiplexing & prioritization.
R1-1900417 3GPP TSG RAN WG1 Ad-Hoc Meeting 1901, Taipei, Taiwan, Jan. 21-25, 2019, Source: CMCC, Title: Discussion on UL inter UE Tx prioritization/multiplexing.
R1-1900497 3GPP TSG RAN WG1 Ad-Hoc Meeting 1901, Taipei, Taiwan, Jan. 21-25, 2019, Source: Intel Corporation, Title: On enhancements on inter-UE UL Multiplexing.
R1-1900595 3GPP TSG RAN WG1 Ad-Hoc Meeting 1901, Taipei, Taiwan, Jan. 21-25, 2019, Source: LG Electronics, Title: Discussion on UL inter UE Tx prioritization.
R1-1900636 3GPP Tsg Ran WG1 Ad-Hoc Meeting 1901, Taipei, Taiwan, Jan. 21-25, 2019, Source: China Telecom, Title: Dynamic resource sharing for UL inter-UE multiplexing between eMBB and URLLC.
R1-1900639 3GPP TSG RAN WG1 Ad-Hoc Meeting 1901, Taipei, Taiwan, Jan. 21-25, 2019, Source: Mitsubishi Electric, Title: Views on pre-emption for UL inter/intra UE Tx multiplexing.

(56) References Cited

OTHER PUBLICATIONS

R1-1900676 3GPP TSG RAN WG1 Ad-Hoc Meeting 1901, Taipei, Taiwan, Jan. 21-25, 2019, Source: Panasonic, Title: On NR URLLC UL inter UE Tx prioritization/multiplexing.

R1-1900683 3GPP TSG RAN WG1 Ad-Hoc Meeting 1901, Taipei, Taiwan, Jan. 21-25, 2019, Source: Sequans, Title: Considerations on UL inter-UE multiplexing for URLLC.

R1-1900689 3GPP TSG RAN WG1 Ad-Hoc Meeting 1901, Taipei, Taiwan, Jan. 21-25, 2019, Source: ETRI, Title: UL inter Tx prioritization/multiplexing.

R1-1900710 3GPP TSG RAN WG1 Ad-Hoc Meeting 1901, Taipei, Taiwan, Jan. 21-25, 2019, Source: Spreadtrum Communications, Title: Discussion on UL inter UE Tx prioritization/multiplexing.

R1-1900806 3GPP TSG RAN WG1 Ad-Hoc Meeting 1901, Taipei, Taiwan, Jan. 21-25, 2019, Source: InterDigital Inc., Title: Potential enhancements for UL inter-UE multiplexing.

R1-1900815 3GPP TSG RAN WG1 Ad-Hoc Meeting 1901, Taipei, Taiwan, Jan. 21-25, 2019, Source: ASUSTek, Title: Discussion on power control mechanism for UL inter UE Tx multiplexing.

R1-1900900 3GPP TSG RAN WG1 Ad-Hoc Meeting 1901, Taipei, Taiwan, Jan. 21-25, 2019, Source: Qualcomm Incorporated, Title: UL Inter-UE Tx Multiplexing and Prioritization.

R1-1900931 3GPP TSG RAN WG1 Ad-Hoc Meeting 1901, Taipei, Taiwan, Jan. 21-25, 2019, Source: Nokia, Nokia Shanghai Bell, Title: Solution for UL inter-UE multiplexing between eMBB and URLLC.

R1-1900941 3GPP TSG RAN WG1 Ad-Hoc Meeting 1901, Taipei, Taiwan, Jan. 21-25, 2019, Source: Motorola Mobility, Lenovo, Title: UL inter UE Tx prioritization/multiplexing for URLLC operation.

R1-1900973 3GPP TSG RAN WG1 Ad-Hoc Meeting 1901, Taipei, Taiwan, Jan. 21-25, 2019, Source: NTT DOCOMO, Inc., Title: UL inter-UE transmission prioritization/multiplexing.

R1-1901012 3GPP TSG RAN WG1 Ad-Hoc Meeting 1901, Taipei, Taiwan, Jan. 21-25, 2019, Source: WILUS Inc., Title: On UL inter-UE multiplexing for eURLLC.

R1-1901070 3GPP TSG RAN WG1 Ad-Hoc Meeting 1901, Taipei, Taiwan, Jan. 21-25, 2019, Source: Samsung, Title: Uplink inter UE multiplexing/prioritization for enhanced URLLC.

R1-1901099 3GPP TSG RAN WG1 Ad-Hoc Meeting 1901, Taipei, Taiwan, Jan. 21-25, 2019, Source: Institute for Information Industry (III), Title: Discussion UL Inter UE Tx multiplexing.

R2-162430 3GPP TSG RAN WG1 Meeting #93bis, Dubrovnik, Croatia, Apr. 11-15, 2016, Source: Huawei, HiSilicon, Title: UL HARQ handling for LAA SCell.

R2-162744 3GPP TSG RAN WG2 Meeting #93bis, Dubrovnik, Croatia, Apr. 11-15, 2016, Source: Ericsson, Title: Dropping of initial UL HARQ transmission in LAA.

R2-164238 3GPP TSG RAN WG2 Meeting #94, Nanjing, China, May 23-27, 2016, Source: Qualcomm Incorporated, Title: Clarification of UL HARQ Handling.

\* cited by examiner

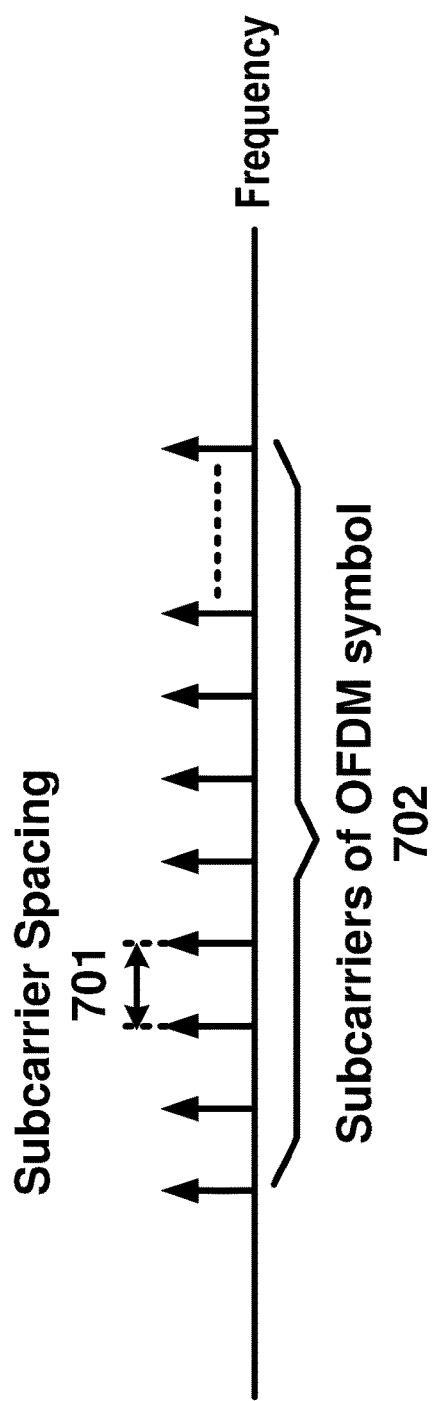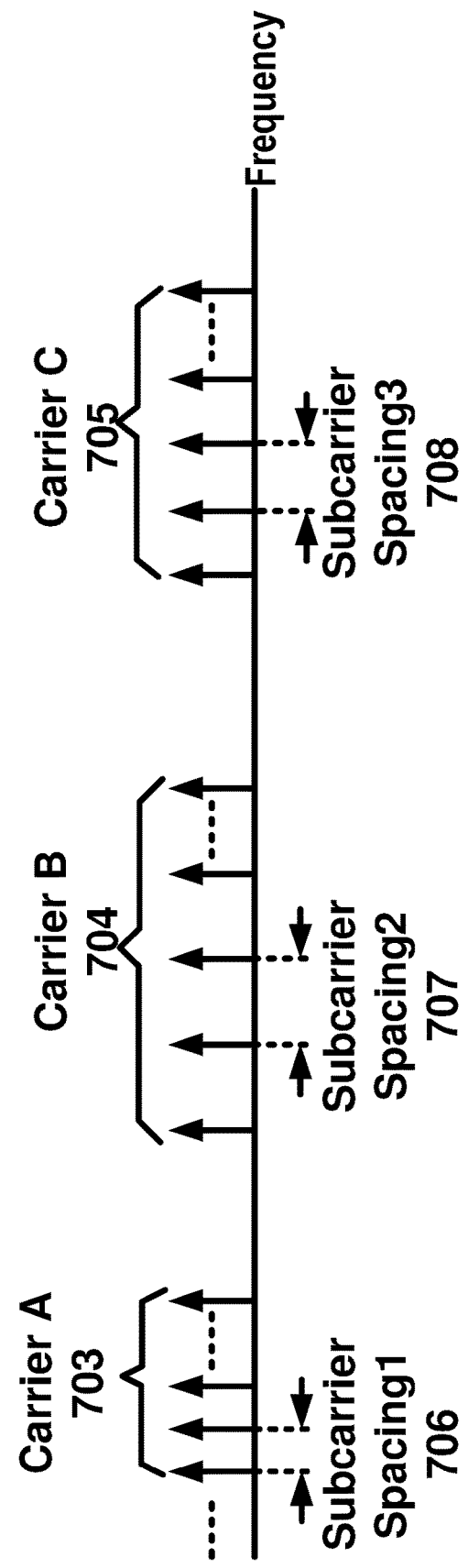
FIG. 7A
FIG. 7B

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

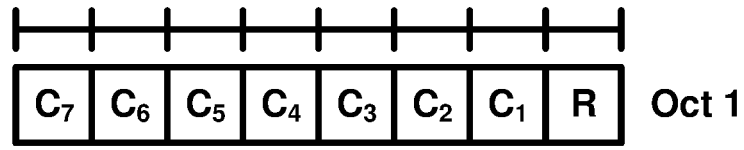
FIG. 21A
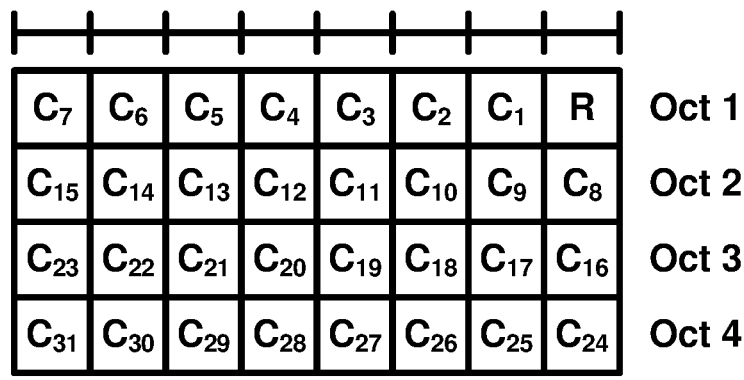
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
|  |  |  |  |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
|  |  |  |  |
| Special | 3, 3A | 45 | Power control commands |
|  | 5 |  | Sidelink operation |
|  | 6-2 |  | Paging/direct indication for eMTC devices |

FIG. 22

UPLINK SIGNAL CONTROL

CROSS-REFERENCE TO RELATED APPLICATIONS

This application is a continuation of and claims priority to U.S. patent application Ser. No. 17/689,024 filed on Mar. 8, 2022, which is a continuation of U.S. patent application Ser. No. 16/785,100 filed on Feb. 7, 2020 (now U.S. Pat. No. 11,336,400), which claims the benefit of U.S. Provisional Application No. 62/802,450 filed on Feb. 7, 2019, each of which is hereby incorporated by reference in its entirety.

BACKGROUND

A base station sends a message, indicating an uplink grant, to a wireless device. The wireless device uses an uplink grant to send a message to the base station.

SUMMARY

The following summary presents a simplified summary of certain features. The summary is not an extensive overview and is not intended to identify key or critical elements.

Systems, methods, and apparatuses for wireless communications are described. Transmissions from a wireless device may be cancelled/delayed to enable the wireless device to send another transmission (e.g., for more urgent communications, higher priority service, etc.). A base station may send an indication (e.g., a pre-emption indication) to the wireless device indicating that the wireless device is to pre-empt (e.g., cancel and/or delay) a transmission (e.g., a scheduled transmission based on an uplink grant). Cancelling the pre-empted transmission may result in misalignment between the wireless device and the base station, wherein the base station may not know whether the wireless device may operate as if the cancelled transmission has been sent to the base station, not sent to the base station, and/or sent/not sent based on one or more criteria. Based on receiving the pre-emption indication, the wireless device may reduce the likelihood of such misalignment, for example, by cancelling the pre-empted transmission, storing an indication associated with the pre-empted transmission, and/or storing information (e.g., data, message, scheduled transmission, etc.) associated with the pre-empted transmission. The examples described herein may result in advantages such as enabling higher uplink throughput, higher energy efficiency, and/or reduced transmission latency (e.g., for transmission of a pre-empted transmission at the later time).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 7A and FIG. 7B show example sets of orthogonal frequency division multiplexing (OFDM) subcarriers.

FIG. 18 shows example logical channel identifier (LCID) values.

FIG. 19 shows example LCID values.

FIG. 21A shows an example of an SCell hibernation MAC CE format.

FIG. 21B shows an example of an SCell hibernation MAC CE format.

FIG. 21C shows example MAC CEs for SCell state transitions.

FIG. 22 shows example downlink control information (DCI) formats.

DETAILED DESCRIPTION

Figure 1:
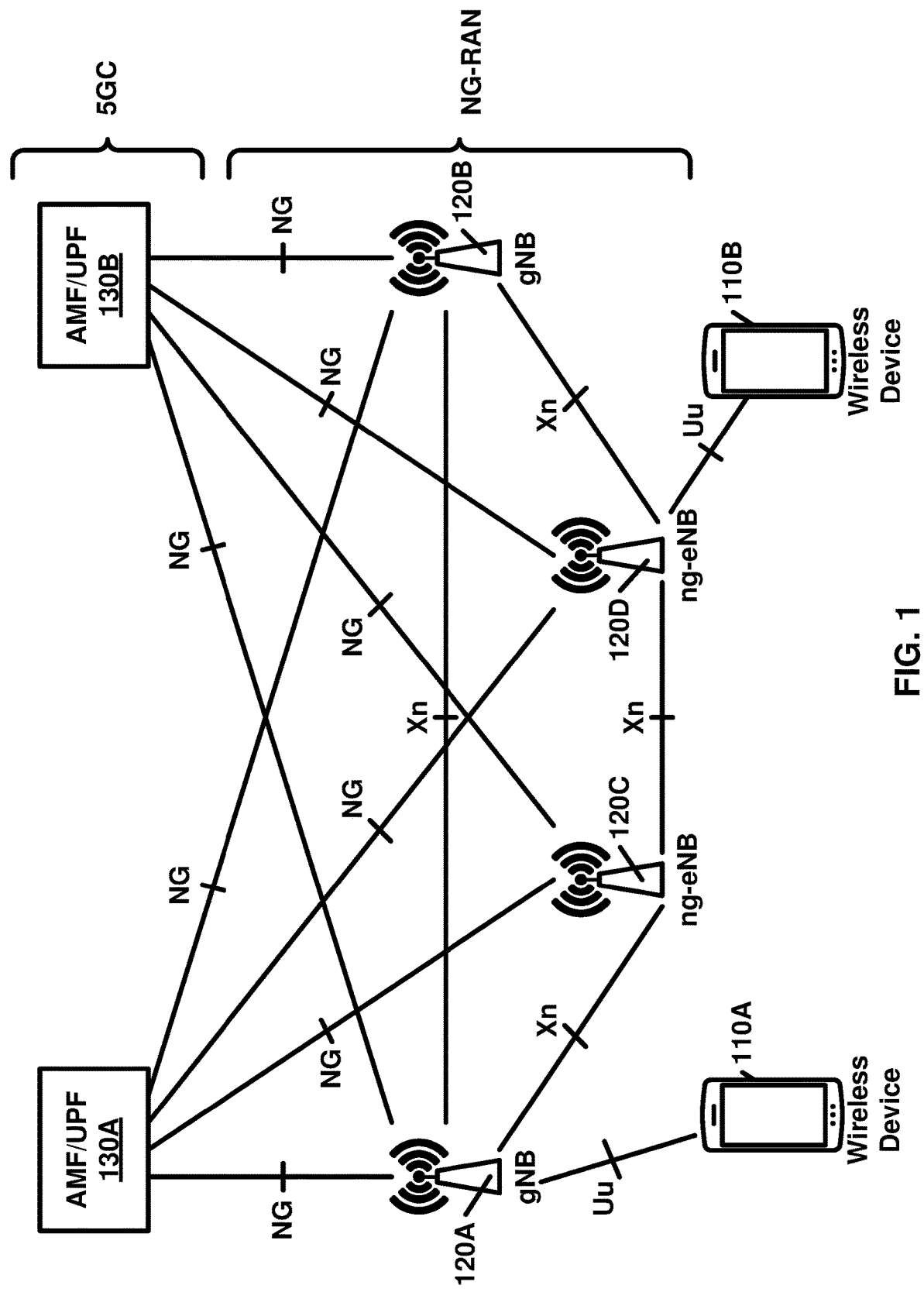
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to prioritization of transmissions in wireless communications.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CE Control Element
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRI CSI-RS resource indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LI Layer Indicator
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node j
NACK Negative Acknowledgement
NAS Non-Access Stratum
NDI New Data Indicator
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal RV Redundancy Version
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
URLLC Ultra-Reliable Low-Latency Communication
V2X Vehicle-to-everything
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
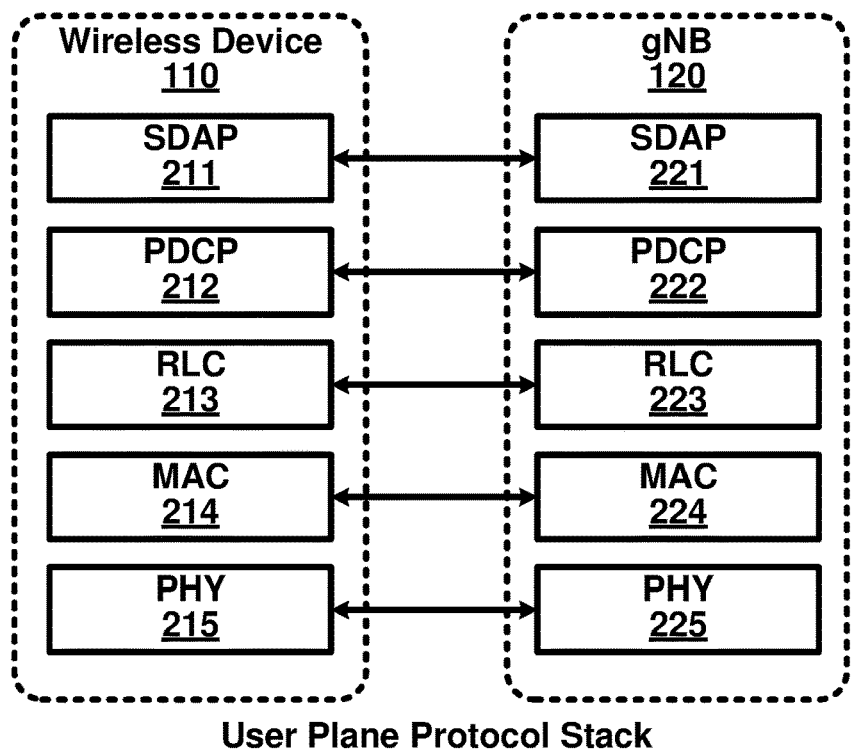
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
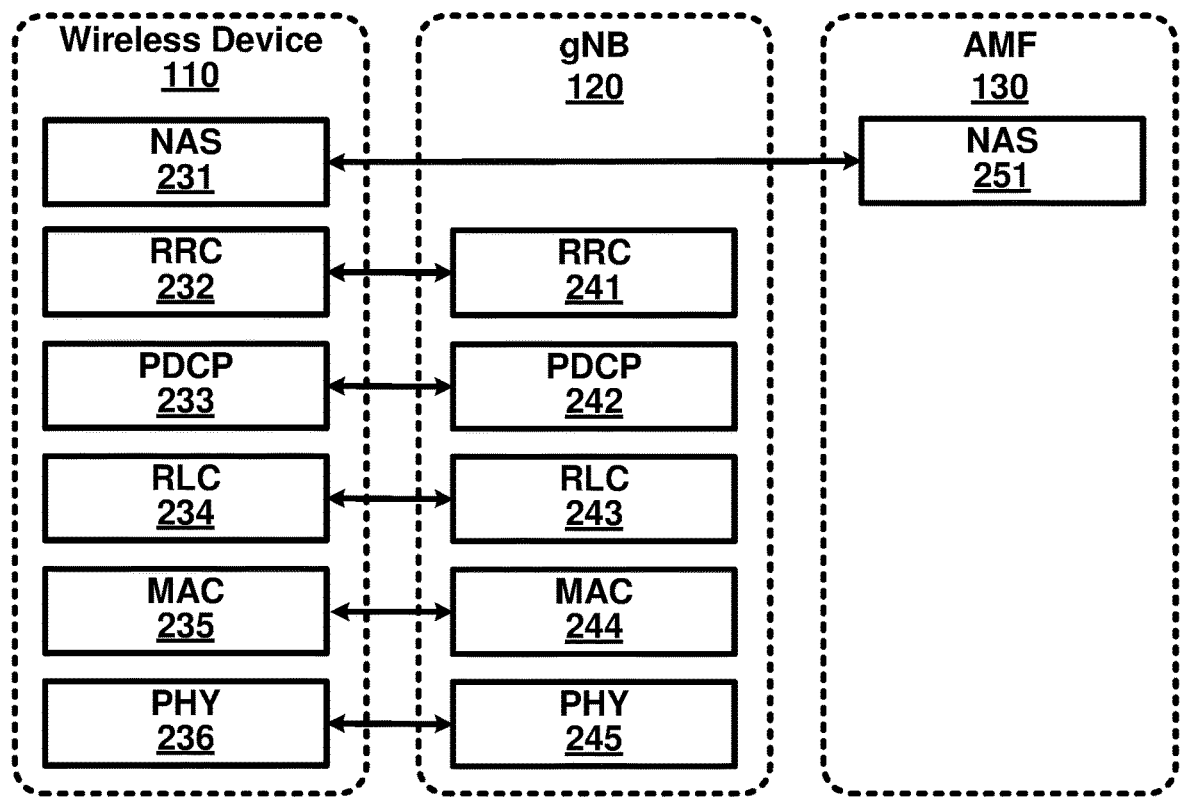
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRB s) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
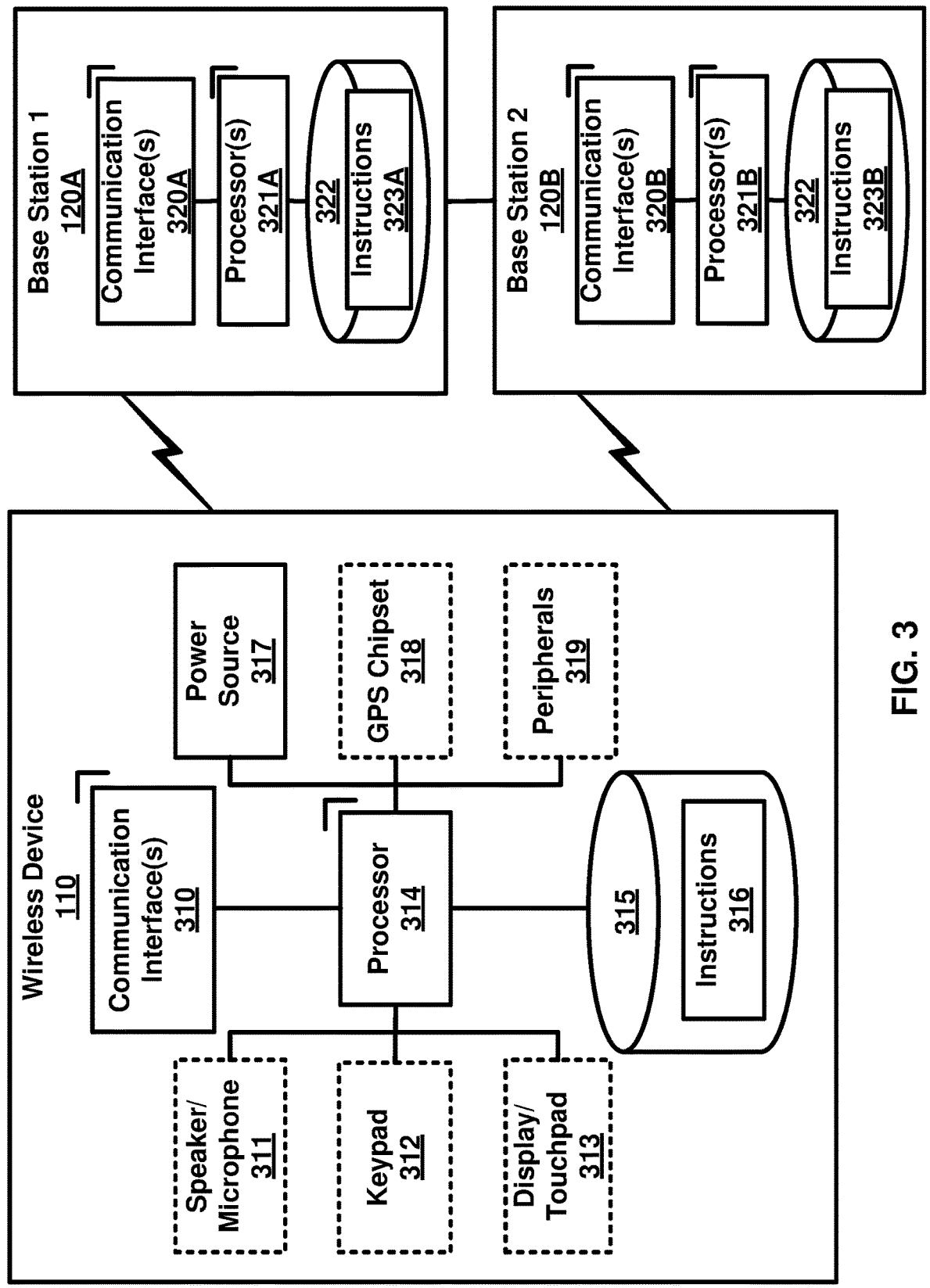
FIG. 3 shows an example wireless device and two base stations.

FIG. 3 shows an example of base stations (base station 1 120A, and base station 2 120B) and a wireless device 110. The wireless device 110 may comprise a UE or any other wireless device. The base station (e.g., 120A, 120B) may comprise a Node B, eNB, gNB, ng-eNB, one or more transmission and reception points, or any other base station. A wireless device and/or a base station may perform one or more functions of a relay node. The base station 1 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC- NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB 1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1 120A, and/or the communication interface 320B of the base station 2 120B, may be configured to communicate with the communication interface 310 of the wireless device 110, for example, via a wireless link 330A and/or via a wireless link 330B, respectively. The communication interface 320A of the base station 1 120A, may communicate with the communication interface 320B of the base station 2 120B and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1 120A, the base station 2 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 4A:
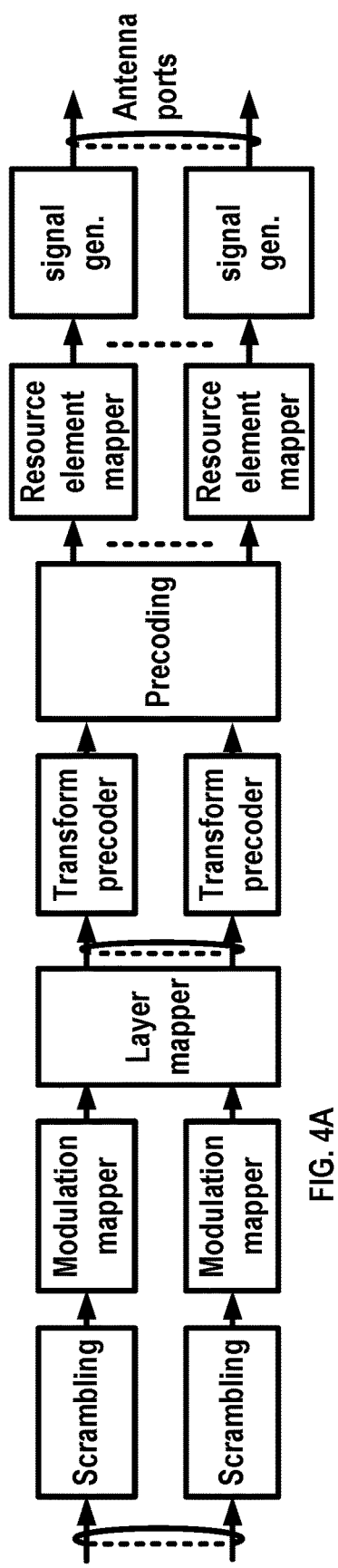
FIG. 4A, FIG. 4B, FIG. 4C, and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

Figure 4B:
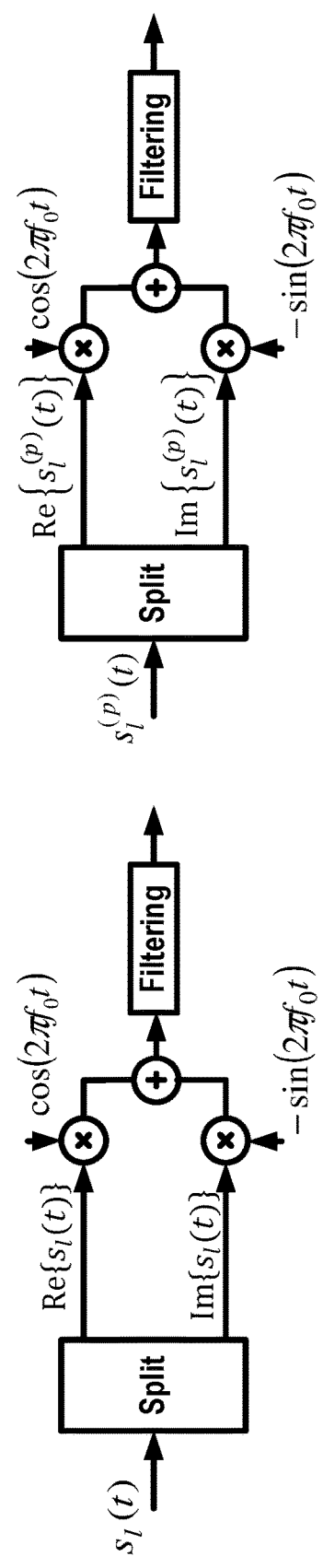

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

Figure 4D:
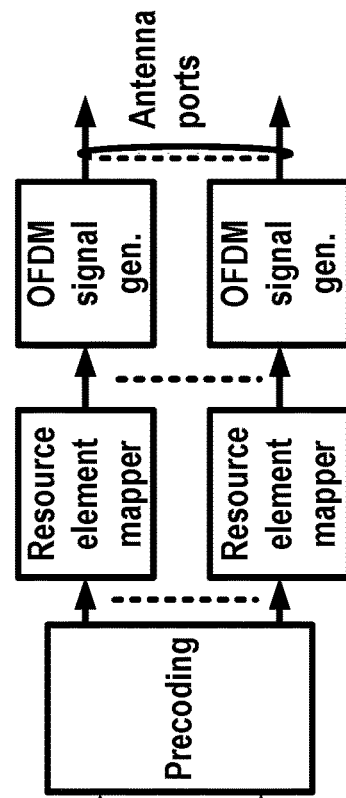
Figure 4C:
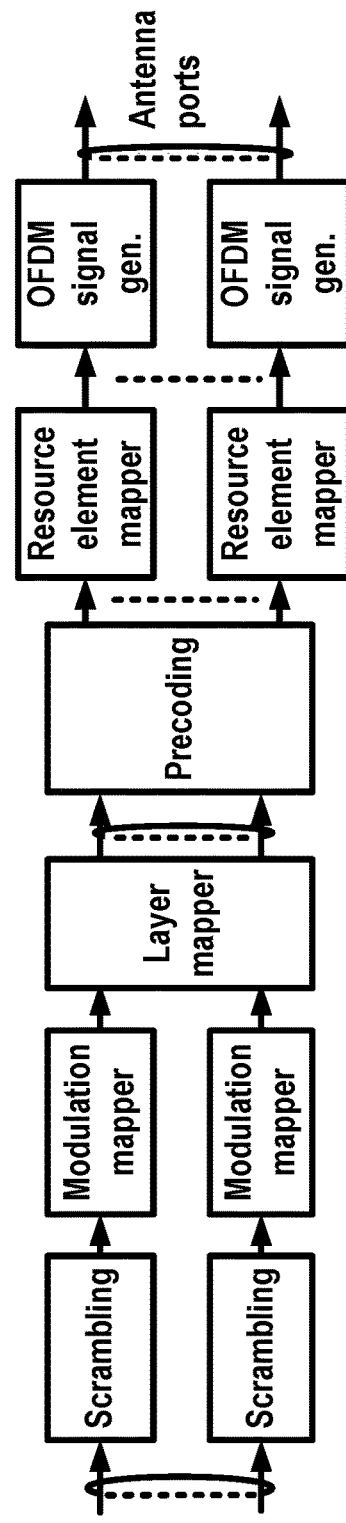

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
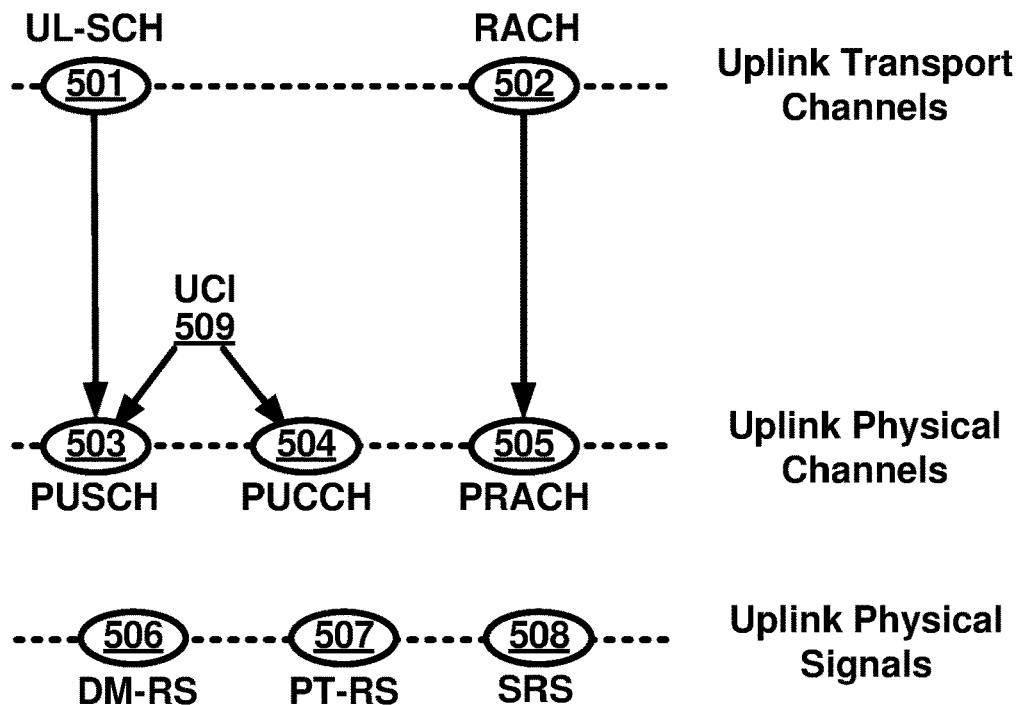
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
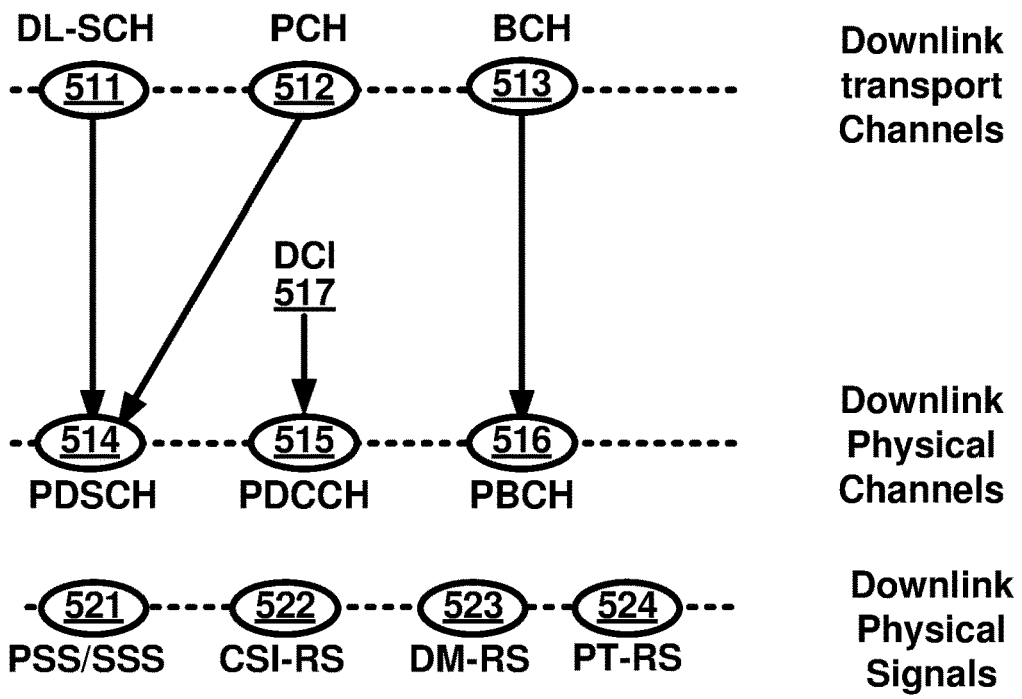
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
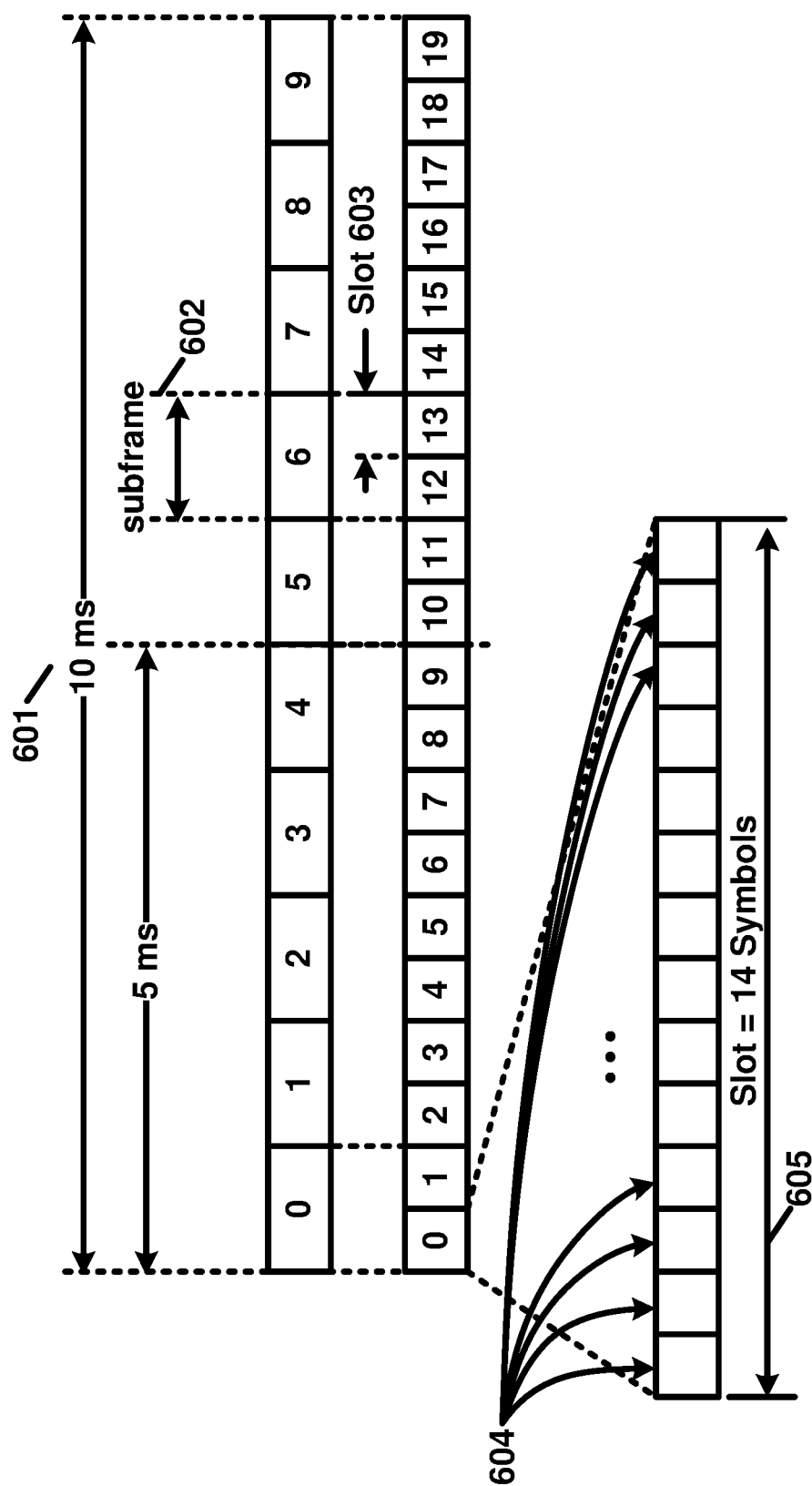
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
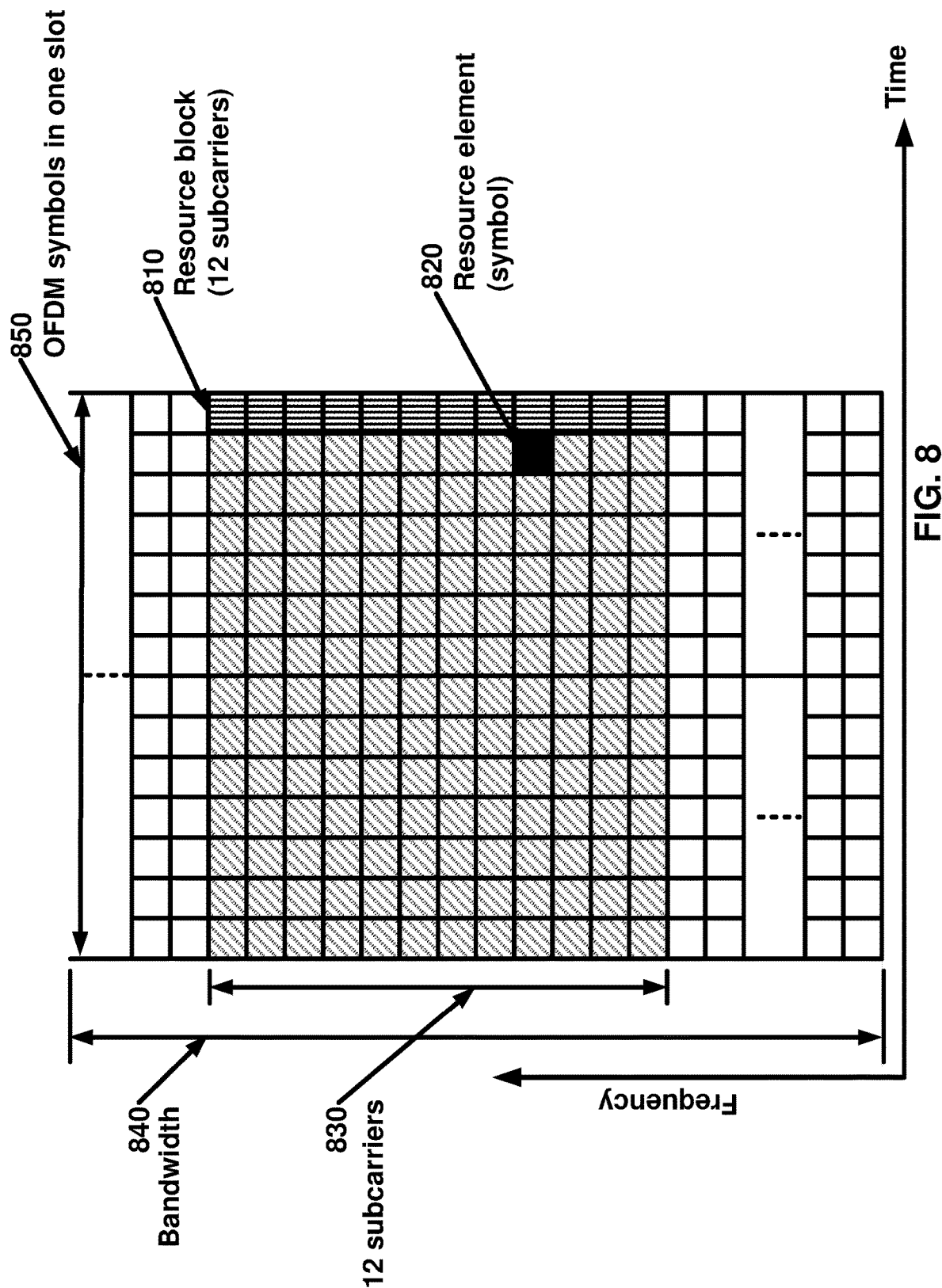
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a pre-emption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RS s of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
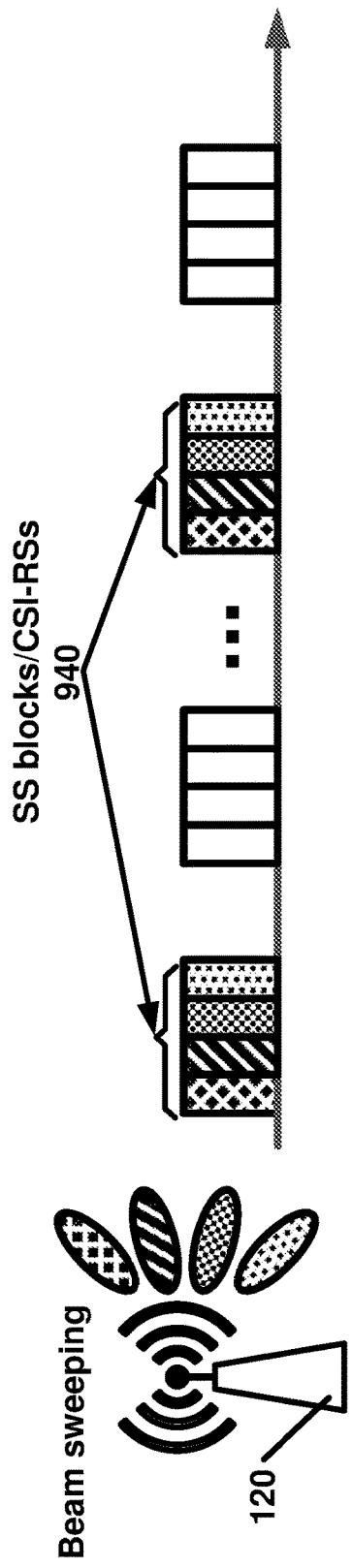
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
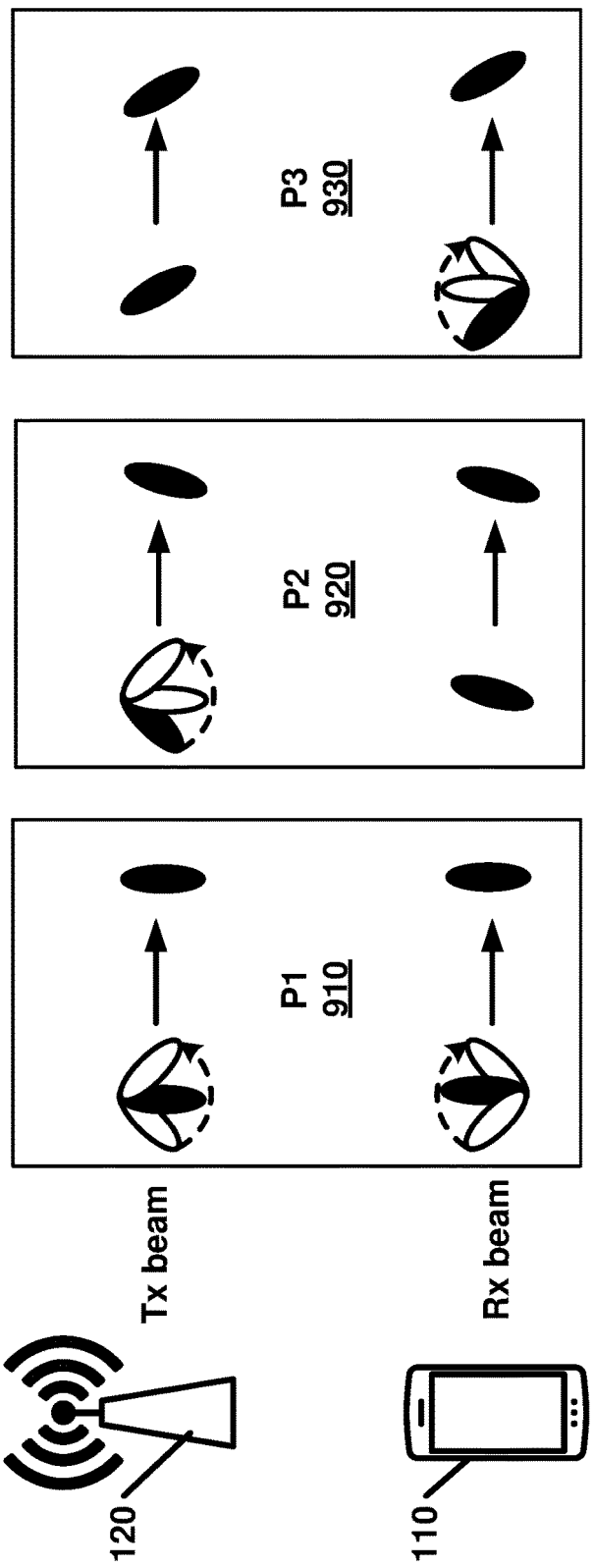
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
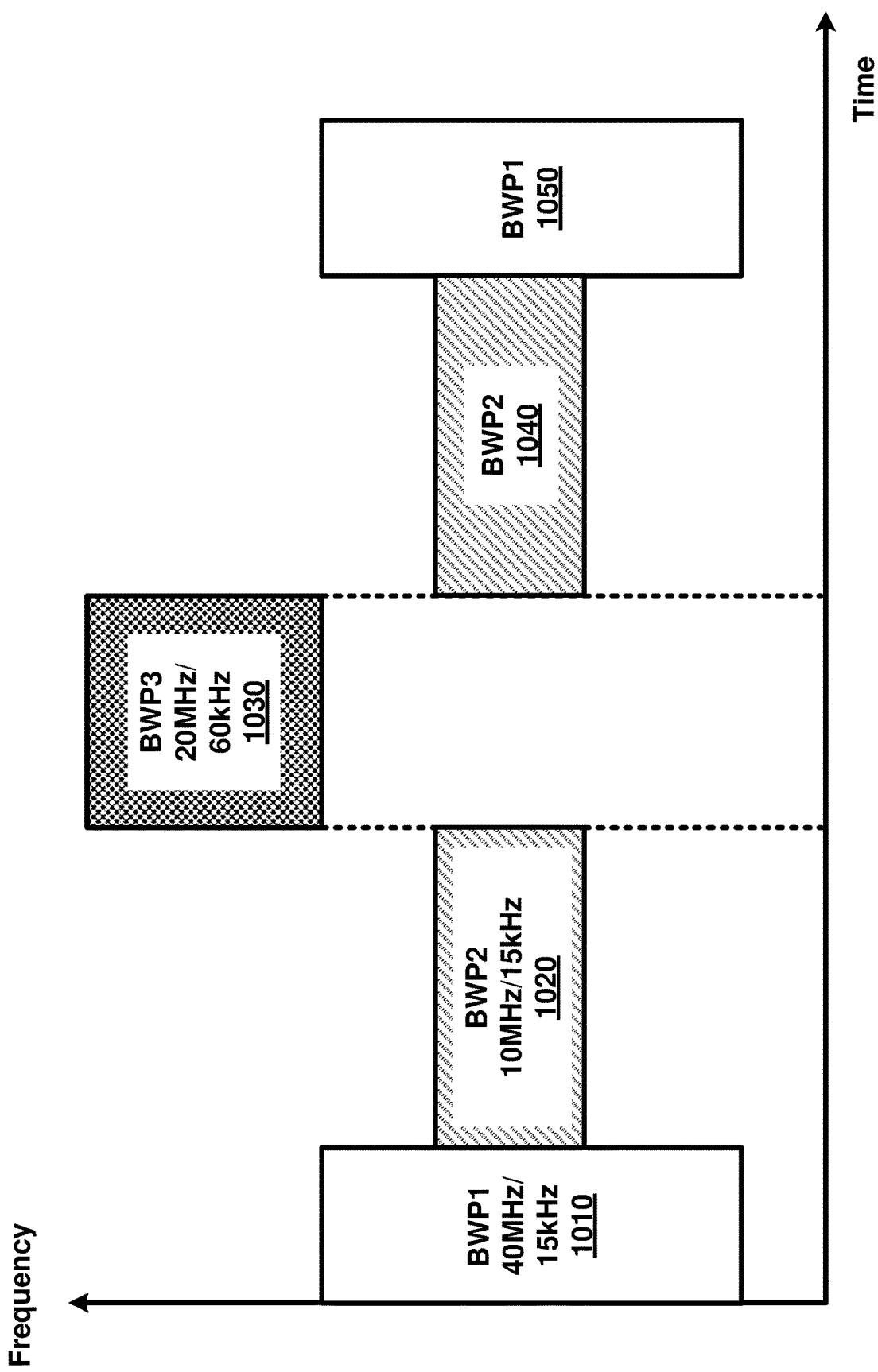
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may refrain from configuring a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided with a default DL BWP, a default BWP may be an initial active DL BWP. A default BWP may not be configured for one or more wireless devices. A first (or initial) BWP may serve as a default BWP, for example, if a default BWP is not configured.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
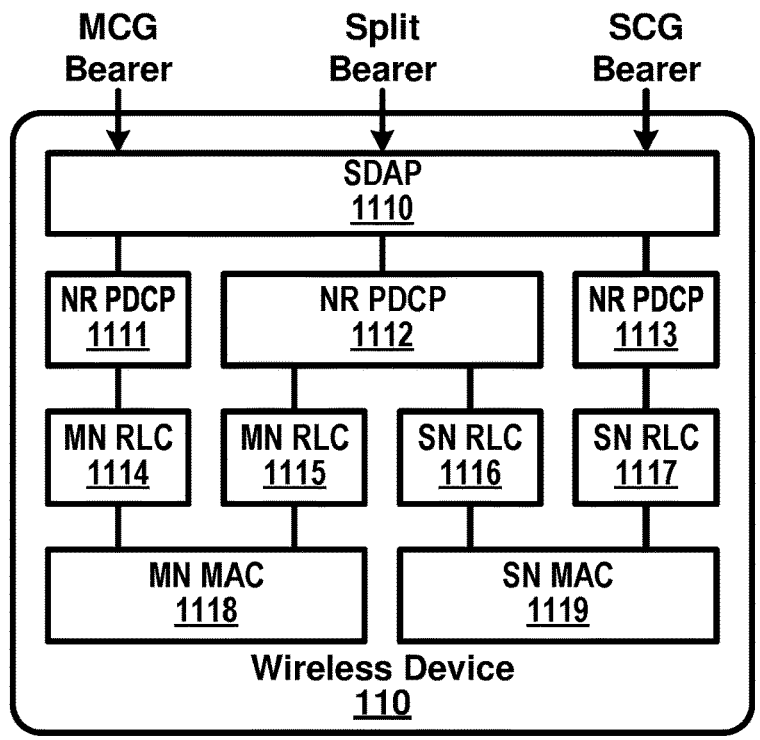
FIG. 11A and FIG. 11B show examples of multi connectivity.
Figure 11B:
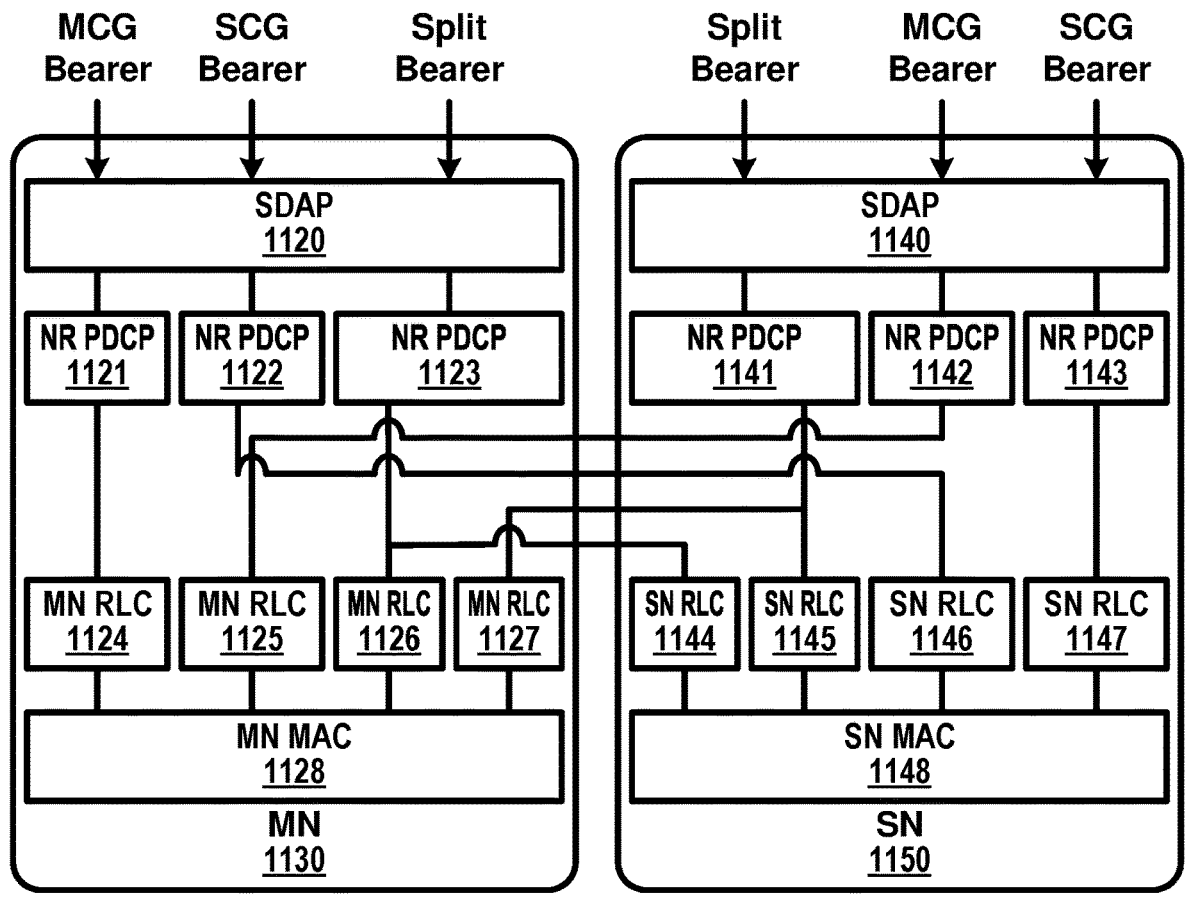

FIG. 11A and FIG. 11B show packet flows using a multi connectivity (e.g., dual connectivity, multi connectivity, tight interworking, and/or the like). FIG. 11A shows an example of a protocol structure of a wireless device 110

(e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1118).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain Radio Resource Management (RRM) measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
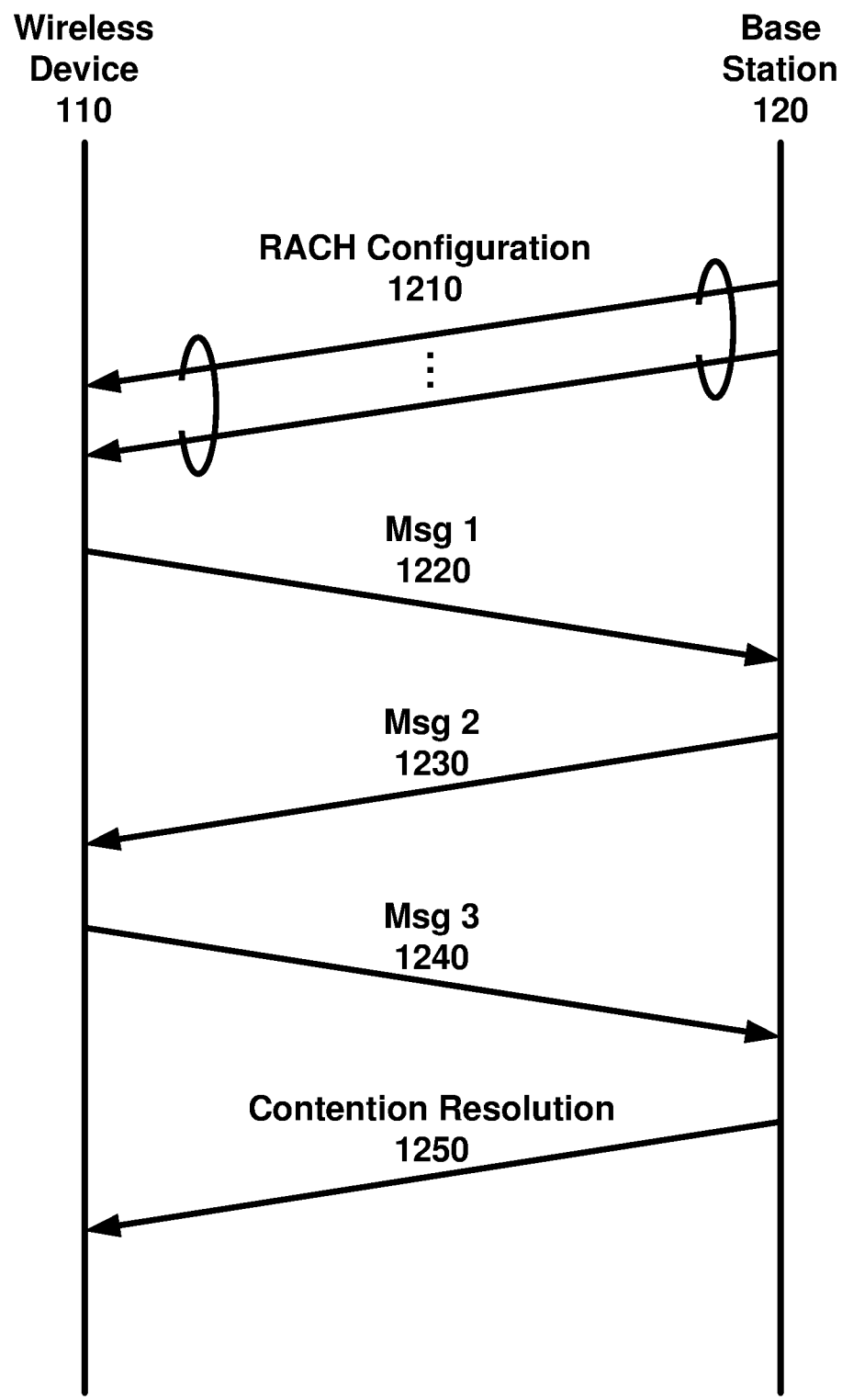
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RS s and/or if at least one CSI-RS with a RSRP above a second RSPR threshold amongst the associated CSI-RS s is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RS s. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1240, the wireless device may determine that the contention resolution (e.g., comprising contention resolution 1250) is successful and/or the wireless device may determine that the random access procedure is successfully completed.

Figure 13:
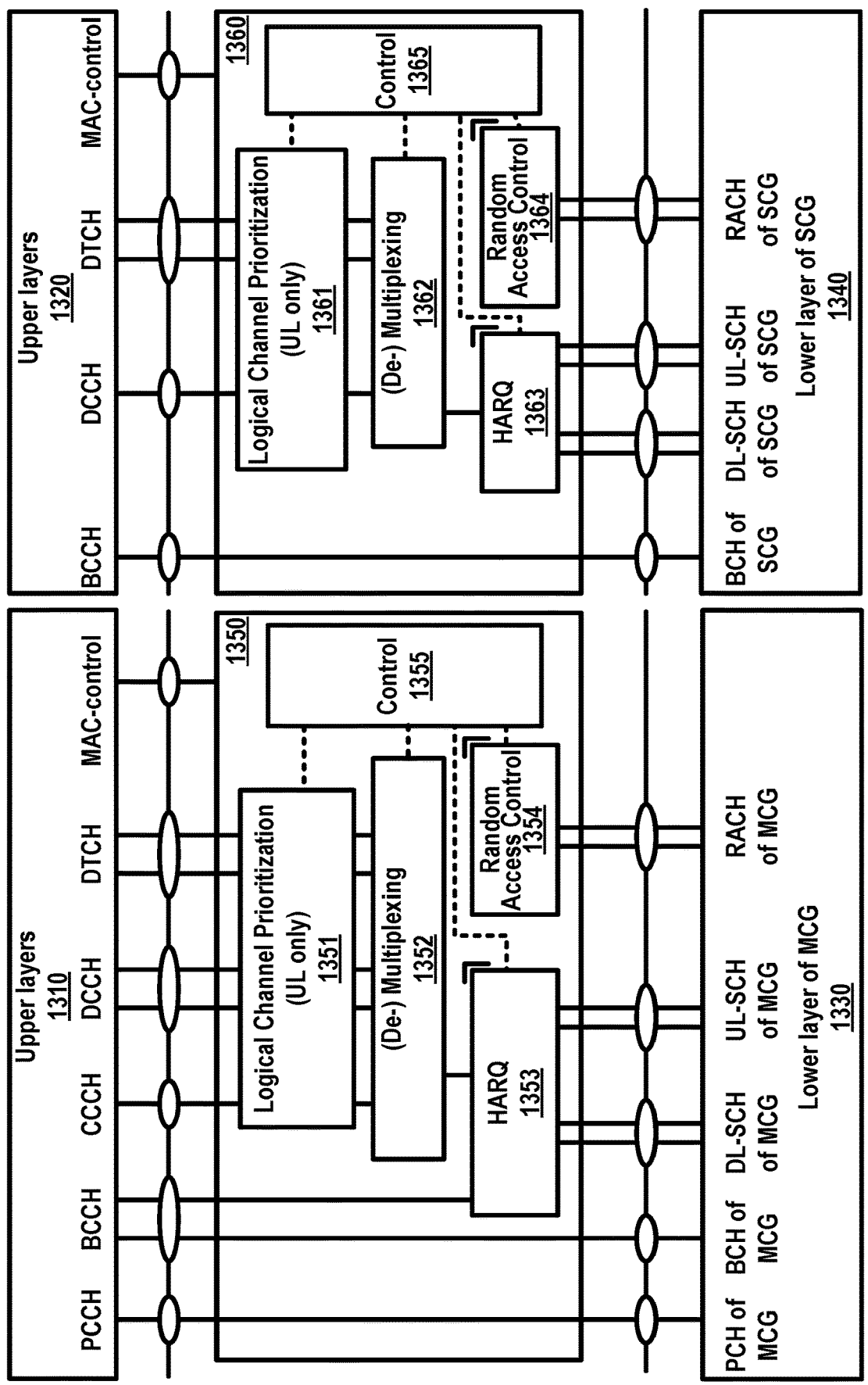
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
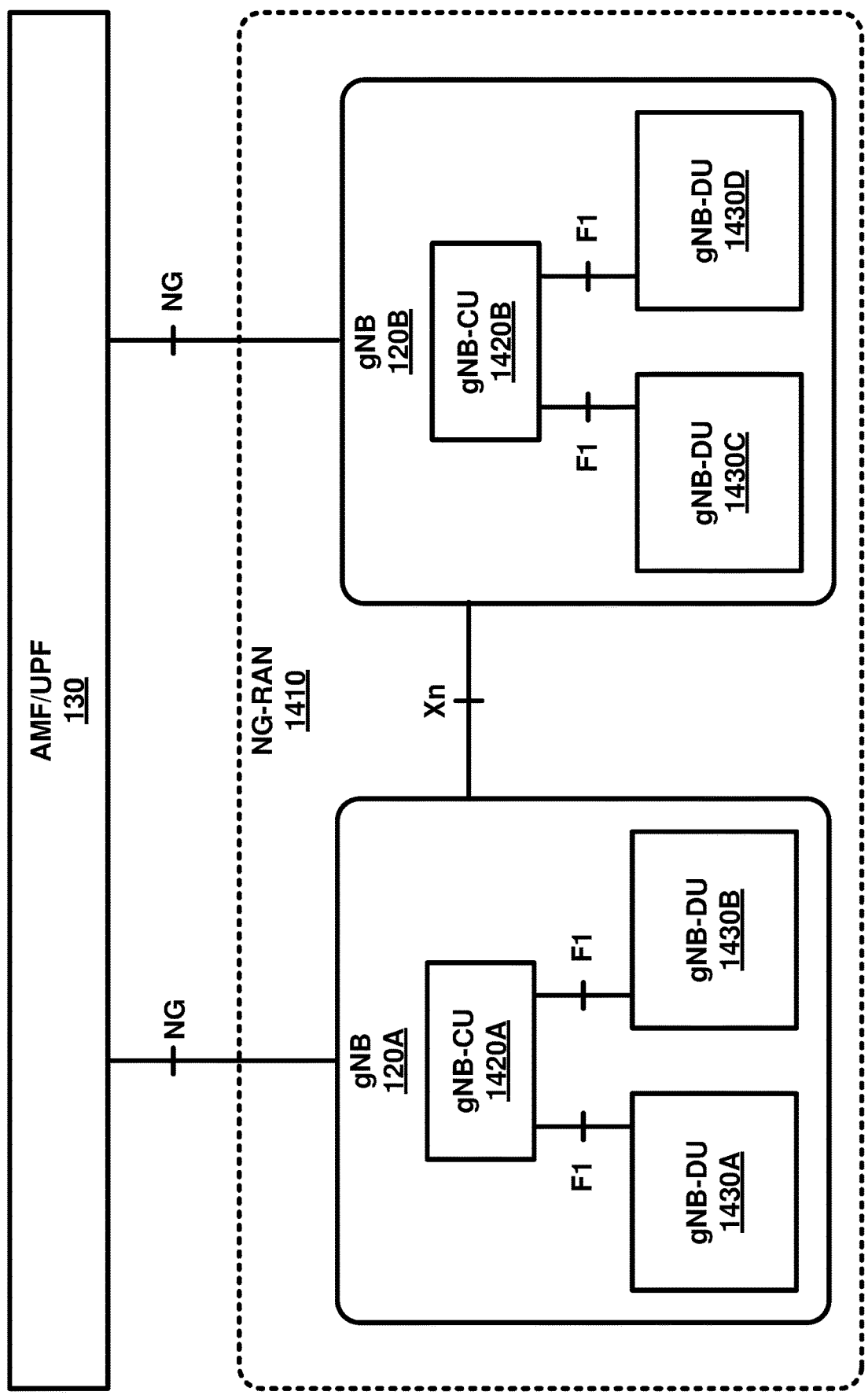
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
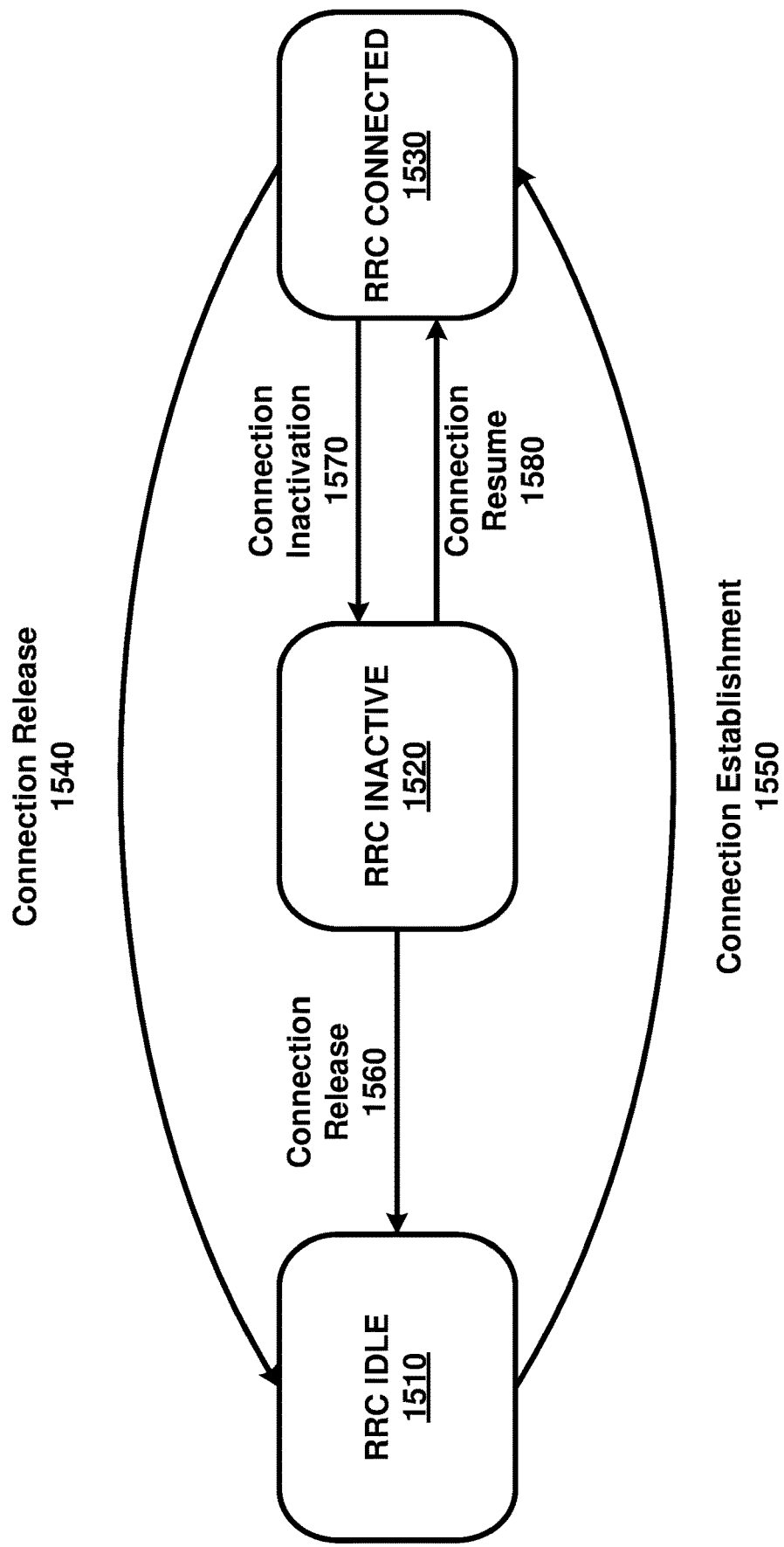
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; and/or an L field with multiple bits in length. The MAC subheader may correspond to a MAC SDU, a variable-sized MAC CE, and/or padding.

Figure 16A:
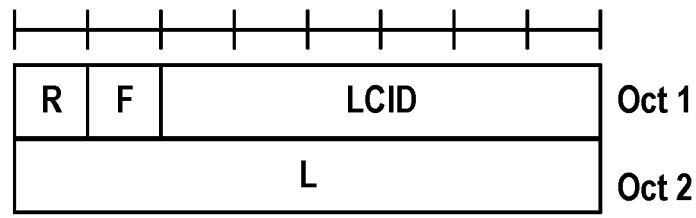
FIG. 16A, FIG. 16B and FIG. 16C show example MAC subheaders formats.

FIG. 16A shows an example of a MAC subheader comprising an eight-bit L field. The LCID field may have six bits in length (or any other quantity of bits). The L field may have eight bits in length (or any other quantity of bits).

Figure 16B:
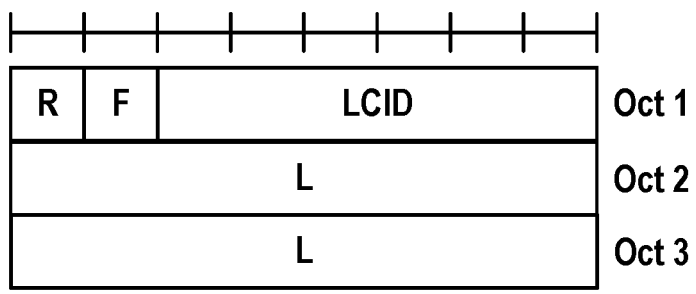

FIG. 16B shows an example of a MAC subheader with a sixteen-bit L field. The LCID field may have six bits in length (or any other quantity of bits). The L field may have sixteen bits in length (or any other quantity of bits). A MAC subheader may comprise: a R field comprising two bits in length (or any other quantity of bits); and an LCID field comprising multiple bits in length (e.g., if the MAC subheader corresponds to a fixed sized MAC CE), and/or padding.

Figure 16C:
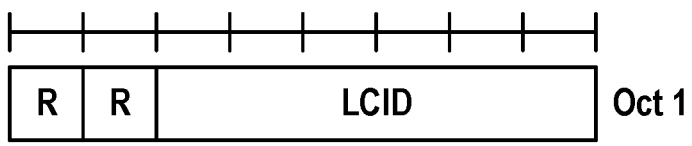

FIG. 16C shows an example of the MAC subheader. The LCID field may comprise six bits in length (or any other quantity of bits). The R field may comprise two bits in length (or any other quantity of bits).

Figure 17A:
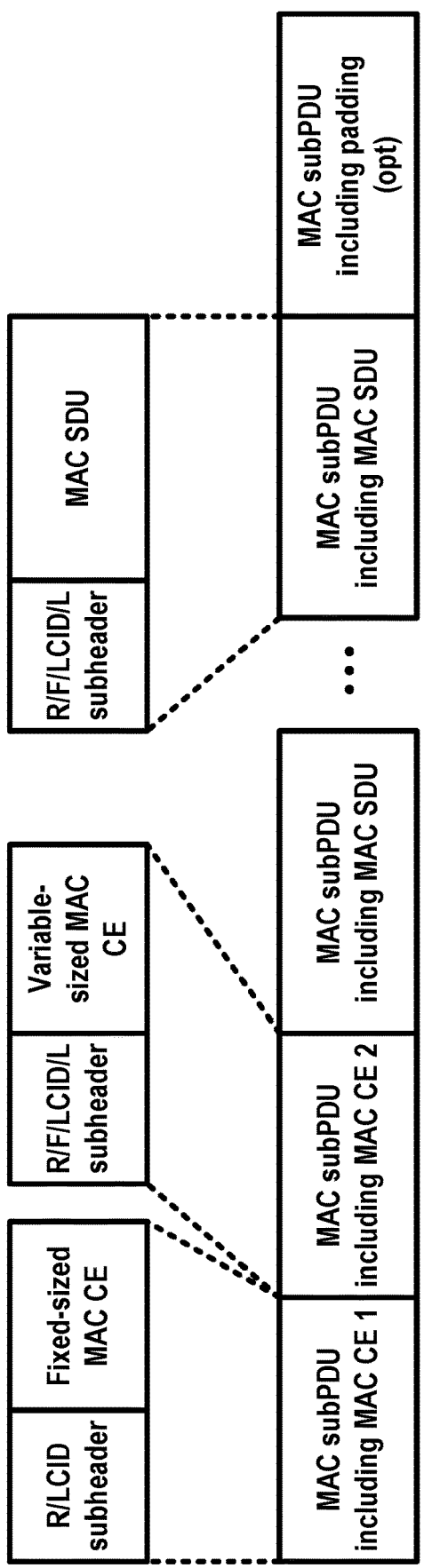
FIG. 17A and FIG. 17B show examples MAC data unit formats.

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

Figure 17B:
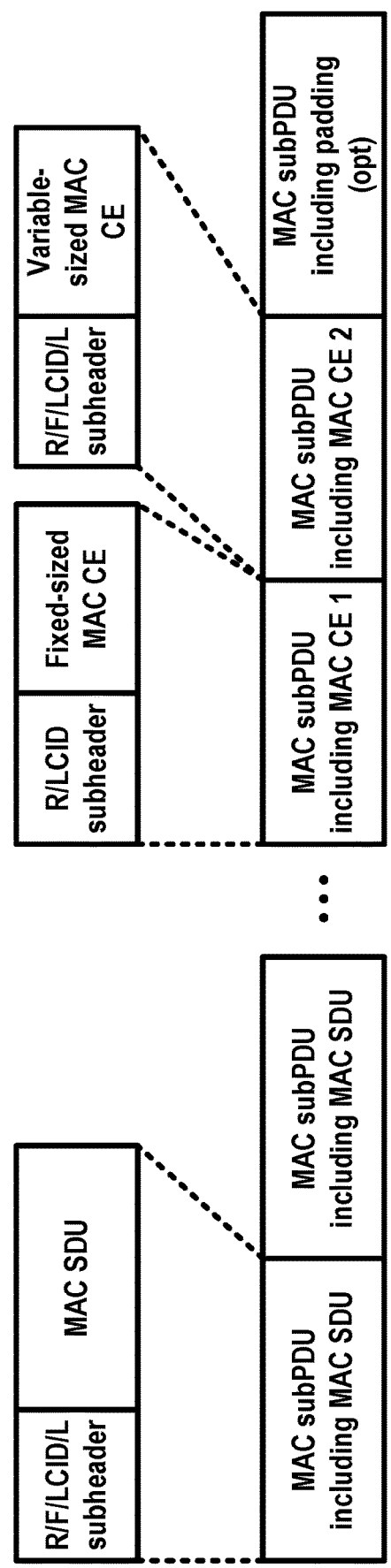

FIG. 17B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18 shows first examples of LCIDs. FIG. 19 shows second examples of LCIDs. In each of FIG. 18 and FIG. 19, the left columns comprise indices, and the right columns comprises corresponding LCID values for each index.

FIG. 18 shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate that a MAC CE associated with the MAC subheader is a long DRX command MAC CE.

FIG. 19 shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate that a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivation-Timer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivation-Timer timer) associated with an activated SCell expires. The wireless device may stop the timer (e.g., sCellDeactivation-Timer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, and/or flush HARQ buffers associated with the activated SCell, for example, after or in response to deactivating the activated SCell.

A wireless device may refrain from performing certain operations, for example, if an SCell is deactivated. The wireless device may refrain from performing one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 20A:
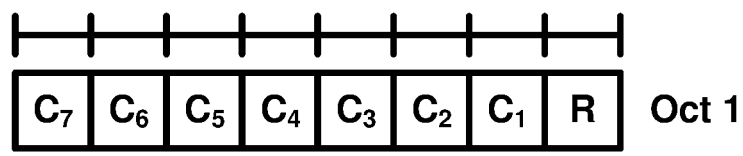
FIG. 20A and FIG. 20B show example secondary cell (SCell) activation/deactivation MAC control element (CE) formats.

FIG. 20A shows an example of an SCell activation/deactivation MAC CE that may comprise one octet. A first MAC PDU subheader comprising a first LCID (e.g., LCID 111010) may indicate/identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 20B:
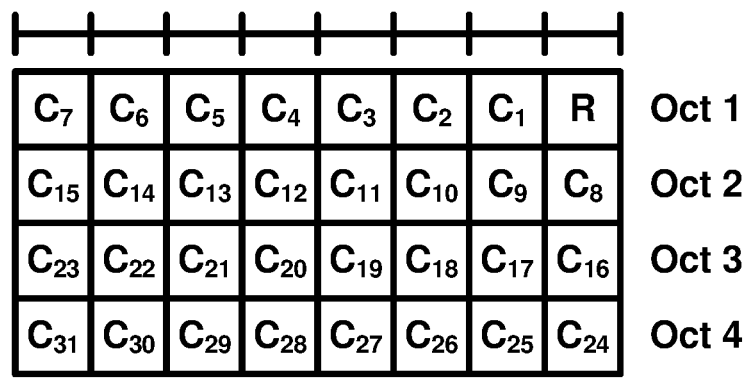

FIG. 20B shows an example of an SCell Activation/Deactivation MAC CE of four octets. A second MAC PDU subheader with a second LCID (e.g., LCID 111001) may indicate/identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station and/or a wireless device may use a power saving mechanism (e.g., hibernation mechanism) for an SCell, for example, if CA is configured. A power saving mechanism may improve battery performance (e.g., run-times), reduce power consumption of the wireless device, and/or to improve latency of SCell activation and/or SCell addition. The SCell may be transitioned (e.g., switched and/or adjusted) to a dormant state if the wireless device initiates a power saving state for (e.g., hibernates) the SCell. The wireless device may, for example, if the SCell is transitioned to a dormant state: stop transmitting SRS on the SCell, report CQI/PMI/RI/PTI/CRI for the SCell according to or based on a periodicity configured for the SCell in a dormant state, not transmit on an UL-SCH on the SCell, not transmit on a RACH on the SCell, not monitor the PDCCH on the SCell, not monitor the PDCCH for the SCell, and/or not transmit PUCCH on the SCell. Not transmitting, not monitoring, not receiving, and/or not performing an action may comprise, for example, refraining from transmitting, refraining from monitoring, refraining from receiving, and/or refraining from performing an action, respectively. Reporting CSI for an SCell, that has been transitioned to a dormant state, and not monitoring the PDCCH on/for the SCell, may provide the base station an "always-updated" CSI for the SCell. The base station may use a quick and/or accurate channel adaptive scheduling on the SCell, based on the always-updated CSI, if the SCell is transitioned back to active state. Using the always-updated CSI may speed up an activation procedure of the SCell. Reporting CSI for the SCell and not monitoring the PDCCH on and/or for the SCell (e.g., that may have been transitioned to a dormant state), may provide advantages such as increased battery efficiency, reduced power consumption of the wireless device, and/or increased timeliness and/or accuracy of channel feedback information feedback. A PCell/PSCell and/or a PUCCH SCell, for example, may not be configured or transitioned to a dormant state.

A base station may activate, hibernate, or deactivate at least one of one or more configured SCells. A base station may send (e.g., transmit) to a wireless device, for example, one or more messages comprising parameters indicating at least one SCell being set to an active state, a dormant state, or an inactive state.

A base station may transmit, for example, one or more RRC messages comprising parameters indicating at least one SCell being set to an active state, a dormant state, or an inactive state. A base station may transmit, for example, one or more MAC control elements (CEs) comprising parameters indicating at least one SCell being set to an active state, a dormant state, or an inactive state.

The wireless device may perform (e.g., if the SCell is in an active state): SRS transmissions on the SCell, CQI/PMI/RI/CRI reporting for the SCell, PDCCH monitoring on the SCell, PDCCH monitoring for the SCell, and/or PUCCH/

SPUCCH transmissions on the SCell. The wireless device may (e.g., if the SCell is in an inactive state): not transmit SRS on the SCell, not report CQI/PMI/RI/CRI for the SCell, not transmit on an UL-SCH on the SCell, not transmit on a RACH on the SCell, not monitor PDCCH on the SCell, not monitor a PDCCH for the SCell; and/or not transmit a PUCCH/SPUCCH on the SCell. The wireless device may (e.g., if the SCell is in a dormant state): not transmit SRS on the SCell, report CQI/PMI/RI/CRI for the SCell, not transmit on a UL-SCH on the SCell, not transmit on a RACH on the SCell, not monitor a PDCCH on the SCell, not monitor a PDCCH for the SCell, and/or not transmit a PUCCH/SPUCCH on the SCell.

A base station may send (e.g., transmit), for example, a first MAC CE (e.g., an activation/deactivation MAC CE). The first MAC CE may indicate, to a wireless device, activation or deactivation of at least one SCell. A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. A wireless device receiving a MAC CE may ignore the $C_i$ field, for example, if there is no SCell configured with SCell index i. An R field may indicate a reserved bit. The R field may be set to zero.

A base station may transmit a MAC CE (e.g., a hibernation MAC CE) that may generally be referred to herein as a second MAC CE. The second MAC CE may be the same as or different from other MAC CEs described herein, but is generally referred to herein as the second MAC CE. The second MAC CE may indicate activation and/or hibernation of at least one SCell to a wireless device. The second MAC CE may be associated with, for example, a second LCID different from a first LCID of the first MAC CE (e.g., the activation/deactivation MAC CE). The second MAC CE may have a fixed size. The second MAC CE may comprise a single octet comprising seven C-fields and one R-field.

FIG. 21A shows an example of a MAC CE (e.g., the second MAC CE referenced above) comprising a single octet. The second MAC CE may comprise four octets comprising 31 C-fields and one R-field. FIG. 21B shows an example of the second MAC CE comprising four octets. A second MAC CE (e.g., comprising four octets) may be associated with a third LCID. The third LCID may be different from the second LCID for the second MAC CE and/or the first LCID for activation/deactivation MAC CE. The second MAC CE (e.g., comprising one octet) may be used, for example, if there is no SCell with a serving cell index greater than a value (e.g., 7 or any other value). The second MAC CE (e.g., comprising four octets) may be used, for example, if there is an SCell with a serving cell index greater than a value (e.g., 7 or any other value). A second MAC CE may indicate a dormant/activated status of an SCell, for example, if a second MAC CE is received and a first MAC CE is not received. The $C_i$ field of the second MAC CE may indicate a dormant/activated status of an SCell with SCell index i if there is an SCell configured with SCell index i, otherwise the MAC entity may ignore the $C_i$ field. A wireless device may transition an SCell associated with SCell index i into a dormant state, for example, if $C_i$ of the second MAC CE is set to "1". The wireless device may activate an SCell associated with SCell index i, for example, if $C_i$ of the second MAC CE is set to "0". The wireless device may activate the SCell with SCell index i, for example, if $C_i$ of the second MAC CE is set to "0" and the SCell with SCell index i is in a dormant state. The wireless device may ignore the $C_i$ field of the second MAC CE, for example, if the $C_i$ field is set to "0" and the SCell with SCell index i is not in a dormant state.

FIG. 21C shows example configurations of a field of the first MAC CE. The field may comprise, for example, a $C_i$ field of the first MAC CE (e.g., an activation/deactivation MAC CE), a $C_i$ field of the second MAC CE (e.g., a hibernation MAC CE), and corresponding resulting SCell status (e.g., activated/deactivated/dormant). The wireless device may deactivate an SCell associated with SCell index i, for example, if $C_i$ of hibernation MAC CE is set to 0, and $C_i$ of the activation/deactivation MAC CE is set to 0. The wireless device may activate an SCell associated with SCell index i, for example, if $C_i$ of hibernation MAC CE is set to 0, and $C_i$ of the activation/deactivation MAC CE is set to 1. The wireless device may ignore the hibernation MAC CE and the activation/deactivation MAC CE, for example, if $C_i$ of hibernation MAC CE is set to 1, and $C_i$ of the activation/deactivation MAC CE is set to 0. The wireless device may transition an SCell associated with SCell index I to a dormant state, for example, if $C_i$ of hibernation MAC CE is set to 1, and $C_i$ of the activation/deactivation MAC CE is set to 1.

A base station may activate, hibernate, and/or deactivate at least one of one or more SCells, for example, if the base station is configured with the one or more SCells. A MAC entity of a base station and/or a wireless device may maintain an SCell deactivation timer (e.g., sCellDeactivationTimer), for example, per a configured SCell and/or except for an SCell configured with PUCCH/SPUCCH, if any. The MAC entity of the base station and/or the wireless device may deactivate an associated SCell, for example, if an SCell deactivation timer expires. A MAC entity of a base station and/or a wireless device may maintain dormant SCell deactivation timer (e.g., dormantSCellDeactivationTimer), for example, per a configured SCell and/or except for an SCell configured with PUCCH/SPUCCH, if any. The MAC entity of the base station and/or the wireless device may deactivate an associated SCell, for example, if the dormant SCell deactivation timer expires (e.g., if the SCell is in dormant state).

A base station (e.g., a MAC entity of the base station) and/or a wireless device (e.g., a MAC entity of the wireless device) may, for example, maintain an SCell hibernation timer (e.g., sCellHibernationTimer), for example, per a configured SCell and/or except for an SCell configured with PUCCH/SPUCCH, if any. The base station (e.g., the MAC entity of the base station) and/or the wireless device (e.g., the MAC entity of the wireless device) may hibernate an associated SCell, for example, if the SCell hibernation timer expires (e.g., if the SCell is in active state). The SCell hibernation timer may take priority over the SCell deactivation timer, for example, if both the SCell deactivation timer and the SCell hibernation timer are configured. A base station and/or a wireless device may ignore the SCell deactivation timer regardless of the SCell deactivation timer expiry, for example, if both the SCell deactivation timer and the SCell hibernation timer are configured.

A wireless device (e.g., MAC entity of a wireless device) may activate an SCell, for example, if the MAC entity is configured with an activated SCell at SCell configuration. A wireless device (e.g., MAC entity of a wireless device) may activate an SCell, for example, if the wireless device receives a MAC CE(s) activating the SCell. The wireless device (e.g., MAC entity of a wireless device) may start or restart an SCell deactivation timer associated with an SCell, for example, based on or in response to activating the SCell.

The wireless device (e.g., MAC entity of a wireless device) may start or restart an SCell hibernation timer (e.g., if configured) associated with an SCell, for example, based on or in response to activating the SCell. A wireless device (e.g., MAC entity of a wireless device) may trigger a PHR procedure, for example, based on or in response to activating an SCell.

A wireless device (e.g., MAC entity of a wireless device) and/or a base station (e.g., a MAC entity of a base station) may (e.g., if a first PDCCH on an SCell indicates an uplink grant or downlink assignment, or a second PDCCH on a serving cell scheduling the SCell indicates an uplink grant or a downlink assignment for the SCell, or a MAC PDU is transmitted in a configured uplink grant or received in a configured downlink assignment) restart an SCell deactivation timer associated with an activated SCell and/or restart an SCell hibernation timer (e.g., if configured) associated with the SCell. An ongoing random access (RA) procedure on an SCell may be aborted, for example, if, the SCell is deactivated.

A wireless device (e.g., MAC entity of a wireless device) and/or a base station (e.g., a MAC entity of a base station) may (e.g., if configured with an SCell associated with an SCell state set to dormant state upon the SCell configuration, or if receiving MAC CE(s) indicating transitioning the SCell to a dormant state): set (e.g., transition) the SCell to a dormant state, transmit one or more CSI reports for the SCell, stop an SCell deactivation timer associated with the SCell, stop an SCell hibernation timer (if configured) associated with the SCell, start or restart a dormant SCell deactivation timer associated with the S Cell, and/or flush all HARQ buffers associated with the SCell. The wireless device (e.g., MAC entity of a wireless device) and/or a base station (e.g., a MAC entity of a base station) may (e.g., if the SCell hibernation timer associated with the activated SCell expires): hibernate the SCell, stop the SCell deactivation timer associated with the SCell, stop the SCell hibernation timer associated with the SCell, and/or flush all HARQ buffers associated with the SCell. The wireless device (e.g., MAC entity of a wireless device) and/or a base station (e.g., a MAC entity of a base station) may (e.g., if a dormant SCell deactivation timer associated with a dormant SCell expires): deactivate the SCell and/or stop the dormant SCell deactivation timer associated with the SCell. Ongoing RA procedure on an SCell may be aborted, for example, if the SCell is in dormant state.

FIG. 22 shows example DCI formats. The example DCI formats may correspond to an operation such as an FDD operation (e.g., 20 MHz bandwidth, or any other bandwidth). The example DCI formats may correspond to transmissions involving two transmission antennas (or any other number of antennas) at the base station. The example DCI formats may correspond to transmissions utilizing CA or not utilizing no carrier aggregation. The DCI formats may comprise at least one of: DCI format 0_0/0_1 indicating scheduling of PUSCH in a cell; DCI format 1_0/1_1 indicating scheduling of PDSCH in a cell; DCI format 2_0 indicating a slot format (e.g., to a group of wireless devices); DCI format 2_1 indicating PRB(s) and/or OFDM symbol(s) to a group of wireless devices (e.g., in a scenario where a wireless device may assume no transmission is intended for the wireless device); DCI format 2_2 indicating transmission of TPC commands for PUCCH and PUSCH; and/or DCI format 2_3 indicating transmission of a group of TPC commands for SRS transmission by one or more wireless devices. A base station may transmit DCI, via a PDCCH, for scheduling decisions and/or power-control commands. The DCI may comprise at least one of: downlink scheduling assignments, uplink scheduling grants, power-control commands. The downlink scheduling assignments may comprise at least one of: PDSCH resource indication, transport format, HARQ information, control information related to multiple antenna schemes, and/or a command for power control of the PUCCH used for transmission of ACK/NACK (e.g., based on downlink scheduling assignments). The uplink scheduling grants may comprise at least one of: PUSCH resource indication, transport format, and HARQ related information, and/or a power control command of the PUSCH.

The different types of control information correspond to different DCI message sizes. Supporting spatial multiplexing with non-contiguous allocation of RBs (e.g., in the frequency domain) may require a larger scheduling message, for example, in comparison with an uplink grant that allows only contiguous allocation of RBs. The DCI may be categorized into different DCI formats. A DCI format may correspond to a certain message size and may be associated with a particular application/usage.

A wireless device may monitor one or more PDCCH candidates to detect one or more DCI with one or more DCI format. One or more PDCCH transmissions may be transmitted in a common search space or a wireless device-specific search space. A wireless device may monitor PDCCH with only a limited set of DCI formats, for example, to reduce power consumption. A wireless device may not be required to detect DCI, for example, with DCI format 6 (e.g., as used for an eMTC wireless device), and/or any other DCI format. A wireless device with a capability for detection of a higher number of DCI formats may have a higher power consumption.

The one or more PDCCH candidates that a wireless device monitors may be defined in terms of PDCCH wireless device-specific search spaces. A PDCCH wireless device-specific search space at CCE aggregation level L (e.g., L∈{1, 2, 4, 8}) may be defined by a set of PDCCH candidates for the CCE aggregation level L. A wireless device may be configured (e.g., by one or more higher layer parameters), for a DCI format per serving cell, a number of PDCCH candidates per CCE aggregation level L.

A wireless device may monitor one or more PDCCH candidate in control resource set q based on a periodicity of symbols (e.g., $W_{PDCCH,q}$ symbols) for control resource set q. The periodicity of the symbols for the control resource set q may be configured, for example, by one or more higher layer parameters).

Information in the DCI formats used for downlink scheduling may be organized into different groups. Fields present in DCIs corresponding to different DCI formats may be different. The fields may comprise, for example, at least one of: resource information (e.g., comprising carrier indicator (e.g., 0 or 3 bits, or any other quantity of bits) and/or RB allocation); HARQ process number; MCS, new data indicator (NDI), and redundancy version (RV) (e.g., for a first TB); MCS, NDI and RV (e.g., for a second TB); MIMO related information; PDSCH resource-element mapping and QCI; downlink assignment index (DAI); TPC for PUCCH; SRS request (e.g., 1 bit, or any other quantity of bits), an indicator for triggering one-shot SRS transmission; ACK/NACK offset; DCI format 0/1A indication (e.g., used to differentiate between DCI format 1A and DCI format 0); and padding (e.g., if necessary). The MIMO related information may comprise, for example, at least one of: PMI, precoding information, transport block swap flag, power offset between PDSCH and reference signal, reference-signal scrambling sequence, number/quantity of layers, and/or antenna ports for transmission.

Information in the DCI formats used for uplink scheduling may be organized into different groups. Field present in DCIs corresponding to different DCI formats may be different. The fields may comprise, for example, at least one of: resource information (e.g., comprising carrier indicator, resource allocation type, and/or RB allocation); MCS, NDI (for a first TB); MCS, NDI (for a second TB); phase rotation of an uplink DMRS; precoding information; CSI request, an indicator requesting an aperiodic CSI report; SRS request (e.g., 2 bits, or any other quantity of bits) to trigger aperiodic SRS transmission (e.g., using one of up to three preconfigured settings); uplink index/DAI; TPC for PUSCH; DCI format 0/1A indication; and padding (e.g., if necessary).

A base station may perform cyclic redundancy check (CRC) scrambling for DCI, for example, before transmitting the DCI via a PDCCH. The base station may perform CRC scrambling, for example, by bit-wise addition (or Modulo-2 addition, exclusive OR (XOR) operation, or any other method) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, MCS-C-RNTI, and/or any other identifier) with the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may transmit one or more PDCCH in different control resource sets, for example, to support wide bandwidth operation. A base station may transmit one or more RRC message comprising configuration parameters of one or more control resource sets. At least one of the one or more control resource sets may comprise, for example, at least one of: a first OFDM symbol; a number/quantity of consecutive OFDM symbols; a set of resource blocks; a CCE-to-REG mapping; and/or a REG bundle size (e.g., for interleaved CCE-to-REG mapping).

A base station may configure a wireless device with BWPs (e.g., UL BWPs and/or DL BWPs) to enable BA on a PCell. The base station may configure the wireless device with at least DL BWP(s) (e.g., there may be no UL BWPs in the UL) to enable BA on an SCell (e.g., if CA is configured). An initial active BWP may be a first BWP used for initial access, for example, for the PCell. A first active BWP may be a second BWP configured for the wireless device to operate on the SCell (e.g., upon the SCell being activated). A base station and/or a wireless device may independently switch a DL BWP and an UL BWP, for example, if operating in a paired spectrum (e.g., FDD). A base station and/or a wireless device may simultaneously switch a DL BWP and an UL BWP, for example, if operating in an unpaired spectrum (e.g., TDD).

A base station and/or a wireless device may switch a BWP between configured BWPs, for example, based on DCI, a BWP inactivity timer, and/or any trigger. A base station and/or a wireless device may switch an active BWP to a default BWP, for example, based on or in response to an expiry of a BWP inactivity timer, if configured, associated with a serving cell. The default BWP may be configured by the network.

One UL BWP for each uplink carrier and/or one DL BWP may be active at a time in an active serving cell, for example, for FDD systems that may be configured with BA. One DL/UL BWP pair may be active at a time in an active serving cell, for example, for TDD systems. Operating on the one UL BWP and/or the one DL BWP (or the one DL/UL BWP pair) may improve wireless device battery consumption. BWPs other than the one active UL BWP and/or the one active DL BWP that the wireless device may work on may be deactivated. On or for deactivated BWPs, the wireless device may not monitor PDCCH and/or may not transmit on a PUCCH, PRACH, and/or UL-SCH.

A serving cell may be configured with any quantity of BWPs (e.g., up to four, or up to any other quantity of BWPs). There may be, for example, one or any other quantity of active BWPs at any point in time for an activated serving cell.

BWP switching for a serving cell may be used, for example, to activate an inactive BWP and/or deactivate an active BWP (e.g., at a time t). The BWP switching may be controlled, for example, by a PDCCH indicating a downlink assignment and/or an uplink grant. The BWP switching may be controlled, for example, by a BWP inactivity timer (e.g., bwp-InactivityTimer). The BWP switching may be controlled, for example, by a base station (e.g., a MAC entity of a base station), a wireless device (e.g., a MAC entity of a wireless device), and/or a MAC entity, based on or in response to initiating an RA procedure. One or more BWPs may be initially active, without receiving a PDCCH indicating a downlink assignment or an uplink grant, for example, if an SpCell is added and/or if an SCell is activated. The active BWP for a serving cell may be indicated by RRC message and/or PDCCH. A DL BWP may be paired with an UL BWP. BWP switching may be common for both UL and DL, for example, for unpaired spectrum.

Figure 23:
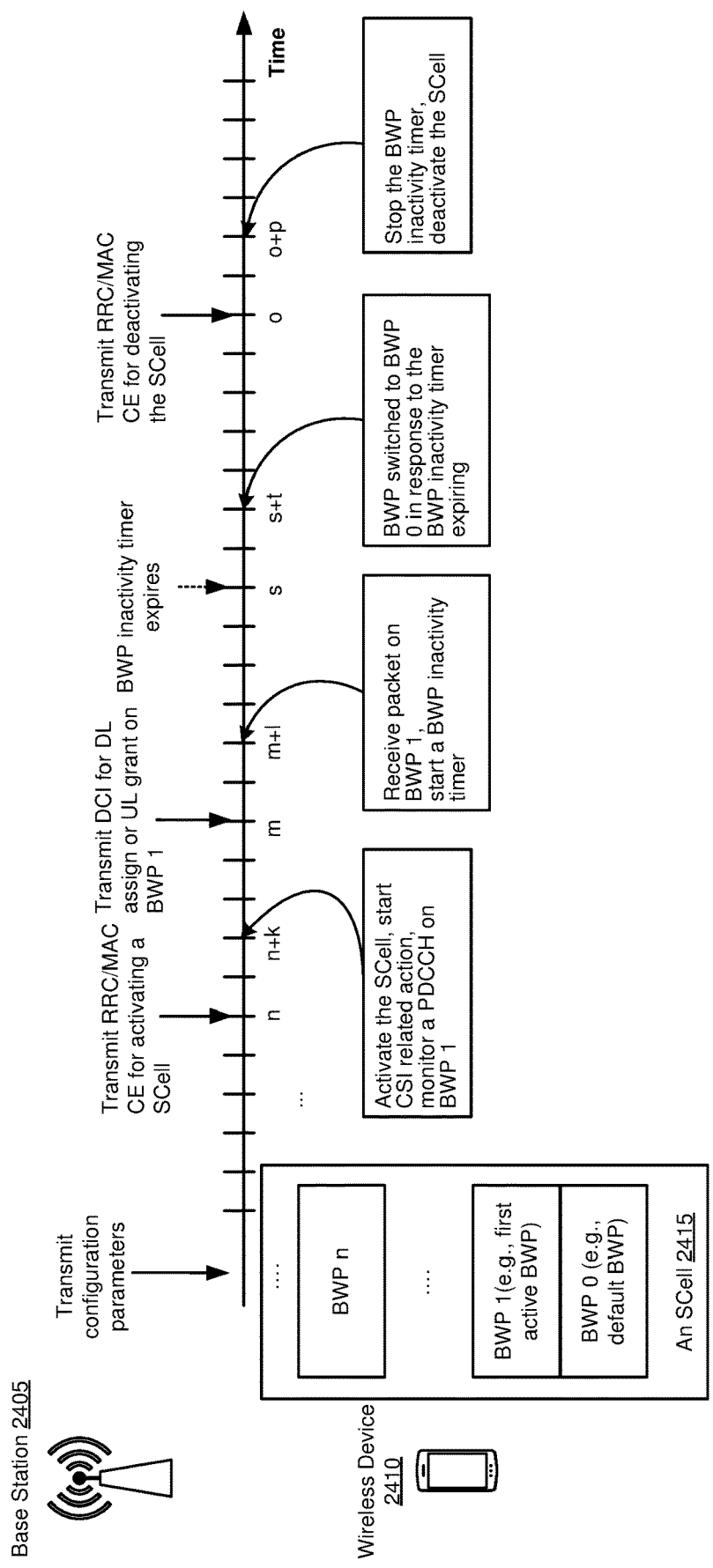
FIG. 23 shows example BWP management on an SCell.

FIG. 23 shows an example of BWP switching for an SCell. A base station 2405 may send (e.g., transmit) one or more messages, to a wireless device 2410. The one or more messages may be for configuring BWPs corresponding to the SCell 2415. The one or more messages may comprise, for example, one or more RRC messages (e.g., RRC connection reconfiguration message, and/or RRC connection reestablishment message, and/or RRC connection setup message). The configured BWPs may comprise BWP 0, BWP 1, . . . BWP n. The BWP 0 may be configured as a default BWP. The BWP 1 may be configured as a first active BWP. At time n, the base station 2405 may send (e.g., transmit) an RRC message and/or a MAC CE for activating the SCell. At or after time n+k, and based on the reception of the RRC message and/or the MAC CE, the wireless device 2410 may activate the SCell and start monitoring a PDCCH on the BWP 1 (e.g., the first active BWP). At or after time m, the base station 2405 may send (e.g., transmit) DCI for DL assignment or UL grant on the BWP 1. At or after time m+1, the wireless device 2410 may receive a packet on the BWP 1 and may start a BWP inactivity timer (e.g., bwp-InactivityTimer). At time s, the BWP inactivity timer may expire. At or after time s+t, a BWP may switch to BWP 0 based on expiration of the BWP inactivity timer. BWP switching may comprise, for example, activating the BWP 0 and deactivating the BWP 1. At time o, the base station 2405 may send (e.g., transmit) an RRC message and/or a MAC CE for deactivating an SCell. At or after time o+p, the wireless device 2410 may stop the BWP inactivity timer and deactivate the SCell 2415.

A wireless device may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 23), one BWP as the default BWP (e.g., BWP 0 in FIG. 23). The wireless device may receive a MAC CE to activate the SCell at $n^{th}$ slot. The wireless device may start a SCell deactivation timer (e.g., sCellDeactivationTimer), and start CSI related actions for the SCell, and/or start CSI related actions for the first active BWP of the SCell. The wireless device may start monitoring a PDCCH on BWP 1 in response to activating the SCell.

The wireless device may start restart a BWP inactivity timer (e.g., bwp-InactivityTimer) at $m^{th}$ slot in response to receiving a DCI indicating DL assignment on BWP 1. The wireless device may switch back to the default BWP (e.g., BWP 0) as an active BWP when the BWP inactivity timer expires, at $s^{th}$ slot. The wireless device may deactivate the SCell and/or stop the BWP inactivity timer when the SCell deactivation timer expires.

Using the BWP inactivity timer may reduce a wireless device's power consumption, for example, if the wireless device is configured with multiple cells with each cell having wide bandwidth (e.g., 1 GHz bandwidth, etc.). The wireless device may only transmit on or receive from a narrow-bandwidth BWP (e.g., 5 MHz) on the PCell or SCell if there is no activity on an active BWP.

A MAC entity may perform operations, on an active BWP for an activated serving cell (e.g., configured with a BWP), comprising: transmitting on an UL-SCH; transmitting on a RACH, monitoring a PDCCH, transmitting on a PUCCH, receiving DL-SCH, and/or (re-) initializing any suspended configured uplink grants of configured grant Type 1 according to a stored configuration, if any. On an inactive BWP for each activated serving cell configured with a BWP, a MAC entity may, for example: not transmit on an UL-SCH, not transmit on a RACH, not monitor a PDCCH, not transmit on a PUCCH, not transmit an SRS, not receive a DL-SCH transmission, clear configured downlink assignment(s) and/or configured uplink grant(s) of configured grant Type 2, and/or suspend configured uplink grant(s) of configured Type 1. A wireless device may perform the BWP switching to a BWP indicated by the PDCCH, for example, if the wireless device (e.g., a MAC entity of the wireless device) receives a PDCCH for a BWP switching of a serving cell and a RA procedure associated with this serving cell is not ongoing.

A bandwidth part indicator field value may indicate an active DL BWP, from a configured DL BWP set, for DL receptions for example, if the bandwidth part indicator field is configured in DCI format 1_1. A bandwidth part indicator field value, may indicate an active UL BWP, from a configured UL BWP set, for UL transmissions, for example, if the bandwidth part indicator field is configured in DCI format 0_1.

A wireless device may be provided by a higher layer parameter a timer value corresponding to a BWP inactivity timer for the PCell (e.g., bwp-InactivityTimer). The wireless device may increment the timer, if running, for example, every interval of 1 millisecond (or any other first duration) for frequency range 1 (or any other first frequency range) or every 0.5 milliseconds (or any other second duration) for frequency range 2 (or any other second frequency range), for example, if: the wireless device does not detect DCI format 1_1 for paired spectrum operation, or the wireless device does not detect DCI format 1_1 or DCI format 0_1 for unpaired spectrum operation, in the interval.

Wireless device procedures on an SCell may be similar to or the same as procedures on a PCell, for example, if the wireless device is configured for the SCell with a higher layer parameter indicating a default DL BWP among configured DL BWPs (e.g., Default-DL-BWP), and/or if the wireless device is configured with a higher layer parameter indicating a timer value (e.g., bwp-InactivityTimer). The wireless device procedures on the SCell may use the timer value for the SCell and the default DL BWP for the SCell. The wireless device may use, as first active DL BWP and first active UL BWP on the SCell or secondary cell, an indicated DL BWP and an indicated UL BWP on the SCell, respectively, if a wireless device is configured, for example, by a higher layer parameter for the DL BWP (e.g., active-BWP-DL-SCell), and/or by a higher layer parameter for the UL BWP on the SCell or secondary cell (e.g., active-BWP-UL-SCell).

A wireless device may transmit uplink control information (UCI) via one or more PUCCH resources to a base station. The wireless device may transmit the one or more UCI, for example, as part of a DRX operation. The one or more UCI may comprise at least one of: HARQ-ACK information; scheduling request (SR); and/or CSI report. A PUCCH resource may be identified by at least: frequency location (e.g., starting PRB); and/or a PUCCH format associated with initial cyclic shift of a base sequence and time domain location (e.g., starting symbol index). A PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH formats 1, 2, 3, and/or 4 may comprise any other quantity of OFDM symbols and/or any other quantity of bits. The PUCCH resource may be configured on a PCell, or a PUCCH secondary cell.

A base station may transmit to a wireless device (e.g., if the wireless device is configured with multiple uplink BWPs), one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

A wireless device may select (e.g., if the wireless device is configured with multiple uplink BWPs) one of the one or more PUCCH resource sets based on a total bit length of UCI information bits (e.g., HARQ-ARQ bits, SR, and/or CSI) the wireless device will transmit. The wireless device may select a first PUCCH resource set (e.g., with the PUCCH resource set index equal to 0, or any other PUCCH resource set index), for example, if the total bit length of UCI information bits is less than or equal to 2 bits (or any other quantity of bits). The wireless device may select a second PUCCH resource set (e.g., with a PUCCH resource set index equal to 1), for example, if the total bit length of UCI information bits is greater than 2 (or any other quantity of bits) and less than or equal to a first configured value. The wireless device may select a third PUCCH resource set (e.g., with a PUCCH resource set index equal to 2), for example, if the total bit length of UCI information bits is greater than the first configured value and less than or equal to a second configured value. The wireless device may select a fourth PUCCH resource set (e.g., with a PUCCH resource set index equal to 3), for example, if the total bit length of UCI information bits is greater than the second configured value and less than or equal to a third value.

A wireless device may determine, based on a quantity of uplink symbols of UCI transmission and a quantity of UCI bits, a PUCCH format from a plurality of PUCCH formats comprising PUCCH format 0, PUCCH format 1, PUCCH format 2, PUCCH format 3 and/or PUCCH format 4. The wireless device may transmit UCI in a PUCCH using PUCCH format 0, for example, if the transmission is during, greater than, or over 1 symbol or 2 symbols and/or the quantity of HARQ-ACK information bits with positive or negative SR (HARQ-ACK/SR bits) is 1 or 2. The wireless device may transmit UCI in a PUCCH using PUCCH format 1, for example, if the transmission is during, greater than, or over 4 or more symbols and the number of HARQ-ACK/SR bits is 1 or 2. The wireless device may transmit UCI in a PUCCH using PUCCH format 2, for example, if the transmission is during, greater than, or over 1 symbol or 2 symbols and the number of UCI bits is more than 2. The wireless device may transmit UCI in a PUCCH using PUCCH format 3, for example, if the transmission is during, greater than, or over 4 or more symbols, the quantity of UCI bits is more than 2 and a PUCCH resource does not include an orthogonal cover code. The wireless device may transmit UCI in a PUCCH using PUCCH format 4, for example, if the transmission is during, greater than, or over 4 or more symbols, the quantity of UCI bits is more than 2 and the PUCCH resource includes an orthogonal cover code.

A wireless device may determine a PUCCH resource from a PUCCH resource set, for example, to transmit HARQ-ACK information on the PUCCH resource. The PUCCH resource set may be determined as described herein. The wireless device may determine the PUCCH resource based on a PUCCH resource indicator field in a DCI (e.g., with a DCI format 1_0 or DCI for 1_1) received on a PDCCH. A PUCCH resource indicator field in the DCI may indicate one of eight PUCCH resources in the PUCCH resource set. The wireless device may transmit the HARQ-ACK information in a PUCCH resource indicated by the PUCCH resource indicator field in the DCI. The PUCCH resource indicator field may be 3-bits (e.g., or any other quantity of bits) in length.

The wireless device may transmit one or more UCI bits via a PUCCH resource of an active uplink BWP of a PCell or a PUCCH secondary cell. The PUCCH resource indicated in the DCI may be a PUCCH resource on the active uplink BWP of the cell, for example, if at most one active UL BWP in a cell is supported for a wireless device.

DRX operation may be used by a wireless device, for example, to reduce power consumption, resource consumption (e.g., frequency and/or time resources), and/or improve battery lifetime of the wireless device. A wireless device may discontinuously monitor downlink control channel (e.g., PDCCH or EPDCCH), for example, if the wireless device is operating using DRX. The base station may configure DRX operation with a set of DRX parameters. The base station may configure the DRX operation using an RRC configuration. The set of DRX parameters may be selected (e.g., by the base station) based on a network use case. A wireless device may receive data packets over an extended delay, based on the configured DRX operation. The configured DRX may be used such that a base station may wait, at least until the wireless device transitions to a DRX ON state, to receive data packets. The wireless device may be in a DRX Sleep/OFF state, for example, if not receiving any data packets.

A wireless device that is configured with a DRX operation may power down at least some (or most) of its circuitry, for example, if there are no packets to be received. The wireless device may monitor PDCCH discontinuously, for example, if DRX operation is configured. The wireless device may monitor the PDCCH continuously, for example, if a DRX operation is not configured. The wireless device may listen to and/or monitor DL channels (e.g., PDCCHs) in a DRX active state, for example, if DRX is configured. The wireless device may not listen to and/or monitor the DL channels (e.g., the PDCCHs) in a DRX Sleep state, for example, if DRX is configured.

Figure 24:
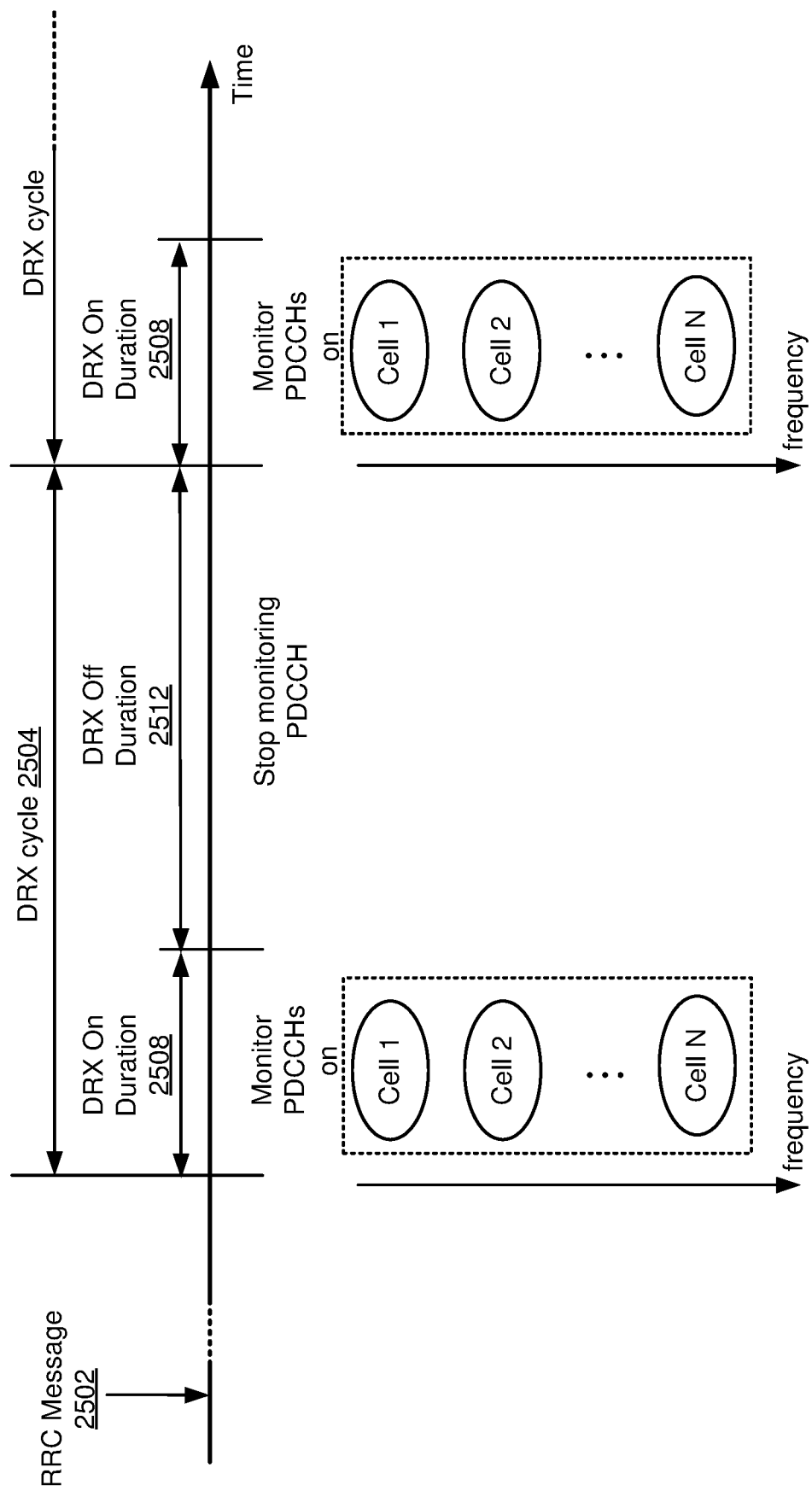
FIG. 24 shows an example DRX operation.

FIG. 24 shows an example of a DRX operation. A base station (e.g., a gNB) may transmit an RRC message 2502 comprising, for example, one or more DRX parameters of a DRX cycle 2504. The RRC message may comprise: RRC connection reconfiguration message (e.g., RRCReconfiguration); RRC connection reestablishment message (e.g., RRCRestablishment); and/or RRC connection setup message (e.g., RRCSetup). The one or more parameters may comprise, for example, a first parameter and/or a second parameter. The first parameter may indicate a first time value of a DRX active state (e.g., DRX active/on duration 2508) of the DRX cycle 2504. The second parameter may indicate a second time of a DRX sleep state (e.g., DRX sleep/off duration 2512) of the DRX cycle 2504. The one or more parameters may further comprise, for example, a time duration of the DRX cycle 2504.

The wireless device may monitor PDCCHs, for detecting one or more DCIs on a serving cell, for example, if the wireless device is in the DRX active state. The wireless device may stop monitoring PDCCHs on the serving cell, for example, if the wireless device is in the DRX sleep state. The wireless device may monitor all PDCCHs on (or for) multiple cells that are in an active state, for example, if the wireless device is in the DRX active state. The wireless device may stop monitoring all PDCCH on (or for) the multiple cells, for example, if the wireless device is in the DRX sleep state. The wireless device may repeat the DRX operations according to the one or more DRX parameters.

DRX operation may be beneficial to a base station. A wireless device may transmit periodic CSI and/or SRS frequently (e.g., based on a configuration), for example, if DRX is not configured. The wireless device may not transmit periodic CSI and/or SRS in a DRX off period, for example, if DRX is not configured. The base station may assign resources in DRX off period, that would otherwise be used for transmitting periodic CSI and/or SRS, to the other wireless devices, for example, to improve resource utilization efficiency.

A wireless device (e.g., a MAC entity of the wireless device) may be configured (e.g., by RRC) with a DRX functionality that controls downlink control channel (e.g., PDCCH) monitoring activity, of the wireless device, for a plurality of RNTIs for the wireless device. The plurality of RNTIs may comprise, for example, at least one of: C-RNTI, CS-RNTI, INT-RNTI, SP-CSI-RNTI, SFI-RNTI, TPC-PUCCH-RNTI, TPC-PUSCH-RNTI, Semi-Persistent Scheduling C-RNTI, eIMTA-RNTI, SL-RNTI, SL-V-RNTI, CC-RNTI, and/or SRS-TPC-RNTI. The wireless device (e.g., based on the wireless device being RRC_CONNECTED) may monitor the PDCCH discontinuously using a DRX operation, for example, if DRX is configured. The wireless device (e.g., the MAC entity of the wireless device) may monitor the PDCCH continuously, for example, if DRX is not configured.

RRC may control DRX operation, for example, by configuring a plurality of timers. The plurality of timers may comprise, for example: a DRX ON duration timer (e.g., drx-onDurationTimer), a DRX inactivity timer (e.g., drx-InactivityTimer), a downlink DRX HARQ RTT timer (e.g., drx-HARQ-RTT-TimerDL), an uplink DRX HARQ RTT Timer (e.g., drx-HARQ-RTT-TimerUL), a downlink retransmission timer (e.g., drx-RetransmissionTimerDL), an uplink retransmission timer (e.g., drx-RetransmissionTimerUL), one or more parameters of a short DRX configuration (e.g., drx-ShortCycle and/or drx-ShortCycleTimer)), and/or one or more parameters of a long DRX configuration (e.g., drx-LongCycle). Time granularity for DRX timers may be defined in terms of PDCCH subframes (e.g., indicated as psf in DRX configurations), or in terms of milliseconds or any other duration.

An active time of a DRX cycle may include a time duration/period in which at least one timer is running. The at least one timer may comprise: a DRX ON duration timer (e.g., drx-onDurationTimer), a DRX inactivity timer (e.g., drx-InactivityTimer), a downlink retransmission timer (e.g., drx-RetransmissionTimerDL), an uplink retransmission timer (e.g., drx-RetransmissionTimerUL), and/or a MAC contention resolution timer (e.g., mac-ContentionResolutionTimer).

A DRX inactivity timer may specify a time duration/period for which the wireless device may be active based on successfully decoding a PDCCH indicating a new transmission (UL or DL or SL). The DRX inactivity timer may be restarted upon receiving PDCCH for a new transmission (UL or DL or SL). The wireless device may transition to a DRX mode (e.g., using a short DRX cycle or a long DRX cycle), for example, based on the expiry of the DRX inactivity timer.

A DRX short cycle (e.g., drx-ShortCycle) may be a first type of DRX cycle (e.g., if configured) that may be used, for example, if a wireless device enters DRX mode. An information element (e.g., DRX-Config 1E) may indicate a length of the short cycle. A DRX short cycle timer (e.g., drx-ShortCycleTimer) may be expressed as multiples of the DRX short cycle. The timer may indicate a number of initial DRX cycles to follow the short DRX cycle before a long DRX cycle is initiated.

A DRX ON duration timer may specify, for example, a time duration at the beginning of a DRX cycle (e.g., DRX ON state). The drx-onDurationTimer may indicate, for example, a time duration before entering a sleep mode (e.g., DRX OFF state).

A DL HARQ RTT timer (e.g., drx-HARQ-RTT-TimerDL) may specify a minimum duration between a time at which a new transmission (e.g., a packet) is received and a time at which the wireless device may expect a retransmission (e.g., of the packet). The DL HARQ RTT timer may be, for example, fixed and not configurable by RRC. The DRX HARQ RTT timer may be, for example, configurable by RRC. A DRX HARQ RTT timer may indicate a maximum duration for which a wireless device may monitor PDCCH, for example, if a retransmission from a base station is expected by the wireless device.

An active time of a configured DRX cycle may comprise, for example, a time at which a scheduling request (e.g., sent on PUCCH) is pending. An active time of a configured DXR cycle may comprise, for example, a time in which an uplink grant for a pending HARQ retransmission may occur, and in which data is present in a corresponding HARQ buffer for a synchronous HARQ process. An active time of a configured DRX cycle may comprise, for example, a time in which a PDCCH indicating a new transmission, addressed to the C-RNTI of the wireless device (e.g., a MAC entity of the wireless device), has not been received at the wireless device (e.g., after a successful reception of an RA response at the wireless device). The RA response may correspond to, for example, a response to a preamble that is not selected by the wireless device, (e.g., the MAC entity of the wireless device).

A DL HARQ RTT timer may expire in a subframe and data of a corresponding HARQ process may not be successfully decoded, for example, at a wireless device configured for DRX. A wireless device (e.g., a MAC entity of the wireless device) may start the drx-RetransmissionTimerDL for the corresponding HARQ process. An UL HARQ RTT timer may expire in a subframe, for example, at a wireless device configured for DRX. A wireless device (e.g., a MAC entity of the wireless device) may start the uplink retransmission timer (e.g., drx-RetransmissionTimerUL) for a corresponding HARQ process. A DRX command MAC CE or a long DRX command MAC CE may be received, for example, at a wireless device configured for DRX. A wireless device (e.g., a MAC entity of the wireless device) may stop the DRX ON duration timer (e.g., drx-onDurationTimer) and stop the DRX inactivity timer (e.g., drx-InactivityTimer).

A DRX inactivity timer (e.g., drx-InactivityTimer) may expire or a DRX command MAC CE may be received in a subframe, for example, at a wireless device configured for DRX. A wireless device (e.g., a MAC entity of the wireless device) may start or restart DRX short cycle timer (e.g., drx-ShortCycleTimer) and may use a short DRX Cycle, for example, if the short DRX cycle is configured. The wireless device (e.g., the MAC entity of the wireless device) may use a long DRX cycle, if the long DRX cycle is configured.

A DRX short cycle timer (e.g., drx-ShortCycleTimer) may expire in a subframe, for example, at a wireless device configured for DRX. A wireless device (e.g., a MAC entity of the wireless device) may use the long DRX cycle (e.g., based on expiration of the drx-ShortCycleTimer). A long DRX command MAC CE may be received. The wireless device (e.g., the MAC entity of the wireless device) may stop a DRX short cycle timer (e.g., drx-ShortCycleTimer) and may use the long DRX cycle (e.g., based on reception of the long DRX command MAC CE).

A wireless device that is configured for DRX operation may start a DRX ON duration timer (e.g., drx-onDurationTimer), for example, if a short DRX cycle is used and if equation (1) is valid.

$$[(SFN \times 10) + \text{sub frame number}] \bmod (drx\text{-}ShortCycle) = (drxStartOffset) \bmod (drx\text{-}ShortCycle) \quad \text{Equation (1)}$$

is valid. A wireless device that is configured for DRX operation may start a DRX ON duration timer (e.g., drx-onDurationTimer), for example, if a long DRX Cycle is used and if equation (2) is valid $$[(SFN*10) + \text{sub frame number}] \bmod (drx\text{-}longCycle) = drxStartOffset \quad \text{Equation (2)}$$

Figure 25:
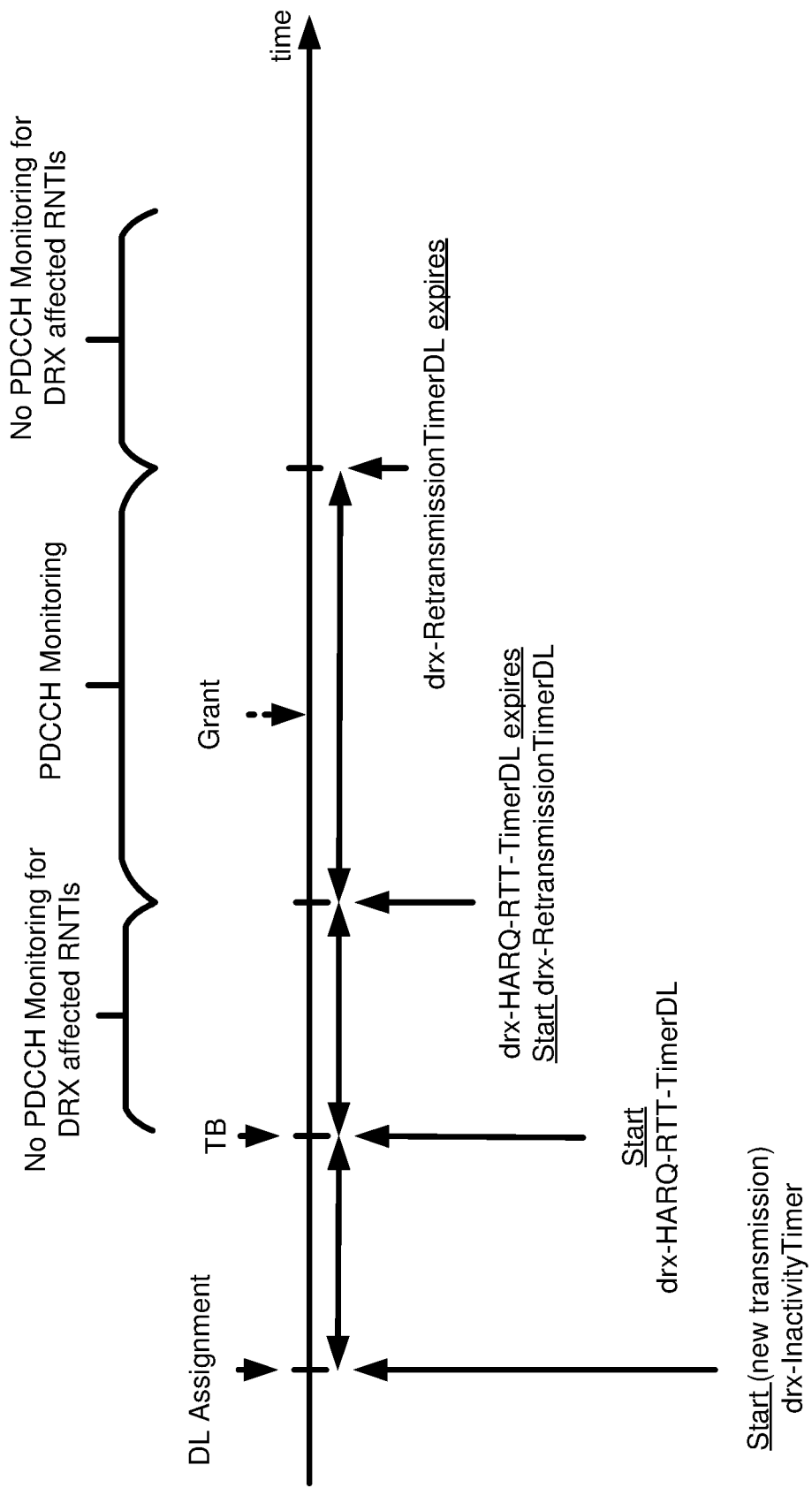
FIG. 25 shows an example DRX operation.

FIG. 25 shows example of DRX operation. A base station may send (e.g., transmit) an RRC message to a wireless device. The RRC message may comprise configuration parameters of DRX operation. The base station may send (e.g., transmit), via a PDCCH, DCI for downlink resource allocation, to the wireless device. The wireless device may start a DRX inactivity timer (e.g., drx-InactivityTimer) and may monitor the PDCCH. The wireless device may receive a transmission block (TB), for example, while the DRX inactivity timer is running. The wireless device may start a HARQ RTT timer (e.g., drx-HARQ-RTT-TimerDL), and may stop monitoring the PDCCH, for example, based on receiving the TB. The wireless device may transmit a NACK to the base station, for example, if the wireless device fails to receive the TB. The wireless device may monitor the PDCCH and start a HARQ retransmission timer (e.g., drx-RetransmissionTimerDL), for example, based on an expiration of the HARQ RTT Timer. The wireless device may receive second DCI, for example, while the HARQ retransmission timer is running. The second DCI may indicate, for example, a DL grant for a retransmission of the TB. The wireless device may stop monitoring the PDCCH, for example, if the wireless device fails to receive a second DCI before an expiration of the HARQ retransmission timer.

The base station may transmit first DCI for an uplink grant via a PDCCH, to the wireless device. The wireless device may start the DRX inactivity timer and monitor the PDCCH. The wireless device may start a HARQ RTT Timer (e.g., drx-HARQ-RTT-TimerUL) and stop monitoring the PDCCH, for example, based on (e.g., after or in response to) transmitting a TB via the uplink grant. The base station may transmit a NACK to the wireless device, for example, if the base station is unsuccessful in receiving the TB. The wireless device may start a HARQ retransmission timer (e.g., drx-RetransmissionTimerUL) and monitor the PDCCH for the NACK, for example, if/when the HARQ RTT Timer expires. The wireless device may receive second DCI indicating an uplink grant for the retransmission of the TB, for example, if/when the HARQ retransmission timer is running. The wireless device may stop monitoring the PDCCH, for example, if/when the wireless device does not receive the second DCI before the HARQ retransmission timer expires.

A wireless device may receive an uplink grant dynamically on a PDCCH or in a random-access response (RAR). The wireless device may receive an uplink grant configured semi-persistently by an RRC message. The wireless device may transmit, via the uplink grant, an uplink TB on a UL-SCH. A layer (e.g., medium access control (MAC) layer) of the wireless device may receive HARQ information from lower layers (e.g., physical layer) of the wireless device, for example, for transmission of the uplink TB. The HARQ information may comprise at least one of: HARQ process indicator/identifier (ID); new data indicator (NDI); redundancy version (RV); and/or transport block size (TBS).

A wireless device (e.g., a MAC entity of the wireless device) may be associated with a C-RNTI, a Temporary C-RNTI (TC-RNTI), or a configured scheduling RNTI (CS-RNTI). A wireless device may receive an uplink grant for a serving cell on a PDCCH for the MAC entity's C-RNTI or TC-RNTI. The MAC entity may deliver the uplink grant and one or more associated HARQ information to the HARQ entity, for example, for each PDCCH occasion and for each serving cell belonging to a time alignment group (TAG) that has a running timer (e.g., timeAlignmentTimer) and for each uplink grant received for a PDCCH occasion.

A wireless device (e.g., a MAC entity of the wireless device) may comprise a HARQ entity for each serving cell with configured uplink. The wireless device may be configured with a supplementary uplink. The HARQ entity may maintain a quantity of parallel HARQ processes. Each HARQ process of the quantity of parallel HARQ processes may support one TB, and the HARQ process may be associated with a HARQ process indicator/identifier (ID). A HARQ process indicator/identifier (e.g., identifier 0) may correspond to uplink transmission with uplink grant in an RAR process.

A PUSCH aggregation factor parameter (e.g., pusch-AggregationFactor) may provide a quantity of transmissions of a TB within a bundle of a dynamic grant. A wireless device (e.g., a MAC entity of the wireless device) may be configured with PUSCH repetition (e.g., pusch-AggregationFactor>1). (pusch-AggregationFactor−1) HARQ retransmissions may follow within a bundle, for example, based on/after an initial transmission. A parameter (e.g., repK) may provide a quantity of transmissions of a TB within a bundle of a configured uplink grant. A wireless device (e.g., a MAC entity of the wireless device) may be configured with a value of repK that is greater than 1. HARQ retransmissions may follow within a bundle, for example, based on/after the initial transmission. Bundling operation may rely on the HARQ entity for both dynamic grant and configured uplink grant. The bundling operation may rely on the HARQ entity for invoking the same HARQ process for each transmission that is part of the same bundle. HARQ retransmissions may be triggered within a bundle, for example, with or without waiting for feedback from previous transmission according to the PUSCH aggregation factor (e.g., for the dynamic grant) and/or the repK parameter (e.g., for the configured uplink grant). Each transmission within a bundle may be a separate uplink grant, for example, after the initial uplink grant within a bundle is delivered to the HARQ entity.

A sequence of redundancy versions, for each transmission within a bundle of a dynamic grant, may be determined based on one or more fields of a DCI carrying the dynamic grant. A sequence of redundancy versions, for each transmission within a bundle of a configured uplink grant, may be determined based on one or more configuration parameters in an RRC message.

A HARQ entity of a wireless device may indicate (e.g., identify) a HARQ process associated with an uplink grant. The HARQ entity may obtain, from a multiplexing and assembly entity, a MAC PDU to transmit, for example, if the received uplink grant is not addressed to a TC-RNTI on PDCCH, and an NDI provided in the associated HARQ information has been toggled compared to an NDI value in the previous transmission of the TB of the HARQ process. The HARQ entity may deliver the MAC PDU, the uplink grant, and the HARQ information of the TB to the indicated/identified HARQ process and instruct the identified HARQ process to trigger a new transmission, for example, based on obtaining the MAC PDU. The HARQ entity may deliver the uplink grant and the HARQ information (e.g., redundancy version) of the TB to the indicated/identified HARQ process, and instruct the indicated/identified HARQ process to trigger a retransmission, for example, if the received uplink grant is addressed to a TC-RNTI on PDCCH, or the NDI provided in the associated HARQ information has not been toggled compared to the NDI value in the previous transmission of the TB of the HARQ process.

A HARQ process may be associated with a HARQ buffer. A wireless device may perform a new transmission on a resource and with an MCS indicated on either a PDCCH, an RAR, or an RRC message. The wireless device may perform a retransmission on a resource and with an MCS (if provided) as indicated on PDCCH. The wireless device may perform a retransmission on a same resource and with a same MCS as was used for a last transmission attempt within a bundle.

The HARQ process may store the MAC PDU in the associated HARQ buffer, store the uplink grant received from the HARQ entity, and/or generate a transmission for a TB, for example, if the HARQ entity requests a new transmission of the TB. The HARQ process may store the uplink grant received from the HARQ entity and generate a transmission for a TB, for example, if the HARQ entity requests a retransmission for the TB. The HARQ process may instruct the physical layer to generate a transmission for a TB according to the stored uplink grant, for example, if the MAC PDU was obtained from a Msg3 buffer or if there is no measurement gap at the time of the transmission. The HARQ process may instruct the physical layer to generate a retransmission for a TB according to the stored uplink grant, for example, if the retransmission does not collide with a transmission for the MAC PDU obtained from the Msg3 buffer.

Figure 26:
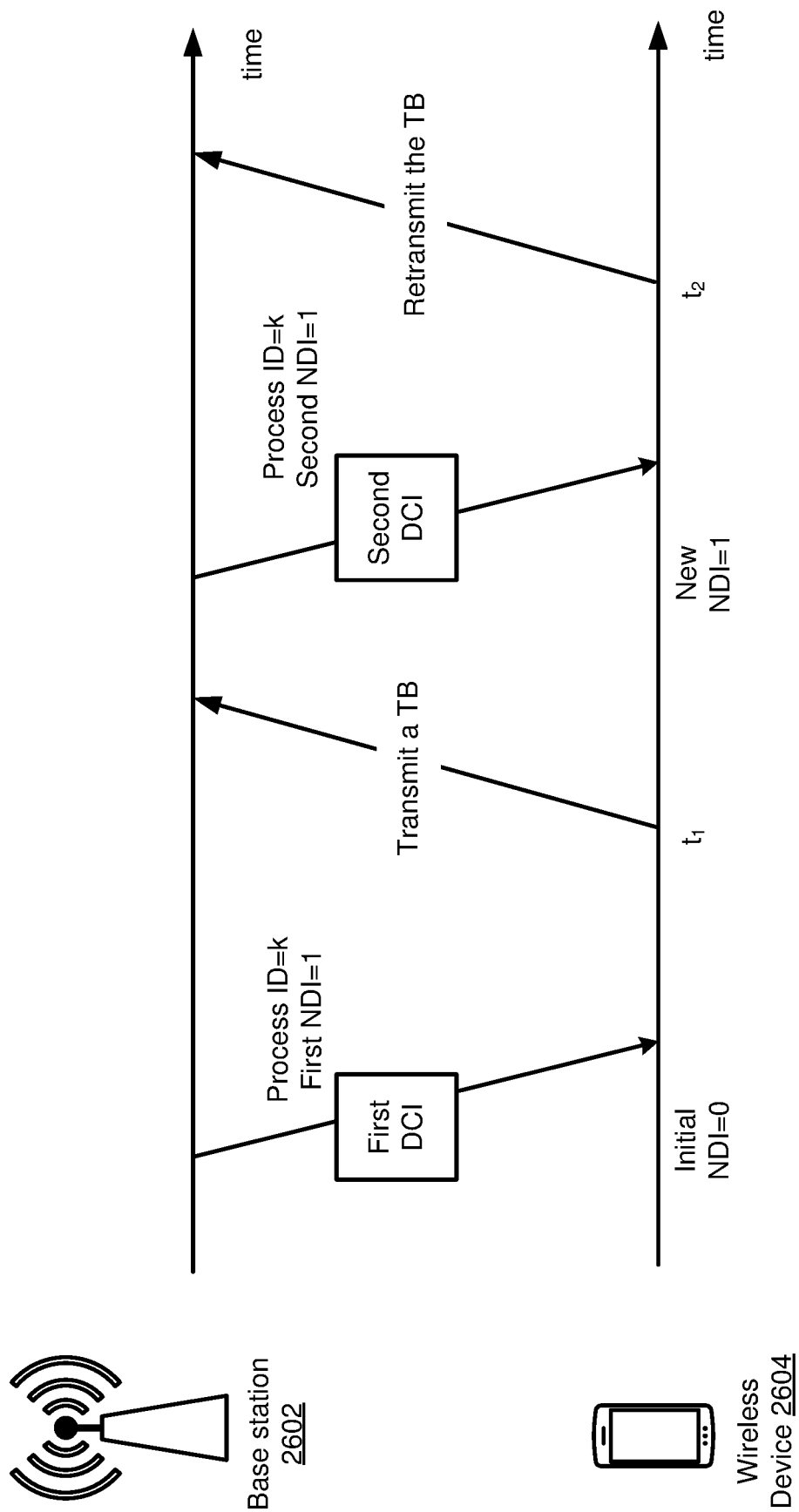
FIG. 26 shows an example hybrid automatic repeat request (HARQ) operation.

FIG. 26 shows an example of an uplink TB retransmission mechanism based on a HARQ procedure. A base station 2602 may send (e.g., transmit), to a wireless device 2604, first DCI comprising an uplink grant and HARQ information. The HARQ information may comprise a HARQ process indicator/identifier (ID) (e.g., process ID=k) and a first NDI value (e.g., 1).

The wireless device 2604 may store an NDI value (e.g., in a memory associated with the wireless device). The memory may be associated with a HARQ process identified by a HARQ process ID. The NDI value may be associated with a HARQ process identified by a HARQ process ID. The wireless device 2604 may have (e.g., store) an initial NDI value (e.g., 0), for example, before receiving the first DCI. The wireless device 2604 may receive the first DCI. The wireless device 2604 may determine that the first NDI value (e.g., 1) is different from the initial NDI value (e.g., 0). The wireless device 2604 may determine that the first NDI value is toggled with respect to the initial NDI value. The wireless device 2604 (e.g., a HARQ entity of the wireless device 2604) may determine/obtain a MAC PDU (e.g., from a multiplexing and assembly entity of the wireless device 2604), for example, based on the first NDI value being different from the initial NDI value. The HARQ entity may deliver the MAC PDU, the uplink grant, and the HARQ information to a HARQ process indicated/identified by the HARQ process ID (e.g., process ID=k). The HARQ entity may instruct the HARQ process to trigger a new transmission for a TB that comprises the MAC PDU. The HARQ process may store the MAC PDU in an associated HARQ buffer and store the uplink grant. The HARQ process may instruct the wireless device 2604 (e.g., a physical layer of the wireless device 2604) to generate a new transmission for the TB, for example, based on the stored uplink grant. At or after time $t_1$, the wireless device 2604 may send (e.g., transmit) the TB based on the stored uplink grant. The wireless device 2604 may set the first NDI value (e.g., 1) as a new NDI value, for example, based on the transmission of the TB.

The base station 2602 may provide a subsequent uplink grant, to the wireless device 2604, for a retransmission of the TB. The base station 2602 may provide the subsequent uplink grant, for example, if the base station 2602 does not successfully receive the TB transmitted by the wireless device 2604. The base station 2602 may transmit a second DCI indicating the retransmission of the TB. The second DCI may comprise a same HARQ process ID as the first HARQ process ID, a second uplink grant, a RV value, and a second NDI value (e.g., 1). The wireless device 2604 may determine the second NDI value is equal to/same as the first NDI value/the new NDI value. The wireless device 2604 may determine that the second NDI value is not toggled with respect to the new NDI value/the first NDI value. The HARQ entity may deliver, to the HARQ process, the second uplink grant and the RV value. The HARQ entity may instruct the HARQ process to trigger a retransmission of the TB, for example, based on the second NDI value being equal to the new NDI value. The HARQ process may store the second uplink grant. The HARQ process may instruct the wireless device 2604 (e.g., the physical layer of the wireless device 2604) to generate a retransmission for the TB according to the second uplink grant. At or after time $t_2$, the wireless device 2604 may resend (e.g., retransmit) the TB based on the second uplink grant.

Figure 27:
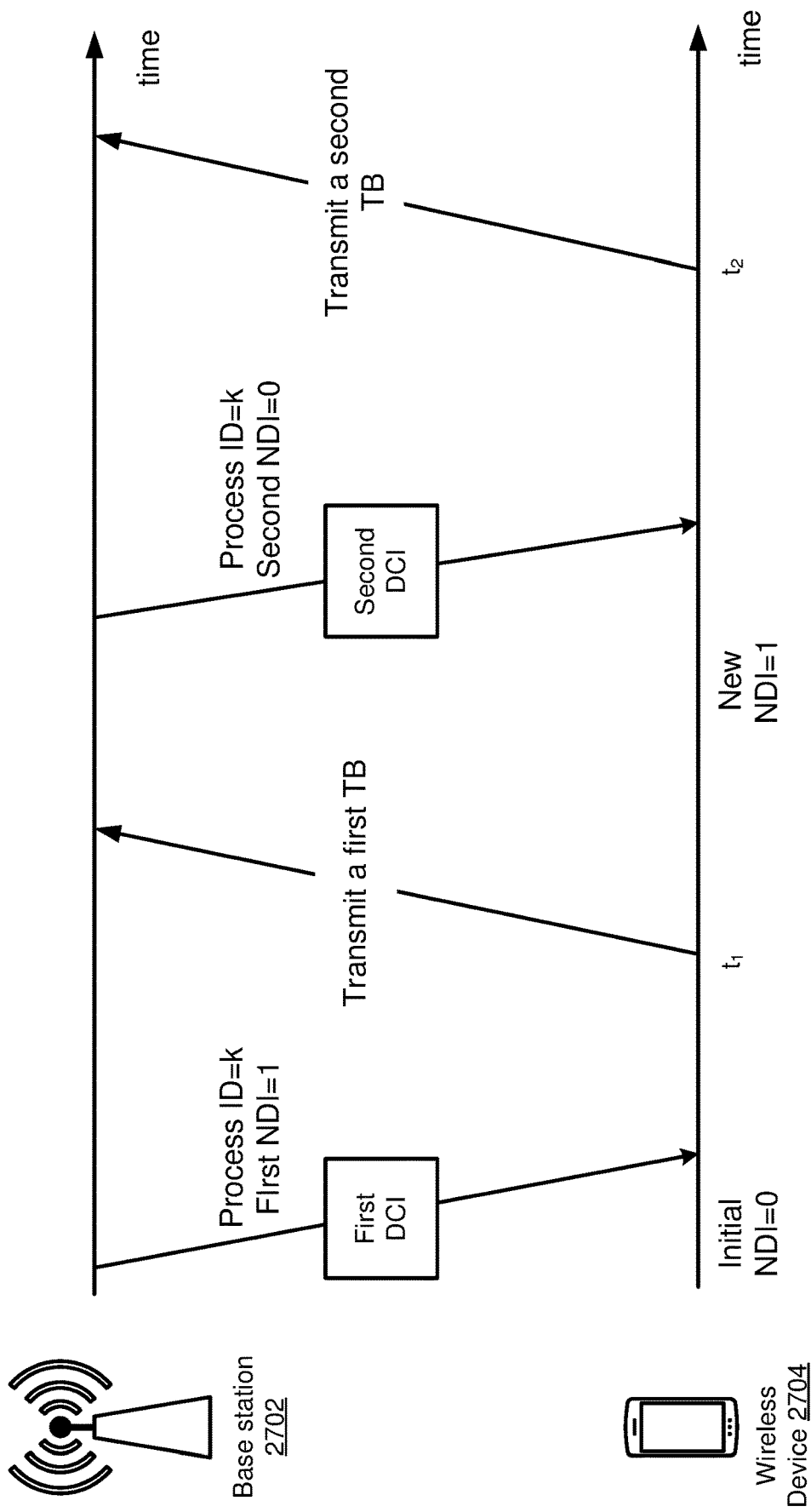
FIG. 27 shows an example HARQ operation.

FIG. 27 shows an example of an uplink TB transmission mechanism based on HARQ procedure. A base station 2702 may transmit to a wireless device 2704, first DCI (e.g., comprising an uplink grant) and HARQ information. The HARQ information may comprise a HARQ process indicator/ID (e.g., process ID=k) and a first NDI value (e.g., 1).

The wireless device 2704 may store an NDI value (e.g., in a memory, associated with a HARQ process identified by a HARQ process ID, of the wireless device). The NDI value may be associated with a HARQ process identified by the HARQ process ID. The wireless device 2704 may have an initial NDI value (e.g., 0), for example, prior to receiving the first DCI. The wireless device 2704 may receive the first DCI. The wireless device 2704 may determine that the first NDI has (e.g., 1) is different from the initial NDI value (e.g., 0). The wireless device 2704 may determine that the first NDI value is toggled with respect to the initial NDI value. The wireless device 2704 (e.g., a HARQ entity of the wireless device 2704) may obtain a MAC PDU (e.g., from a multiplexing and assembly entity of the wireless device), for example, based on the first NDI value being different from the initial NDI value. The HARQ entity may deliver the MAC PDU, the uplink grant and the HARQ information to a HARQ process identified by the HARQ process ID (e.g., process ID=k). The HARQ entity may instruct the HARQ process to trigger a new transmission for a first TB comprising the MAC PDU. The HARQ process may store the MAC PDU in an associated HARQ buffer and store the uplink grant. The HARQ process may instruct the wireless device 2704 (e.g., a physical layer of the wireless device 2704) to generate a new transmission for the first TB, for example, based on the stored uplink grant. At or after time $t_1$, the wireless device 2704 (e.g., the physical layer of the wireless device 2704) may transmit the first TB based on the stored uplink grant. The wireless device may set the first NDI value (e.g., 1) as a new NDI value, for example, based on transmission of the first TB.

The base station 2702 may provide a subsequent uplink grant, to the wireless device 2704, for transmitting a second TB. The base station 2702 may provide the subsequent uplink grant, for example, after the base station 2702 successfully receives the first TB. The base station 2702 may transmit a second DCI indicating the new transmission. The second DCI may comprise a same HARQ process ID as the first HARQ process ID, a second uplink grant, a RV value, and a second NDI value (e.g., 0). The wireless device 2704 may determine that the second NDI value is different from the first NDI value (e.g., 1)/the new NDI value. The wireless device 2704 may determine that the second NDI value is toggled with respect to the new NDI value. A HARQ entity of the wireless device 2704 may determine/obtain a second MAC PDU (e.g., from the multiplexing and assembly entity), for example, based on the second NDI value being different from (e.g., toggled with respect to) first NDI value/new NDI value. The HARQ entity may deliver the second MAC PDU, the second uplink grant, and second HARQ information to the HARQ process (e.g., identified by process ID=k). The HARQ entity may instruct the HARQ process to trigger a new transmission for the second TB (e.g., comprising the second MAC PDU). The HARQ process may store the second MAC PDU in an associated HARQ buffer and store the second uplink grant. The HARQ process may instruct the wireless device 2704 (e.g., the physical layer of the wireless device 2704) to generate a new transmission for the second TB according to the second uplink grant. At or after time $t_2$, the wireless device 2704 may transmit the second TB according to the second uplink grant.

A communication protocol (e.g., 4G or 5G wireless communication protocol) may support multiple types of services. Wireless devices (e.g., operating according to the communication protocol) may transmit different data packets for the different services. The multiple types of services may comprise, for example, at least one of: an ultra-reliable low-latency communication (URLLC); an enhanced mobile broadband service (eMBB); a machine type communication (MTC); and/or a vehicle to vehicle (or vehicle to everything) communication (V2X). A first data packet (e.g., a URLLC data packet) of a first wireless device may be multiplexed with a second data packet (e.g., an eMBB data packet) of a second wireless device (e.g., on a PUSCH resource). The first data packet may be transmitted with a first transmission format (e.g., a first numerology or a first scheduling granularity) on a first PUSCH resource. The second data packet may be transmitted with a second transmission format (e.g., a second numerology or a second scheduling granularity) on a second PUSCH resource. The first PUSCH resource may be a portion of the second PUSCH resource. The first PUSCH resource may overlap (e.g., fully or partially) in time with the second PUSCH resource. The second PUSCH resource may be allocated for the second wireless device by an uplink grant indicated via a PDCCH. The first data packet of the first wireless device may be transmitted on the first PUSCH resource, for example, if the first data packet is associated with a lower latency than the second data packet. The first data packet and second data packets may be associated with respective (e.g., same or different) service types. The base station may receive the first data packet from the first wireless device on the first PUSCH resource and the second data packet from the second wireless device on the second PUSCH resource. Reception of the first data packet on the first PUSCH resource may result in reception/decoding errors at the base station, for example, if the first PUSCH resource is a portion of the second PUSCH resource (e.g., used for transmission of the second data packet from the second wireless device). The base station may wrongly detect that the second data packet from the second wireless device is a part of first data packet from the first wireless device.

A wireless device (e.g., operating according to the communication protocol) may transmit different data packets for different services (e.g., a URLLC service, an eMBB service, an MTC service, a V2X service, etc.). A first data packet (e.g., a URLLC data packet) of the wireless device may be multiplexed with a second data packet (e.g., an eMBB data packet) of the wireless device (e.g., on a PUSCH resource). The first data packet may be transmitted with a first transmission format (e.g., a first numerology or a first scheduling granularity) on a first PUSCH resource. The second data packet may be transmitted with a second transmission format (e.g., a second numerology or a second scheduling granularity) on a second PUSCH resource. The first PUSCH resource may be a portion of the second PUSCH resource. The first PUSCH resource may overlap (e.g., fully or partially) in time with the second PUSCH resource. The second PUSCH resource may be allocated for the second wireless device by an uplink grant indicated via a PDCCH. The first data packet of the first wireless device may be transmitted on the first PUSCH resource, for example, if the first data packet is associated with a lower latency than the second data packet. The first data packet and second data packets may be associated with respective (e.g., same or different) service types. The base station may receive the first data packet on the first PUSCH resource and the second data packet on the second PUSCH resource. Reception of the first data packet on the first PUSCH resource may result in reception/decoding errors at the base station, for example, if the first PUSCH resource is a portion of the second PUSCH resource (e.g., used for transmission of the second data packet from the wireless device). The base station may wrongly detect that the second data packet is a part of first data packet.

A base station may cancel or delay (e.g., pre-empt) transmission of lower priority data (e.g., eMBB data) from a first wireless device, for example, if the lower priority data may overlap (e.g., in time and/or frequency) with higher priority data (e.g., URLLC data) from a second wireless device. A base station may pre-empt transmission of first data corresponding to a first transmission format (e.g., from a first wireless device), for example, if the first data overlaps (e.g., in time and/or frequency) with data corresponding to a second transmission format.

A base station may cancel or delay (e.g., pre-empt) transmission of lower priority data (e.g., eMBB data) from a wireless device, for example, if the lower priority data may overlap (e.g., in time and/or frequency) with higher priority data (e.g., URLLC data) from the wireless device. A base station may pre-empt transmission of first data corresponding to a first transmission format, for example, if the first data overlaps (e.g., in time and/or frequency) with data corresponding to a second transmission format.

A base station may transmit DCI comprising fields indicating one or more uplink pre-emption indications to a wireless device (e.g., the second wireless device) or a group of wireless devices (e.g., comprising the second wireless device), indicating if one or more time/frequency resources are pre-empted (e.g., reserved for the first wireless device).

Figure 28:
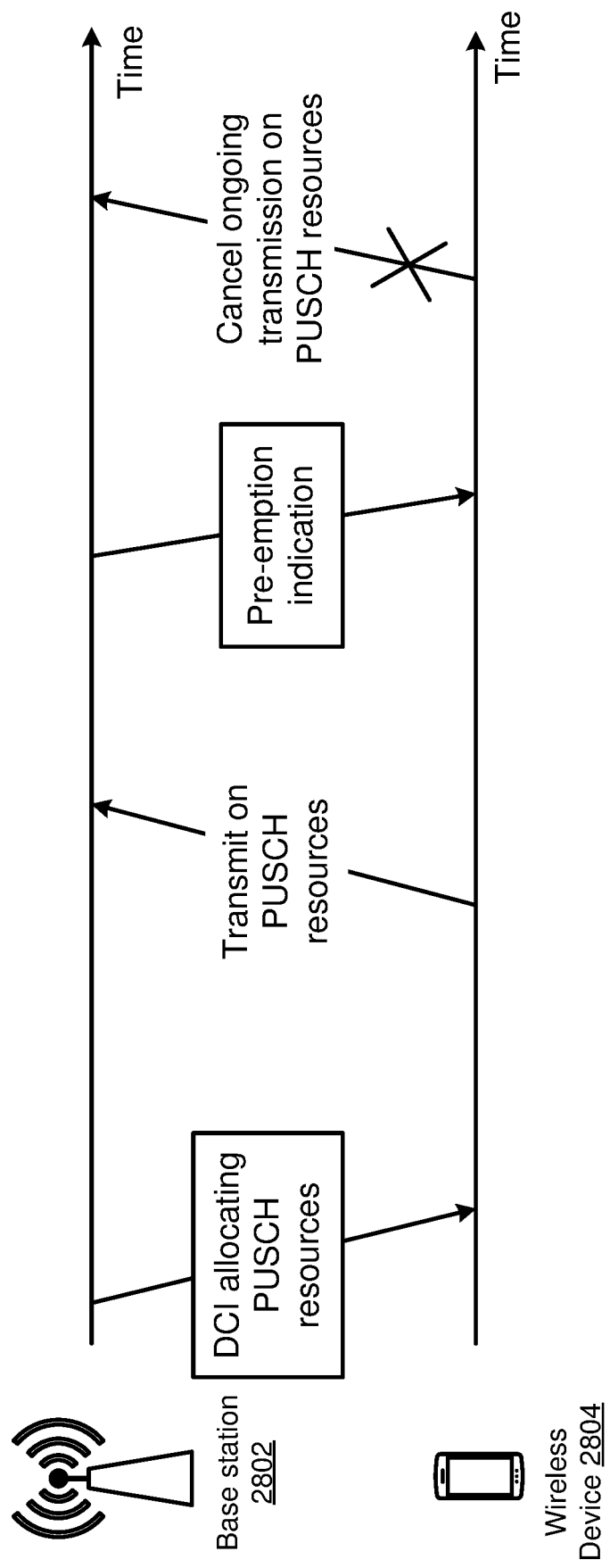
FIG. 28 shows an example for uplink pre-emption.

FIG. 28 shows an example uplink pre-emption mechanism. A base station 2802 may transmit to a wireless device 2804, first DCI comprising a first uplink grant. The uplink grant may comprise/indicate PUSCH resources for uplink transmissions. The wireless device 2804 may start sending (e.g., transmitting) a TB on the first uplink grant, for example, based on receiving the DCI. The wireless device 2804 may receive an uplink pre-emption indication from the base station. The uplink pre-emption indication may comprise a cancellation indication, a stop indication, and/or a suspend indication. The uplink pre-emption indication may indicate that at least a part of the PUSCH resources is pre-empted, and/or the wireless device 2804 may stop uplink transmission on the at least part of the PUSCH resources. The wireless device 2804 may stop the ongoing uplink transmission on the at least part of the PUSCH resources, wherein the at least part of the PUSCH resources are pre-empted based on the uplink pre-emption indication, for example, based on the uplink pre-emption indication. The base station 2802 may transmit DCI comprising the uplink pre-emption indication. The DCI may be transmitted to a wireless device addressed by a C-RNTI, or be transmitted to a group of wireless devices addressed by a group RNTI. The base station 2802 may transmit a MAC CE comprising the uplink pre-emption indication. The base station 2802 may transmit a signal sequence (e.g., a CSI-RS/DMRS) comprising the uplink pre-emption indication. The base station 2802 may transmit second DCI to a second wireless device (e.g., a URLLC wireless device). The second DCI may indicate a second uplink grant comprising the at least part of the PUSCH resources, where the PUSCH resources are allocated in the first DCI for the wireless device 2804. The second wireless device may transmit uplink data via the second uplink grant, for example based on (e.g., in response to) receiving the second DCI.

The base station 2802 may transmit second DCI to the wireless device 2804, where the second DCI indicates a transmission of a second uplink data (e.g., an uplink data unit associated with low transmission latency, e.g., an uplink data associated with a URLLC service). The second DCI may indicate a second uplink grant comprising the at least part of the PUSCH resources, where the PUSCH resources are allocated in the first DCI for the first wireless device 2804. The wireless device 2804 may transmit the second uplink data via the second uplink grant, for example based on (e.g., in response to) receiving the second DCI.

Figure 29:
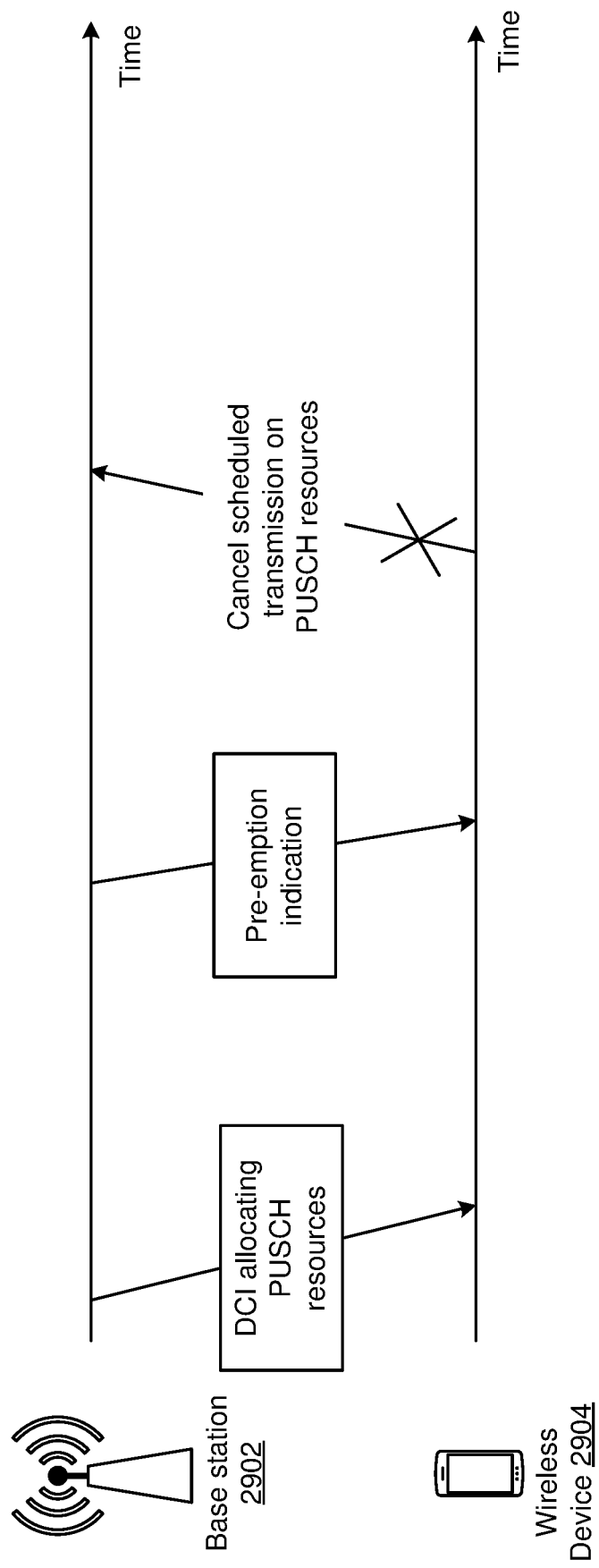
FIG. 29 shows an example for uplink pre-emption.

FIG. 29 shows an example uplink pre-emption mechanism. A scheduled (e.g., upcoming) uplink transmission may be canceled based on an uplink pre-emption indication. A base station 2902 may transmit to a wireless device 2904, first DCI comprising a first uplink grant. The uplink grant may comprise PUSCH resources. The wireless device 2904 may generate a TB based on the first DCI. The wireless device 2904 may receive an uplink pre-emption indication from the base station, for example, prior to starting an uplink transmission of the TB. The uplink pre-emption indication may comprise a cancellation indication, a stop indication, and/or a suspension indication. The uplink pre-emption indication may indicate that at least a part of the PUSCH resources is pre-empted, and/or the wireless device 2904 may stop uplink transmission on the at least part of the PUSCH resources. The wireless device 2904 may stop scheduled (e.g., upcoming) uplink transmission on the at least part of the PUSCH resources, wherein the at least part of the PUSCH resources are pre-empted based on the uplink pre-emption indication. The base station 2902 may transmit DCI comprising the uplink pre-emption indication. The DCI may be transmitted to a wireless device addressed by a C-RNTI, or be transmitted to a group of wireless devices addressed by a group RNTI. The base station 2902 may transmit a MAC CE comprising the uplink pre-emption indication. The base station 2902 may transmit a signal sequence (e.g., a CSI-RS/DMRS) comprising the uplink pre-emption indication. The base station 2902 may transmit second DCI to a second wireless device (e.g., a URLLC wireless device), for example, based on (e.g., after or in response to) transmitting the uplink pre-emption indication. The second DCI may indicate a second uplink grant comprising the at least part of the PUSCH resources, where the PUSCH resources are allocated in the first DCI for the first wireless device 2904. The second wireless device may transmit uplink data via the second uplink grant, for example, based on receiving the second DCI.

Figure 30:
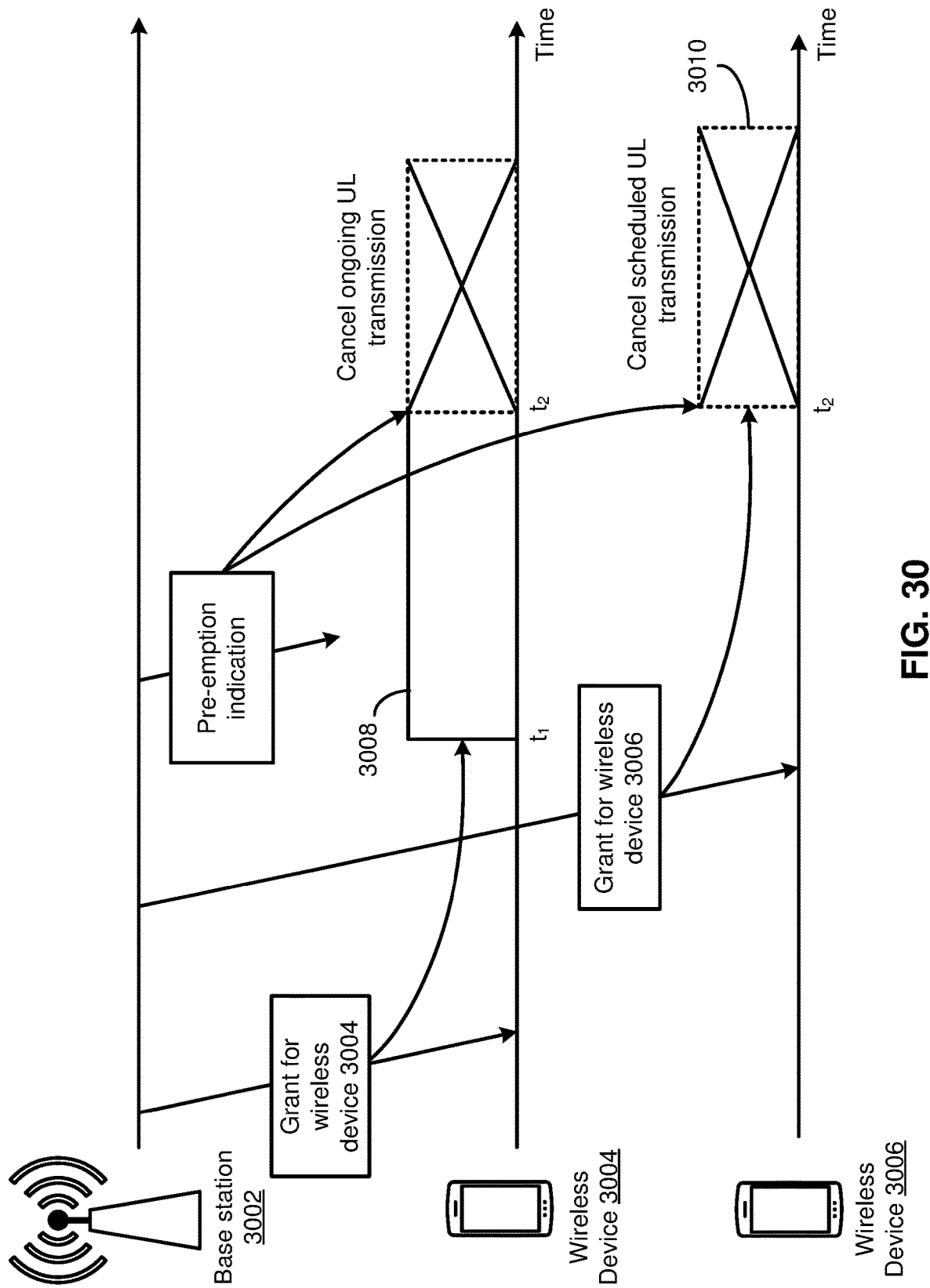
FIG. 30 shows an example for uplink pre-emption.

FIG. 30 shows an example of group uplink cancellation based on an uplink pre-emption indication. A base station 3002 may send (e.g., transmit) to a wireless device 3004, first DCI comprising a first uplink grant. The first uplink grant may comprise first PUSCH resources. The base station 3002 may send (e.g., transmit) to a wireless device 3006, second DCI comprising a second uplink grant. The second uplink grant may comprise second PUSCH resources. The base station 3002 may send (e.g., transmit) an uplink pre-emption indication to the wireless device 3004 and the wireless device 3006, for example, in a group command DCI.

At or after time $t_1$, the wireless device 3004 may send (e.g., transmit) an uplink transmission 3008 on the first uplink grant. The wireless device 3004 may receive the uplink pre-emption indication, for example, after wireless device 3004 starts the uplink transmission 3008 on the first uplink grant. The wireless device 3006 may receive the uplink pre-emption indication, for example, prior to the wireless device 3006 starting an uplink transmission on the second uplink grant.

The uplink pre-emption indication may comprise a cancellation indication, a stop indication, a suspension indication, or any other indication. The base station 3002 may transmit DCI comprising the uplink pre-emption indication. The DCI may be transmitted to a group of wireless devices (e.g., wireless device 3004 and wireless device 3006) addressed by a group RNTI.

At or after time $t_2$, the wireless device 3004 may stop the uplink transmission 3008, for example, based on the uplink pre-emption indication. The wireless device 3006 may be pre-empted from any uplink transmission, for example, based on the uplink pre-emption indication. The wireless device 3006 may not start the uplink transmission 3010, for example, based on the uplink pre-emption indication. The uplink pre-emption indication may indicate that any uplink transmission from the wireless device 3006 may be stopped at a first symbol that is earlier than a second symbol on which the uplink transmission 3010 is scheduled to begin.

The wireless device 3004 may stop ongoing uplink transmission 3008 on at least first part of the first uplink grant, for example, based on the uplink pre-emption indication. The wireless device 3006 may stop scheduled uplink transmission 3010 on at least second part of the second uplink grant, based on the uplink pre-emption indication. The uplink pre-emption indication may indicate that the at least first part of the first uplink grant is pre-empted, and/or the at least second part of the second uplink grant is pre-empted. The base station 3002 may transmit a third DCI to a third wireless device (e.g., a URLLC wireless device), for example, based on (e.g., after or in response to) transmitting the uplink pre-emption indication. The third DCI may indicate a third uplink grant comprising the at least first part of the first uplink grant and/or the at least second part of the second uplink grant. The third wireless device may transmit uplink data via the third uplink grant, for example, based on (e.g., after or in response) to receiving the third DCI.

A wireless device may receive an uplink grant (e.g., in first DCI or an RRC message). The uplink grant may be dynamic or semi-persistent. The wireless device may receive a message (e.g., an uplink pre-emption indication) cancelling an uplink transmission via the uplink grant. The wireless device may cancel the uplink transmission (e.g., ongoing or scheduled) on an uplink grant, for example, based on receiving the uplink pre-emption indication. The wireless device may receive a new uplink grant (e.g., in second DCI), for example, after canceling the uplink transmission. The wireless device may determine if an NDI value received in the second DCI is different from (e.g., toggled with respect to) a stored NDI value stored at the wireless device.

The wireless device may be unable to set a value of a stored NDI, for example, if the wireless device cancels the uplink transmission of the TB based on the uplink pre-emption indication. The wireless device may be unable to determine whether the new uplink grant in the second DCI is for a new transmission or a retransmission, for example, if the wireless device is unable to set a value of stored NDI. For example, it may be unclear whether the wireless device should treat the cancelled uplink transmission as a transmission which has been performed, whether the wireless device should treat the cancelled uplink transmission as a transmission that has not been performed, or whether the wireless device should treat the cancelled uplink transmission in any other manner (e.g., as cancelled or not cancelled based on one or more criteria). A base station and a wireless device may not be aligned with respect to a status of an NDI value stored in the wireless device, for example, if the wireless device cancels (or does not cancel) the uplink transmission of the TB based on the uplink pre-emption indication and the base station may not be informed of such cancellation (or lack of cancellation).

A base station may request an initial transmission of a first TB, and a wireless device may incorrectly retransmit a second TB, for example, if the wireless device is unable to set a value of a stored NDI. The base station may request a retransmission of a first TB, and the wireless device may incorrectly transmit a second TB, for example, if the wireless device is unable to set a value of a stored NDI. This lack of base station and wireless device synchronization may result in reduced system throughput, increased data transmission latency, and/or increased power consumption of the wireless device.

Various examples described herein may improve performance by aligning a base station and a wireless device with respect a status of an uplink transmission process (e.g., a HARQ process). A base station and a wireless device may be aligned with respect to a status of a data indicator (e.g., an NDI value) stored in the wireless device, for example, if an uplink transmission is cancelled. The wireless device may determine/assume (or consider) that the uplink transmission has been performed, for example, even if the uplink transmission is cancelled. The wireless device may determine/assume (or consider) that an uplink transmission of a TB has been performed, for example, based on/in response to the uplink transmission being cancelled (e.g., based on a pre-emption indication or any other indication). The wireless device may determine/assume (or consider) that an uplink transmission of a TB has been performed, for example, based on/in response to the uplink transmission being deprioritized (e.g., based on a pre-emption indication or any other indication). The wireless device may store a data indicator (e.g., an NDI) received in control information (e.g., DCI) comprising an uplink grant and/or store a data unit (e.g., a MAC PDU) associated with a HARQ process in response to an uplink transmission via the uplink grant, of a TB associated with the HARQ process being cancelled (e.g., based on the pre-emption indication). Storing the data indicator received in the control information (e.g., even if the uplink transmission is cancelled) and/or storing the data unit (e.g., the MAC PDU) may enable the wireless device and the base station to be aligned with respect to a status of the uplink transmission process. Alignment of the base station and the wireless device may enable the base station to request a retransmission of the data unit or a transmission of a next data unit with lower signaling overhead and error rates. Storing the data unit may enable faster response times at the wireless device. The enhancements described herein may improve system throughput, reduce data transmission latency, and/or reduce power consumption of the wireless device.

Figure 31:
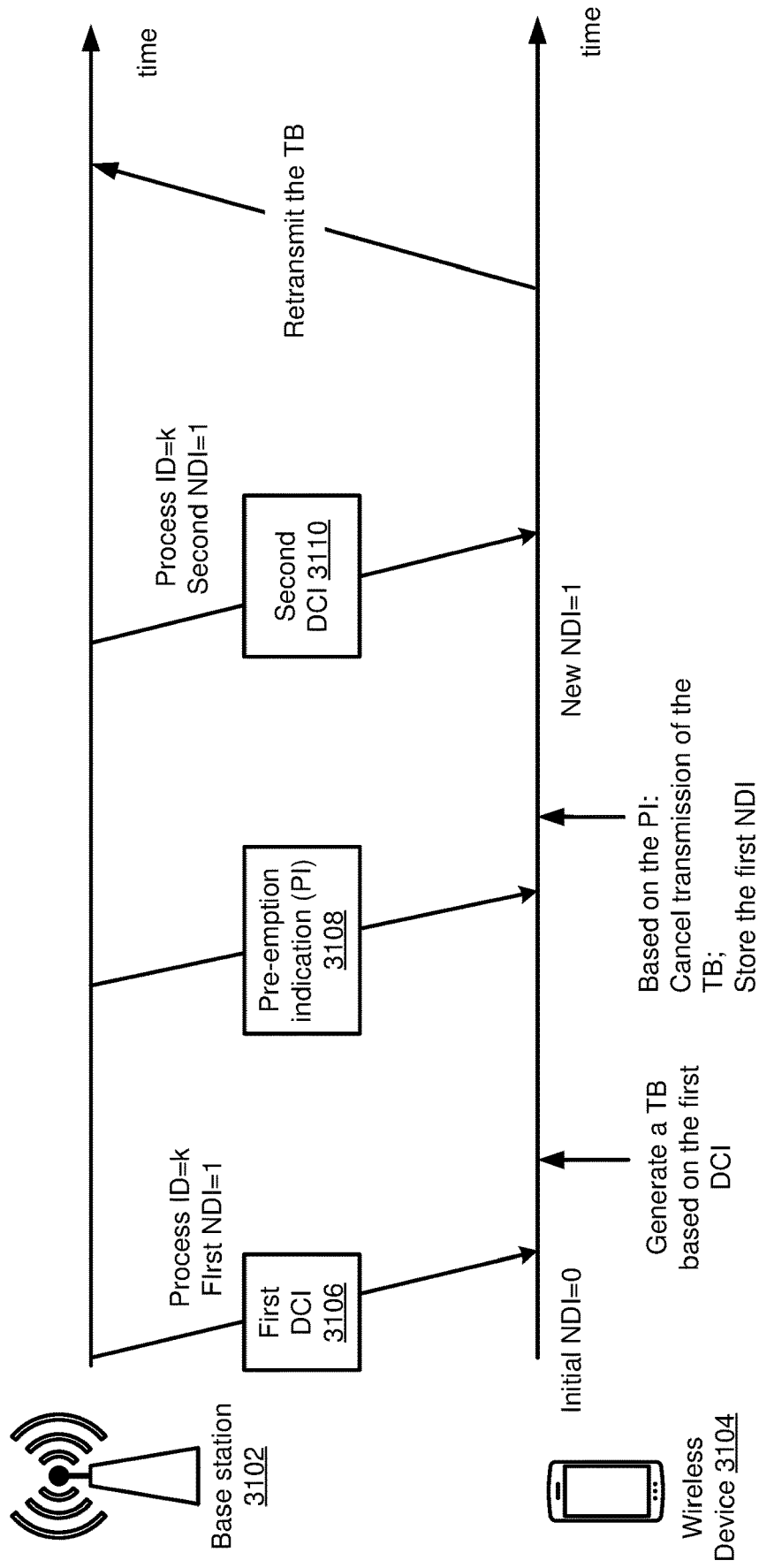
FIG. 31 shows an example of an enhanced HARQ operation.

FIG. 31 shows an example of enhanced HARQ procedure. The HARQ procedure may support an uplink pre-emption indication. A base station 3102 may transmit to a wireless device 3104, first DCI 3106. The first DCI 3106 may comprise an uplink grant and first HARQ information. The first HARQ information may comprise a HARQ process indicator/ID (e.g., process ID=k) and a first NDI value (e.g., 1).

The wireless device 3104 may store an NDI value (e.g., in a memory, associated with a HARQ process identified by the HARQ process ID, of the wireless device). The NDI value may be associated with a HARQ process identified by a HARQ process ID. The wireless device 3104 may (may have an initial NDI value (e.g., 0), for example, before receiving the first DCI 3106. The wireless device 3104 may determine that the first NDI value (e.g., 1) is different from the initial NDI value (e.g., 0). The wireless device 3104 may determine that the first NDI value is toggled with respect to the initial NDI value. The wireless device 3104 (e.g., the HARQ entity of the wireless device 3104) may obtain a MAC PDU (e.g., from a multiplexing and assembly entity of the wireless device 3104), for example. based on the first NDI value being different from the initial NDI value. The HARQ entity may deliver the MAC PDU, the uplink grant, and the first HARQ information to a HARQ process identified by the HARQ process ID (e.g., process ID=k). The HARQ entity may instruct the HARQ process to trigger an initial (or a new) transmission for a first TB comprising the MAC PDU. The HARQ process may store the MAC PDU in an associated HARQ buffer and store the uplink grant. The HARQ process may instruct the wireless device 3104 (e.g., the physical layer of the wireless device 3104) to generate the initial (or the new) transmission for the first TB, for example, based on the stored uplink grant.

The wireless device 3104 (e.g., the physical layer of the wireless device 3104) may receive an uplink pre-emption indication 3108 from the base station 3102. The wireless device 3104 may receive the uplink pre-emption indication 3108 from the base station 3102, for example, prior to starting a transmission for a first TB based on the stored uplink grant. The uplink pre-emption indication 3108 may indicate that the wireless device 3104 may cancel/suspend/stop the transmission for the first TB on at least one of PUSCH resources of the uplink grant. The wireless device 3104 (e.g., the physical layer of the wireless device 3104) may cancel the transmission for the first TB on the at least one of the PUSCH resources of the uplink grant. The wireless device 3104 (e.g., a HARQ entity of the wireless device 3104) may store the first NDI value as a new NDI value and/or store a MAC PDU associated with the first TB in response to cancelling the transmission for the first TB. The HARQ entity of the wireless device 3104 may consider that the first TB has been transmitted by the wireless device 3104, for example, even if the wireless device 3104 has cancelled the transmission of the first TB based on the uplink pre-emption indication 3108.

The wireless device 3104 (e.g., the physical layer of the wireless device 3104) may receive second DCI 3110. The second DCI 3110 may comprise a same HARQ process ID as the first HARQ process ID, a second uplink grant, an RV value, and a second NDI value (e.g., 1). The physical layer may deliver the second uplink grant and second HARQ information (e.g., the first HARQ process ID, the RV value, and/or the second NDI value) to a MAC layer of the wireless device 3104. The MAC layer may deliver the uplink grant and the one or more HARQ information to a HARQ entity of the wireless device 3104. The HARQ entity may determine/identify a HARQ process, for example, based on the first HARQ process ID in the second DCI 3110. The HARQ entity may determine if the second NDI value is the different from (e.g., toggled with respect to) the new NDI value/the first NDI value. The HARQ entity may determine that the second NDI value (e.g., 1) is the same as/substantially the same as (e.g., not toggled with respect to) the new NDI value/the first NDI value (e.g., 1).

The HARQ entity may instruct the HARQ process to trigger a retransmission of the first TB, for example, based on the second NDI value (e.g., 1) being the same as/substantially the same as (e.g., not toggled with respect to) the new NDI value/the first NDI value. The HARQ process may instruct the wireless device 3104 (e.g., the physical layer of the wireless device 3104) to generate a retransmission of the first TB. The wireless device 3104 (e.g., the physical layer of the wireless device 3204) may retransmit the first TB according to the second uplink grant. The wireless device 3104 (e.g., the HARQ entity of the wireless device 3104), may store the first NDI value as the new NDI value, for example, before cancelling uplink transmission based on the uplink pre-emption indication 3108. The HARQ entity may determine (e.g., assume/consider) that the TB has been transmitted by the physical layer, for example, even if the physical layer has cancelled the uplink transmission based on the uplink pre-emption indication 3108. The HARQ entity may correctly determine if an initial transmission or a retransmission is required, for example, based on receiving the second DCI 3110 with the second NDI value and based on a comparison between the second NDI value and the stored new NDI value. This may enable alignment between the base station 3102 and the wireless device 3104 with respect to a status of an uplink HARQ process that supports an uplink pre-emption mechanism (e.g., for multiplexing different transmissions with different transmission formats). The alignment may improve system throughput, reduce data transmission latency, and/or reduce power consumption of the wireless device 3104.

Figure 32:
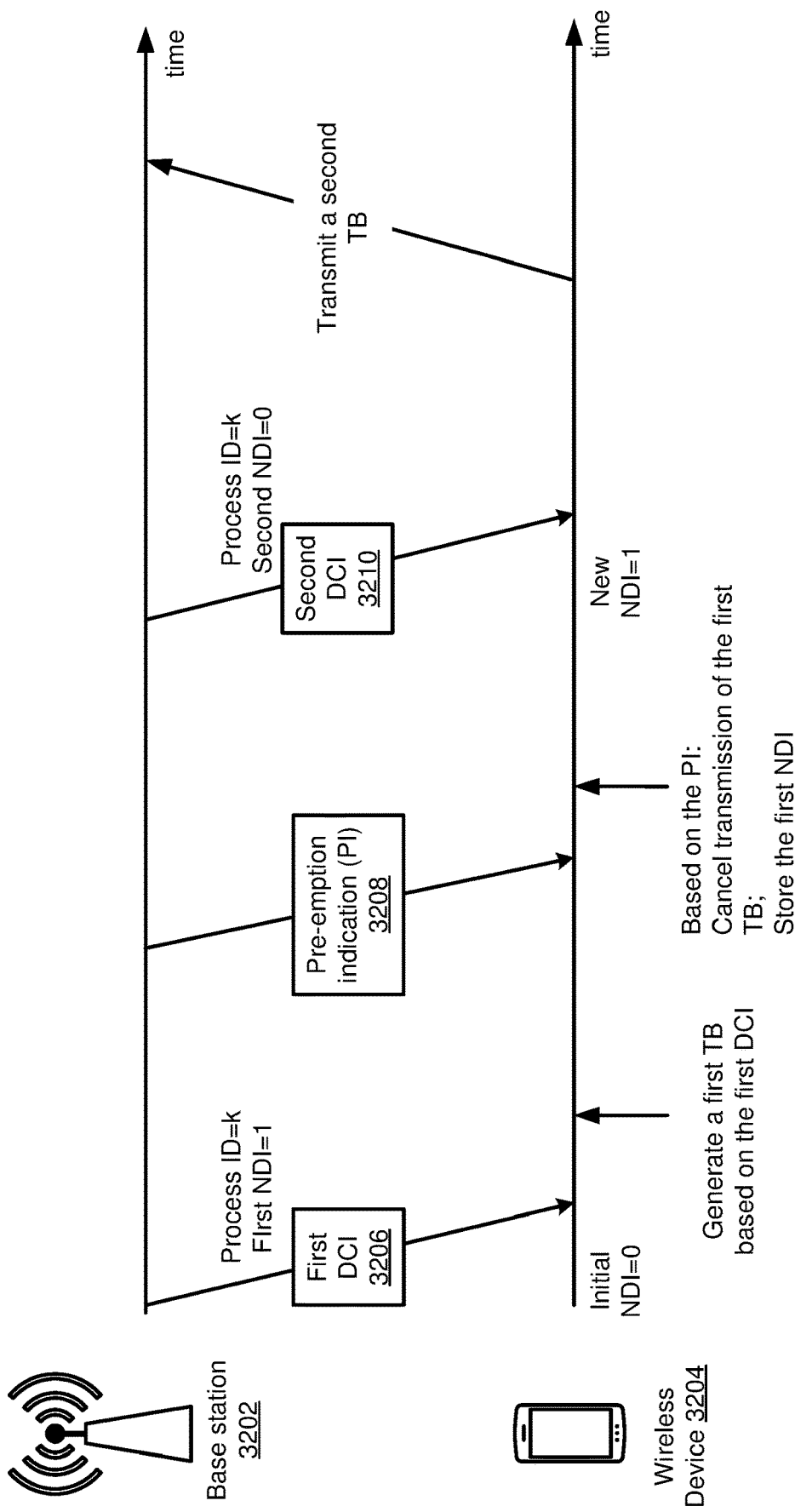
FIG. 32 shows an example of an enhanced HARQ operation.

FIG. 32 shows an example of enhanced HARQ procedure. The HARQ procedure may support uplink pre-emption indication. A base station 3202 may transmit to a wireless device 3204, first DCI 3206. The first DCI 3206 may comprise an uplink grant and first HARQ information. The first HARQ information may comprise a HARQ process ID (e.g., process ID=k as shown in FIG. 32) and a first NDI value (e.g., 1).

The wireless device 3104 may store an NDI value (e.g., in a memory associated with the wireless device). The NDI value may be associated with a HARQ process identified by a HARQ process ID. The wireless device 3104 may have an initial NDI value (e.g., 0), for example, before receiving the first DCI 3206. The wireless device 3204 may determine that the first NDI value (e.g., 1) is different from the initial NDI value (e.g., 0). The wireless device 3204 may determine that the first NDI value is toggled with respect to the initial NDI value. The wireless device 3204 (e.g., a HARQ entity of the wireless device 3204) may obtain a MAC PDU (e.g., from a multiplexing and assembly entity of the wireless device 3204), for example, based on the first NDI value being different from the initial NDI value. The HARQ entity may deliver the MAC PDU, the uplink grant and the first HARQ information to a HARQ process identified by the HARQ process ID (e.g., process ID=k). The HARQ entity may instruct the HARQ process to trigger an initial (or a new) transmission for a first TB comprising the MAC PDU. The HARQ process may store the MAC PDU in an associated HARQ buffer, and store the uplink grant. The HARQ process may instruct the wireless device 3204 (e.g., the physical layer of the wireless device 3204) to generate an initial (or a new) transmission for the first TB according to the stored uplink grant.

The wireless device 3204 (e.g., the physical layer of the wireless device 3204) may receive, from the base station 3202, an uplink pre-emption indication 3208. before starting a transmission of a first TB according to an uplink grant. The uplink pre-emption indication 3208 may indicate that the wireless device 3204 may cancel/suspend/stop) transmission of the first TB on at least one of PUSCH resources of the uplink grant. The wireless device 3204 (e.g., the physical layer of the wireless device 3204) may cancel the transmission of the first TB on the at least one of the PUSCH resources of the uplink grant. The wireless device 3204 (e.g., the HARQ entity of the wireless device 3204) may store the first NDI value as the new NDI value. The HARQ entity of the wireless device 3204 may determine/consider that the first TB has been transmitted by the wireless device 3204, for example, even if the wireless device 3204 has cancelled the transmission of the first TB based on the uplink pre-emption indication 3208.

The wireless device 3204 (e.g., the physical layer of the wireless device 3204) may receive second DCI 3210. The second DCI 3210 may comprise a same HARQ process ID as the first HARQ process ID, a second uplink grant, a RV value, and a second NDI value (e.g., The physical layer may deliver the second uplink grant and second HARQ information (e.g., the first HARQ process ID, the RV value, and/or the second NDI value) to a MAC layer of the wireless device 3204. The MAC entity may deliver the uplink grant and the second HARQ information to a HARQ entity of the wireless device 3204. The HARQ entity may determine/identify a HARQ process, for example, based on the first HARQ process ID in the second DCI 3210. The HARQ entity may determine that the second NDI value is different from (e.g., toggled with respect to) to the new NDI value/the first NDI value.

The HARQ entity may instruct the HARQ process to trigger an initial (or a new) transmission of a second TB, for example, based on the second NDI value being different from the new NDI value/the first NDI value. The HARQ process may instruct the physical layer to generate an initial (or a new) transmission of the second TB. The wireless device 3204 (e.g., the physical layer of the wireless device 3204) may transmit the second TB as the initial (or new) transmission according to the second uplink grant. The wireless device 3204 (e.g., the HARQ entity of the wireless device 3204) may store the first NDI value as the new NDI value, for example, before cancelling uplink transmission based on the uplink pre-emption indication 3208. The HARQ entity may determine (e.g., assume/consider) that the first TB has been performed by the physical layer, for example, even if the physical layer has cancelled the uplink transmission based on an uplink pre-emption indication 3208. The HARQ entity may correctly determine if an initial transmission or a retransmission is to be performed, for example, based on receiving the second DCI 3210 with the second NDI value and based on a comparison between the second NDI value and the new NDI value. This may enable alignment between the base station 3202 and the wireless device 3204 with respect to a status of an uplink HARQ process that supports an uplink pre-emption mechanism (e.g., for multiplexing different transmissions with different transmission formats). The alignment may improve system throughput, reduce data transmission latency, and/or reduce power consumption of the wireless device 3204.

Figure 33:
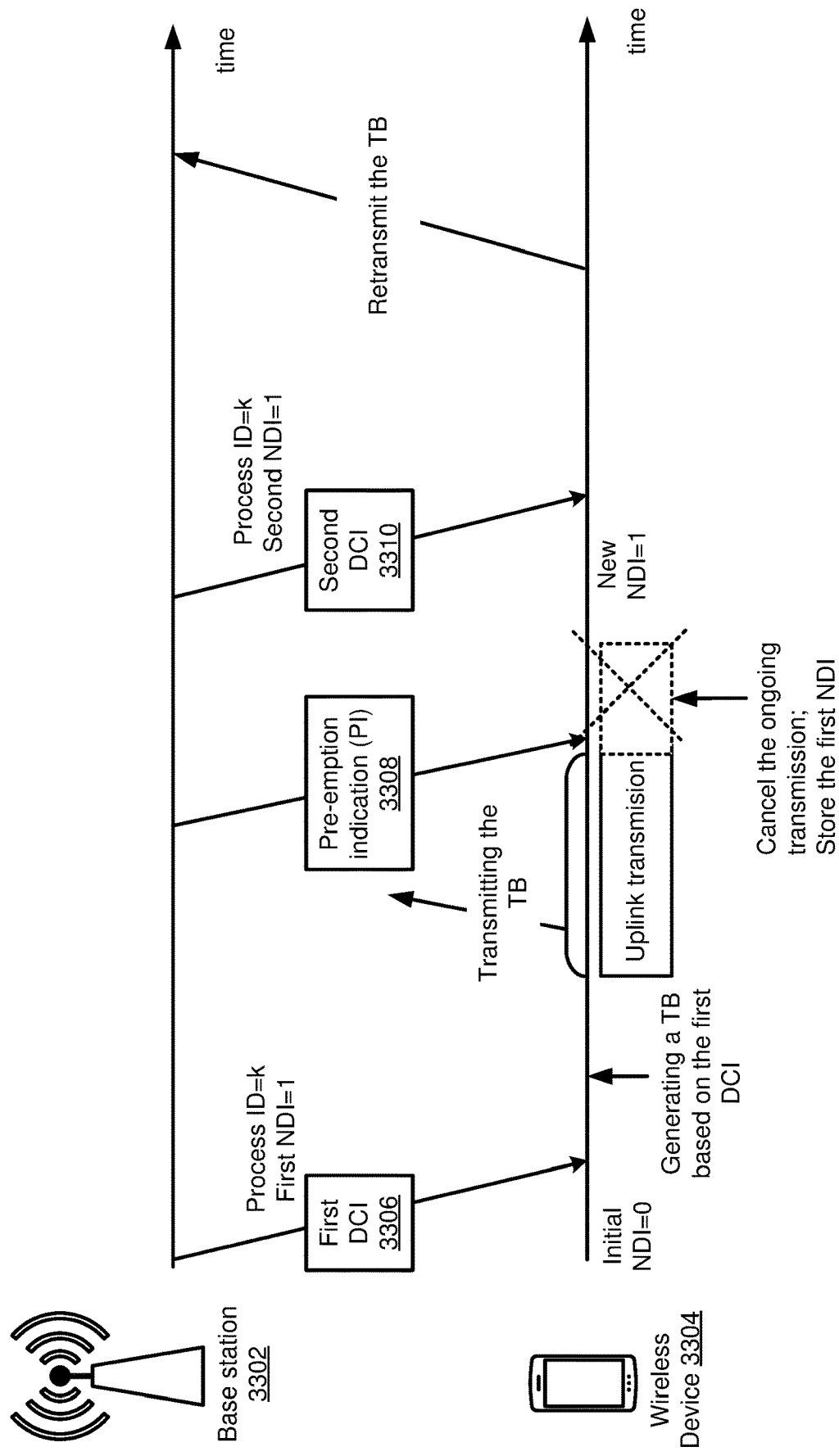
FIG. 33 shows an example of an enhanced HARQ operation.

FIG. 33 shows an example of an enhanced HARQ procedure. The HARQ procedure may support an uplink pre-emption indication. A base station 3302 may transmit, to a wireless device 3304, first DCI 3306. The first DCI 3306 may comprise an uplink grant and first HARQ information. The first HARQ information may comprise a HARQ process ID (e.g., process ID=k) and a first NDI value (e.g., 1).

The wireless device 3304 may store an NDI value (e.g., in a memory, associated with a HARQ process identified by a HARQ process ID, of the wireless device 3304). The NDI value may be associated with a HARQ process identified by a HARQ process ID. The wireless device 3304 may have an initial NDI value (e.g., 0), for example, before receiving the first DCI 3306. The wireless device 3304 may determine that the first NDI value (e.g., 1) is different from the initial NDI value (e.g., 0). The wireless device 3304 may determine that the first NDI is toggle with respect to the initial NDI value. The wireless device 3304 (e.g., a HARQ entity of the wireless device 3304) may obtain a MAC PDU (e.g., from a multiplexing and assembly entity of the wireless device 3304), for example, based on the the first NDI being different from the initial NDI value. The HARQ entity may deliver the MAC PDU, the uplink grant and the first HARQ information to a HARQ process identified by the HARQ process ID (e.g., process ID=k). The HARQ entity may instruct the HARQ process to trigger an initial (or a new) transmission for a first TB comprising the MAC PDU. The HARQ process may store the MAC PDU in an associated HARQ buffer and store the uplink grant. The HARQ process may instruct the wireless device 3304 (e.g., the physical layer of the wireless device 3304) to generate an initial (or a new) transmission for the first TB, for example, based on the stored uplink grant. The wireless device 3304 (e.g., the physical layer of the wireless device 3304) may start the initial (or the new) transmission of the first TB on PUSCH resources, for example, based on the stored uplink grant.

The wireless device 3204 (e.g., the physical layer of the wireless device 3204) may receive, from the base station, an uplink pre-emption indication 3308, for example, if/when transmitting the first TB. The uplink pre-emption indication 3308 may indicate that the wireless device 3304 may stop/suspend/cancel) the transmission of the first TB on at least one of the PUSCH resources. The wireless device (e.g., the physical layer of the wireless device 3304) may stop an ongoing transmission of the first TB on the at least one of the PUSCH resources of the uplink grant, for example, based on the uplink pre-emption indication 3308. The wireless device 3304 may finish a transmission of a first part of the first TB and may not start a transmission of a second part of the first TB, for example, based on the uplink pre-emption indication 3308. The uplink pre-emption indication 3308 may indicate that the wireless may stop/suspend/cancel the transmission of the second part of the first TB on the at least one of the PUSCH resources. The wireless device 3304 (e.g., the HARQ entity of the wireless device 3304) may store the first NDI value as a new NDI value and/or store a MAC PDU associated with the first TB. The wireless device 3304 (e.g., the HARQ entity of the wireless device 3304) may determine (e.g., assume) that the first TB has been transmitted by the wireless device 3304, for example, even if the wireless device 3304 has finished a transmission of the first part of the first TB and has stopped a transmission of the second part of the first TB based on the uplink pre-emption indication 3308.

The wireless device 3304 (e.g., the physical layer of the wireless device 3304) may receive second DCI 3310. The second DCI 3310 may comprise a same HARQ process ID as the first HARQ process ID, a second uplink grant, a RV value, and a second NDI value (e.g., 1). The physical layer may deliver the second uplink grant and second HARQ information (e.g., the first HARQ process ID, the RV value, and/or the second NDI value) to a MAC layer of the wireless device 3304. The MAC entity may deliver the uplink grant and the second HARQ information to a HARQ entity of the wireless device. The HARQ entity may determine/identify a HARQ process, for example, based on the first HARQ process ID in the second DCI 3310. The HARQ entity may determine if the second NDI is the same as/substantially the same as the new NDI value/the first NDI value. The HARQ entity may determine that the second NDI value is the same as/substantially the same as (e.g., not toggled with respect to) the new NDI value/the first NDI value.

The HARQ entity may instruct the HARQ process to trigger a retransmission of the first TB. The HARQ process may instruct the physical layer to generate a retransmission of the first TB. The wireless device 3304 (e.g., the physical layer of the wireless device 3404) may retransmit the first TB, for example, based on the second uplink grant. The HARQ entity may store the first NDI value as the new NDI value, for example, before stopping an ongoing uplink transmission based on the uplink pre-emption indication 3308. The wireless device 3304 (e.g., the HARQ entity may determine (e.g., assume) that the first TB has been transmitted by the physical layer, for example, even if the physical layer, based on the uplink pre-emption indication 3308, has finished a transmission of a first part of the first TB and has not finished a transmission of a second part of the first TB. The HARQ entity may correctly determine if an initial transmission or a retransmission of the first TB is to be performed based on the stored new NDI value and the second NDI value, for example, based on the wireless device 3304 receiving the second DCI 3310 comprising the second NDI value. This may enable alignment between the base station 3302 and the wireless device 3304 regarding a status of an uplink HARQ process that supports an uplink pre-emption indication (e.g., for multiplexing different transmissions with different transmission formats). The alignment may improve system throughput, reduce data transmission latency, and/or reduce power consumption of the wireless device 3304.

Figure 34:
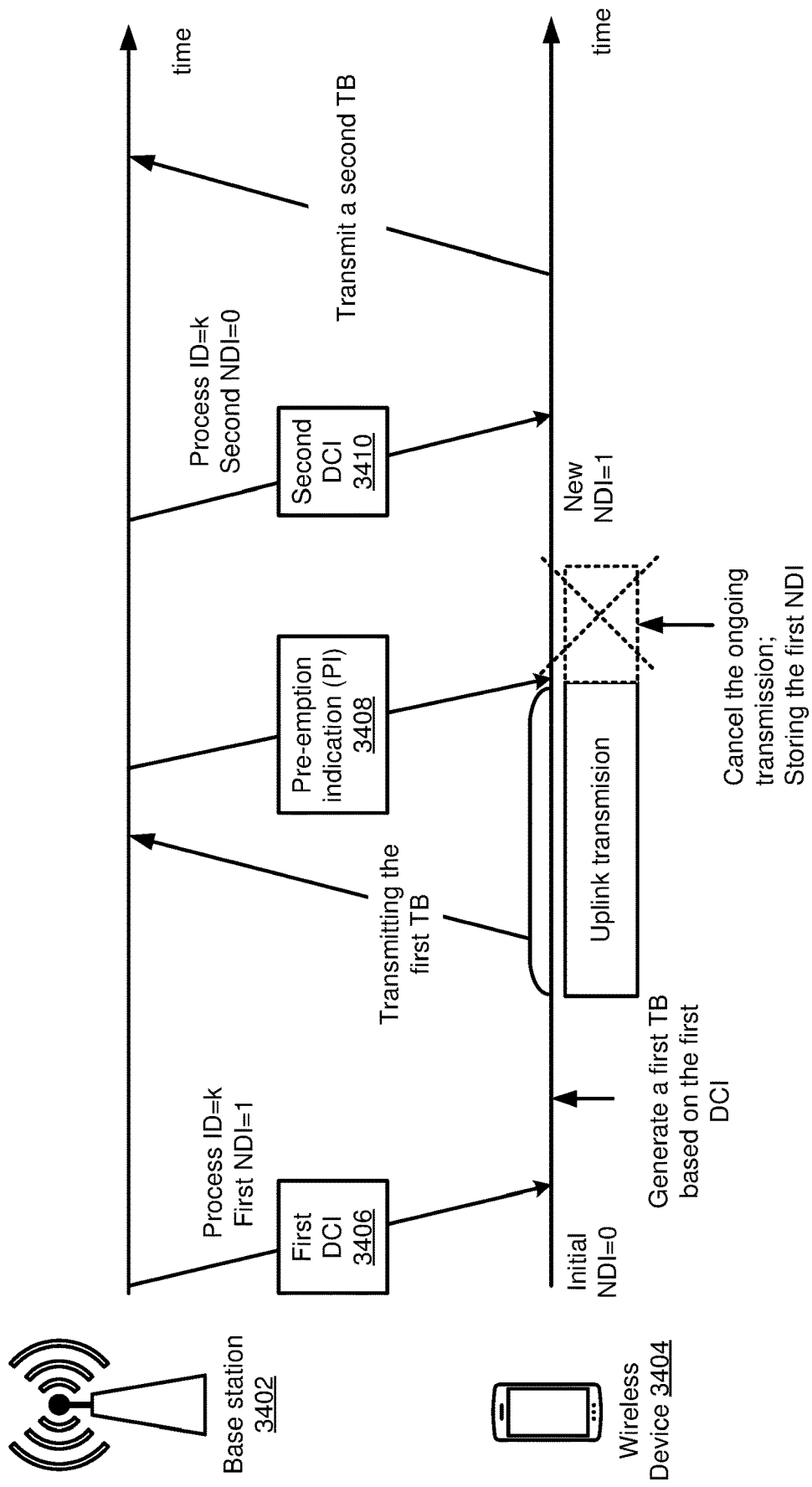
FIG. 34 shows an example of an enhanced HARQ operation.

FIG. 34 shows an example of an enhanced HARQ procedure. The HARQ procedure may support an uplink pre-emption indication. A base station 3402 may transmit, to a wireless device 3404, first DCI 3406. The first DCI 3406 may comprise an uplink grant and first HARQ information. The first HARQ information may comprise a HARQ process indicator/ID (e.g., process ID=k) and a first NDI value (e.g., 1).

The wireless device 3404 may store an NDI value (e.g., in a memory, associated with a HARQ process identified by a HARQ process ID, of the wireless device 3404). The NDI value may be associated with a HARQ process identified by a HARQ process ID. The wireless device 3404 may have an initial NDI value (e.g., 0), for example, before receiving the first DCI 3406. The wireless device 3404 may determine that the first NDI value (e.g., 1) is different from the initial NDI value (e.g., 0). The wireless device 3404 may determine that the first NDI value is toggled with respect to the initial NDI value. The wireless device 3404 (e.g., a HARQ entity of the wireless device 3404) may determine a MAC PDU (e.g., from a multiplexing and assembly entity of the wireless device 3404), for example, based on the first NDI value being different from the initial NDI value. The HARQ entity may deliver the MAC PDU, the uplink grant and the first HARQ information to a HARQ process identified by the HARQ process ID (e.g., process ID=k). The HARQ entity may instruct the HARQ process to trigger an initial (or a new) transmission of a first TB that comprises the MAC PDU. The HARQ process may store the MAC PDU in an associated HARQ buffer, and/or may store the uplink grant. The HARQ process may instruct the wireless device 3404 (e.g., the physical layer of the wireless device 3404) to generate an initial (or a new) transmission of the first TB, for example, based to the stored uplink grant. The wireless device 3404 (e.g., the physical layer of the wireless device 3404) may start the initial (or the new) transmission of the first TB on PUSCH resources, for example, based on the stored uplink grant.

The wireless device 3404 (e.g., the physical layer of the wireless device 3404) may receive, from the base station 3402, an uplink pre-emption indication 3408, for example, if/when transmitting the first TB. The uplink pre-emption indication 3408 may indicate that the wireless device 3404 may stop/suspend/cancel the transmission of the first TB on at least one of the PUSCH resources of the uplink grant. The wireless device 3404 (e.g., the physical layer of the wireless device 3404) may stop the ongoing transmission of the first TB on the at least one of the PUSCH resources of the uplink grant. The wireless device 3404 (e.g., the physical layer of the wireless device 3404) may finish a transmission of a first part of the first TB and may not start a transmission of a second part of the first TB, for example, based on the uplink pre-emption indication 3408. The uplink pre-emption indication 3408 may indicate that the wireless may stop/suspend/cancel the transmission of the second part of the first TB on the at least one of the PUSCH resources. The wireless device 3404 (e.g., a HARQ entity of the wireless device) may store the first NDI value as a new NDI value. The HARQ entity of the wireless device may determine/assume that the first TB has been transmitted by the physical layer even if the physical layer has finished a transmission of the first part of the first TB and has stopped a transmission of the second part of the first TB, for example, based on the uplink pre-emption indication 3408.

The wireless device 3404 (e.g., the physical layer of the wireless device 3404) may receive second DCI 3410. The second DCI 3410 may comprise a same HARQ process ID as the first HARQ process ID, a second uplink grant, a RV value, and a second NDI value (e.g., 0). The physical layer may deliver the second uplink grant and second HARQ information (e.g., the first HARQ process ID, the RV value, and/or the second NDI value) to a MAC layer of the wireless device 3404. The MAC entity may deliver the uplink grant and the one or more HARQ information to the HARQ entity of the wireless device 3404. The HARQ entity may identify a HARQ process, for example, based on the first HARQ process ID. The HARQ entity may determine if the second NDI value is different from the new NDI value/the first NDI value. The HARQ entity may determine if the second NDI value is toggled with respect to the first NDI value.

The wireless device 3404 (e.g., the HARQ entity of the wireless device 3404) may instruct the HARQ process to trigger an initial (or a new) transmission of a second TB, for example, based on the second NDI value being different from/toggled with respect to the first NDI value/the new NDI value. The second TB may be different from the first TB. The HARQ process may instruct the physical layer to generate an initial (or a new) transmission of the second TB. The wireless device 3404 (e.g., the physical layer of the wireless device 3404) may transmit the second TB as the initial transmission, for example, based on the second uplink grant. The wireless device 3404 (e.g., the HARQ entity of the wireless device 3404) may store the first NDI value before stopping an ongoing uplink transmission, for example, based on the uplink pre-emption indication 3408. The wireless device 3404 (e.g., the HARQ entity of the wireless device 3404) may determine/assume that the first TB has been transmitted by the physical layer, even if the physical layer has finished a transmission of a first part of the TB and has not finished a transmission of a second part of the TB. The wireless device 3404 may correctly determine whether an initial transmission or a retransmission is to be performed based on the stored new NDI value and the second NDI value, for example, based on the wireless device 3404 receiving the second DCI 3410 that comprises the second NDI value. This may enable alignment between the base station 3402 and the wireless device 3404 regarding a status of an uplink HARQ process that supports an uplink pre-emption indication (e.g., for multiplexing different transmissions with different transmission formats). The alignment may improve system throughput, reduce data transmission latency, and/or reduce power consumption of the wireless device 3404.

A wireless device may use a timer to monitor a channel/cell. The wireless device may activate a timer, for example, based on receiving control information. The control information may be, for example, an uplink grant. The wireless device may monitor a channel/cell, for example, if the timer is active and running. The wireless device may stop monitoring the channel/cell and/or switch to a different channel, for example, if the timer expires.

The timer of the wireless device may expire, for example, after receiving an indication for cancellation of transmission. The wireless device may stop monitoring the channel/cell and/or switch to a different channel, for example, based on the expiration of the timer. The wireless device may be unable to receive a signal indicating retransmission (e.g., of the cancelled transmission) or a signal indicating another transmission. This may increase data transmission delay and/or reduce system throughput.

In examples described herein, a wireless device may avoid/delay switching to a different channel and/or stopping monitoring of a cell, for example, after the wireless device receives an indication for cancellation of transmission. The wireless device may restart a timer, for example, based on (e.g., after or in response to) receiving the indication for cancellation of transmission. This may improve data transmission delay and/or system throughput by allowing the wireless device to continue monitoring the channel/cell for a signal indicating retransmission (e.g., of the cancelled transmission) or a signal indicating another transmission.

A wireless device may use different timers. A wireless device may start a BWP inactivity timer (e.g., bwp-InactivityTimer), for example, based on receiving a DCI that comprises an uplink grant. The wireless device may keep a BWP in active state, for example, if the BWP inactivity timer is running. The wireless device may deactivate the BWP and switch to a default BWP, for example, if the BWP inactivity timer expires.

A wireless device may start an SCell deactivation timer (e.g., SCellDeactivationTimer), for example, based on receiving a DCI that comprises an uplink grant. The wireless device may keep an SCell in active state, for example, if the SCell deactivation timer is running. The wireless device may deactivate the SCell, for example, if the SCell deactivation timer expires.

A wireless device may start a BWP inactivity timer and/or the SCell deactivation timer, for example, if the wireless device receives a DCI that comprises an uplink grant. The wireless device may receive, from a base station, an uplink pre-emption indication, for example, if/when the BWP inactivity time and/or the SCell deactivation timer is running. The wireless device may stop/cancel/suspend an uplink PUSCH transmission, for example, based on (e.g., after or in response to) receiving the uplink pre-emption indication. The uplink pre-emption indication may indicate that the uplink PUSCH transmission may be stopped. The wireless device may determine that the wireless device may receive a DCI that indicates a retransmission, for example, if the wireless device stops the uplink PUSCH transmission. The BWP inactivity timer and/or the SCell deactivation timer may expire, for example, after the wireless device receives the uplink pre-emption indication, and/or after the wireless device determines that the wireless device may receive the DCI for the retransmission.

The wireless device may switch to the default BWP and/or deactivate the SCell, for example, based on (e.g., after or in response to) an expiration of the BWP inactivity timer and/or an expiration of the SCell deactivation timer. The wireless device may be unable to receive the DCI for retransmission, for example, if the wireless device switches to the default BWP and/or deactivates the SCell. This may increase data transmission delay and/or reduce system throughput.

In examples described herein, a wireless device may avoid/delay switching to a default BWP and/or deactivating an SCell, for example, after the wireless device receives an uplink pre-emption indication. A wireless device may restart an SCell deactivation timer and/or a BWP inactivity timer, for example, based on (e.g., after or in response to) receiving the uplink pre-emption indication. This may improve data transmission delay and/or system throughput.

Figure 35:
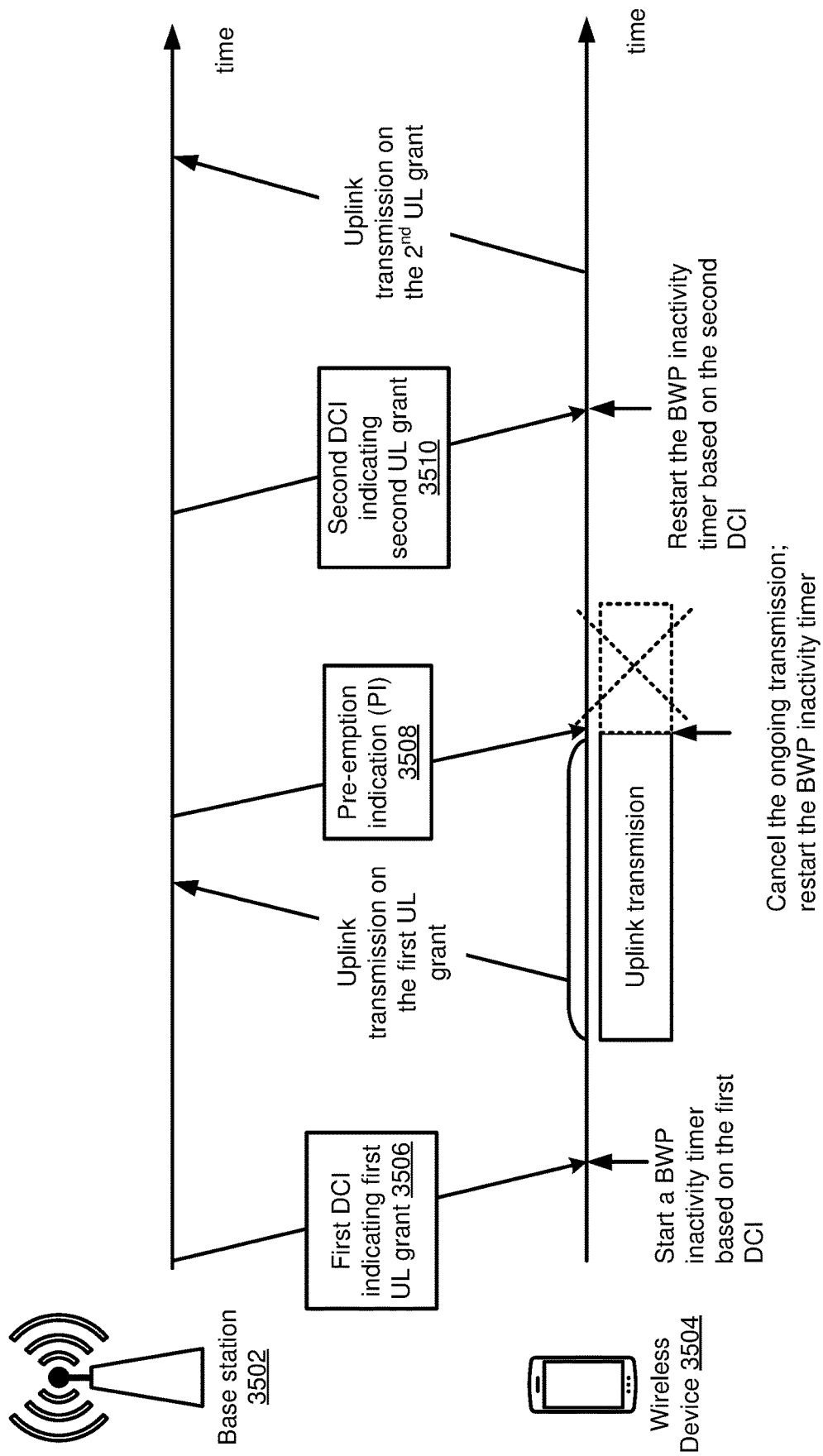
FIG. 35 shows example BWP state management.

FIG. 35 shows example BWP state management. A base station 3502 may transmit, to a wireless device 3504, first DCI 3506. The first DCI may comprise a first uplink grant. The wireless device 3504 may start a BWP inactivity timer (e.g., bwp-InactivityTimer) with an initial timer value, for example, based on (e.g., in response to) receiving the first DCI. The initial timer value may be indicated in an RRC message. The wireless device 3504 may keep a first BWP in active state, for example, if the BWP inactivity timer is running. The wireless device 3504 may perform one or more actions on the first BWP, for example, based on the first BWP being in active state. The wireless device 3504 operate as per a procedure described with FIG. 23.

A timer (e.g., bwp-InactivityTimer, SCellDeactivation-Timer, or drx-InactivityTimer) may run until the timer is stopped or the timer expires. A timer may be started, for example, if the timer is not running. A timer may be restarted, for example, if the timer is running. A timer may be started or restarted from its initial value. A timer may be a count-down timer that counts down from a first timer value to a second timer value (e.g., zero). The timer may be a count-up timer that counts up from a first timer value (e.g., zero) to a second timer value. The timer may be a down-counter that counts down from a first counter value to a second counter value (e.g., zero). The timer may be a count-up counter that counts up from a first counter value (e.g., zero) to a second counter value.

The wireless device 3504 may start an initial (or a new) transmission on PUSCH resources on the first BWP, for example, based on an uplink grant comprised in the first DCI 3506. The wireless device 3504 may receive, from the base station 3502, an uplink pre-emption indication 3508, for example, if/when transmitting a first TB on the PUSCH resources of the uplink grant. The uplink pre-emption indication 3508 may indicate that the wireless device 3504 may stop/suspend/cancel) the transmission of the first TB on at least one of the PUSCH resources. The wireless device 3504 (e.g., the physical layer of the wireless device) may stop the ongoing transmission of the first TB on the at least one of the PUSCH resources of the uplink grant, for example, based on the uplink pre-emption indication 3508. The wireless device 3504 may finish a transmission of a first part of the first TB and may not start a transmission of a second part of the first TB, for example, based on the uplink pre-emption indication 3508. The uplink pre-emption indication 3508 may indicate that the wireless device 3504 may stop/suspend/cancel) the transmission of the second part of the first TB on the at least one of the PUSCH resources. The wireless device 3504 may restart the BWP inactivity timer, for example, based on (e.g., in response to) receiving the uplink pre-emption indication 3508. The wireless device 3504 may monitor a PDCCH on the first BWP, for example, if the BWP inactivity timer is running.

The wireless device 3504 may receive second DCI 3510. The second DCI may comprise a second uplink grant. The wireless device 3504 may restart the BWP inactivity timer, and start uplink transmission based on the second uplink grant. The uplink transmission may be a retransmission of the first TB or an initial transmission of a second TB. The wireless device may determine that the uplink transmission is the retransmission of the first TB or an initial transmission of a second TB, for example, based on mechanisms described with respect to FIGS. 31-34. Restarting the BWP inactivity timer based on receiving an uplink pre-emption indication may avoid unnecessary BWP switching (e.g., to a default BWP). This may improve data transmission delay, and/or system throughput.

Various examples described herein may be used for management of an SCell deactivation timer. A wireless device may start the SCell deactivation timer with an initial value, for example, based on receiving a DCI comprising an uplink grant on an activated SCell. The wireless device may start an uplink transmission on the uplink grant, for example, before receiving an uplink pre-emption indication. The wireless device may stop an ongoing uplink transmission on the uplink grant, for example, based on (e.g., in response to) receiving the uplink pre-emption indication. The wireless device may restart the SCell deactivation timer, for example, based on (e.g., in response to) receiving the uplink pre-emption indication. The wireless device may keep the SCell in active state, for example, if the SCell deactivation timer is running. The wireless device may monitor a PDCCH on (or for) the SCell to detect second DCI for a second uplink grant. The wireless device may perform an uplink transmission on the second uplink grant, for example, based on receiving the second uplink grant. Restarting the SCell deactivation timer based on receiving an uplink pre-emption indication, may avoid unnecessary SCell deactivation. This may improve data transmission delay, and/or system throughput.

Figure 36:
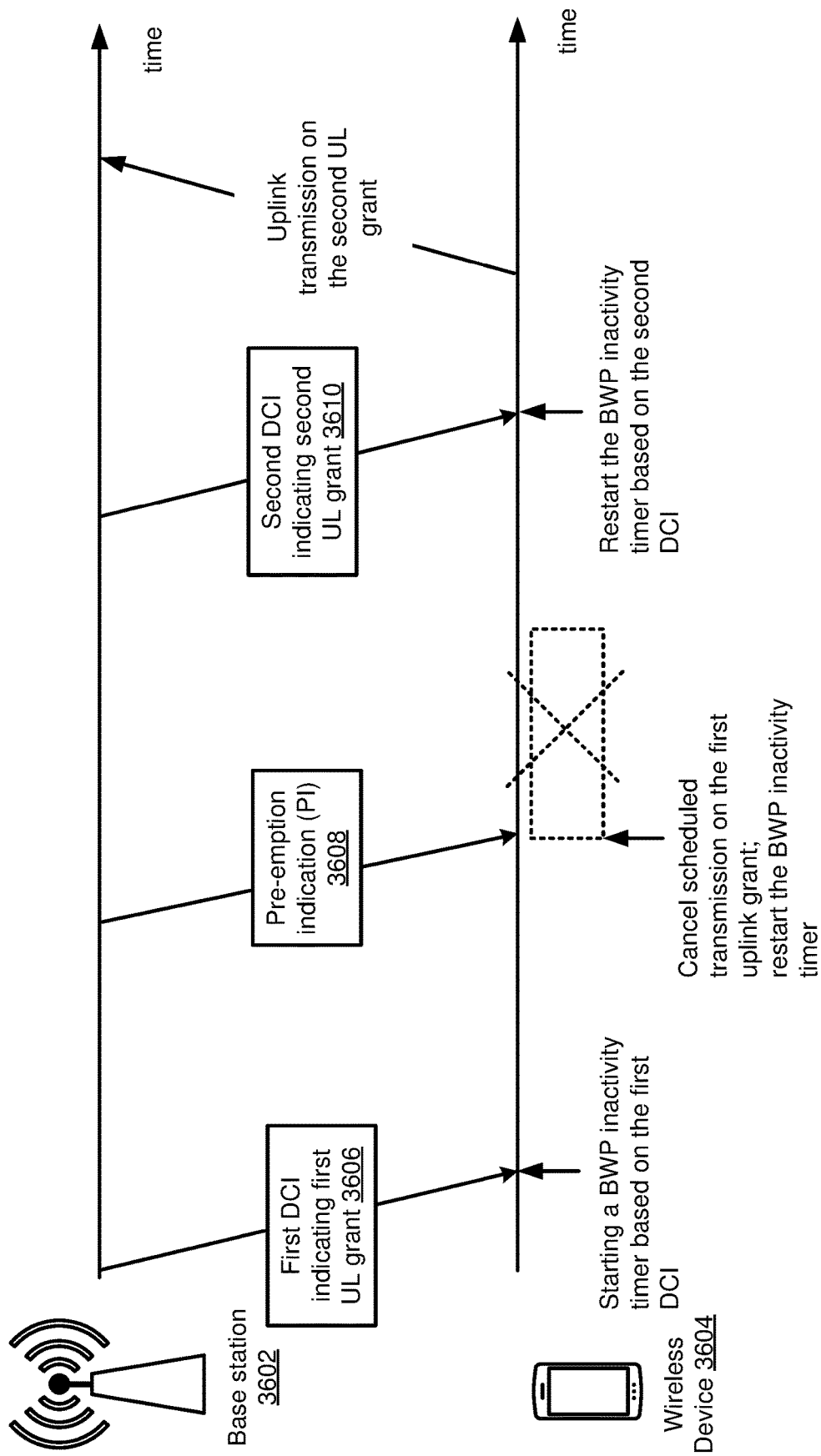
FIG. 36 shows example BWP state management.

FIG. 36 shows example of BWP state management. A base station 3602 may transmit, to a wireless device (3604, first DCI 3606. The first DCI 3606 may comprise a first uplink grant. The wireless device 3604 may start a BWP inactivity timer (e.g., bwp-InactivityTimer) with an initial timer value, for example, based on (e.g., in response to) receiving the first DCI. The initial timer value may be indicated in an RRC message. The wireless device 3604 may keep a first BWP in active state, for example, if the BWP inactivity timer is running.

The wireless device 3604 may receive, from the base station 3602, an uplink pre-emption indication 3608, for example, before the wireless device starts a transmission of a first TB on PUSCH resources of the uplink grant. The uplink pre-emption indication 3608 may indicate that the wireless device 3604 may cancel/suspend/stop a scheduled transmission of the first TB on at least one of the PUSCH resources. The wireless device 3604 (e.g., the physical layer of the wireless device 3604) may cancel the scheduled transmission of the first TB on the at least one of the PUSCH resources of the uplink grant, for example, based on (e.g., in response to) the uplink pre-emption indication 3608. The wireless device 3604 may restart the BWP inactivity timer, for example, based on (e.g., in response to) receiving the uplink pre-emption indication. The wireless device 3604 may monitor a PDCCH on the first BWP, for example, if the BWP inactivity timer is running.

The wireless device 3604 may receive second DCI comprising a second uplink grant. The wireless device 3604 may restart the BWP inactivity timer, and start uplink transmission based on the second uplink grant. The uplink transmission may be a transmission of the first TB or a transmission of a second TB. The wireless device 3604 may determine that the uplink transmission is the transmission of the first TB or an initial transmission of a second TB, for example, based on mechanisms described with respect to FIGS. 31-34. Restarting the BWP inactivity timer based on receiving an uplink pre-emption indication may avoid unnecessary BWP switching (e.g., to a default BWP). This may improve data transmission delay, and/or system throughput.

Various examples described herein may be used for management of an SCell deactivation timer. A wireless device may start the SCell deactivation timer with an initial value, for example, based on (e.g., in response to) receiving a DCI comprising an uplink grant on an activated SCell. The wireless device may receive an uplink pre-emption indication, for example, before the wireless device starts an uplink transmission on the uplink grant. The wireless device may cancel the scheduled (e.g., future) uplink transmission on the uplink grant, for example, based on (e.g., in response to) receiving the uplink pre-emption indication. The wireless device may restart the SCell deactivation timer, for example, based on (e.g., in response to) receiving the uplink pre-emption indication. The wireless device may keep the SCell in active state, for example, if the SCell deactivation timer is running. The wireless device may monitor a PDCCH on (or for) the SCell to detect second DCI for a second uplink grant. The wireless device may perform uplink transmission on the second uplink grant, for example, based on receiving the second uplink grant. Restarting the SCell deactivation timer based on receiving an uplink pre-emption indication may avoid unnecessary SCell deactivation. This may improve data transmission delay, and/or system throughput.

A wireless device, configured with a DRX operation, may start a DRX inactivity timer (e.g., drx-InactivityTimer), for example, if the wireless device receives DCI comprising an uplink grant. The wireless device may stay in a DRX active state, for example, if the DRX inactivity timer is running. The wireless device may monitor PDCCH and/or receive data packet on PDSCH, for example, if the wireless device is in a DRX active state. The wireless device may switch to a DRX off/sleep mode (e.g., not in DRX active state), for example, based on an expiration of the DRX inactivity timer. The wireless device may stop monitoring PDCCH and/or stop receiving data packet on PDSCH, for example, if the wireless device is in a DRX off/sleep mode. This may reduce power consumption. The wireless device may start an uplink transmission, for example, based on the uplink grant. The wireless device may receive an uplink grant, for example, before receiving an uplink pre-emption indication. The wireless device may stop an ongoing uplink transmission, for example, based on (e.g., in response to) the uplink pre-emption indication. The wireless device may expect to receive second DCI for uplink retransmission. The DRX inactivity timer may expires, for example, after the wireless device receives the uplink pre-emption indication, and/or if the wireless device is expecting to receive the second DCI for the retransmission. The wireless device may switch to the DRX off/sleep mode, for example, based on (e.g., in response to) an expiration of the DRX inactivity timer. This may increase data transmission delay, and/or reduce system throughput.

A wireless device may avoid/delay switching to a DRX off/sleep mode, for example, after the wireless device receives an uplink pre-emption indication. The wireless device may restart a DRX inactivity timer, for example, based on (e.g., after or in response to) receiving an uplink pre-emption indication. This may improve data transmission delay and/or system throughput.

Figure 37:
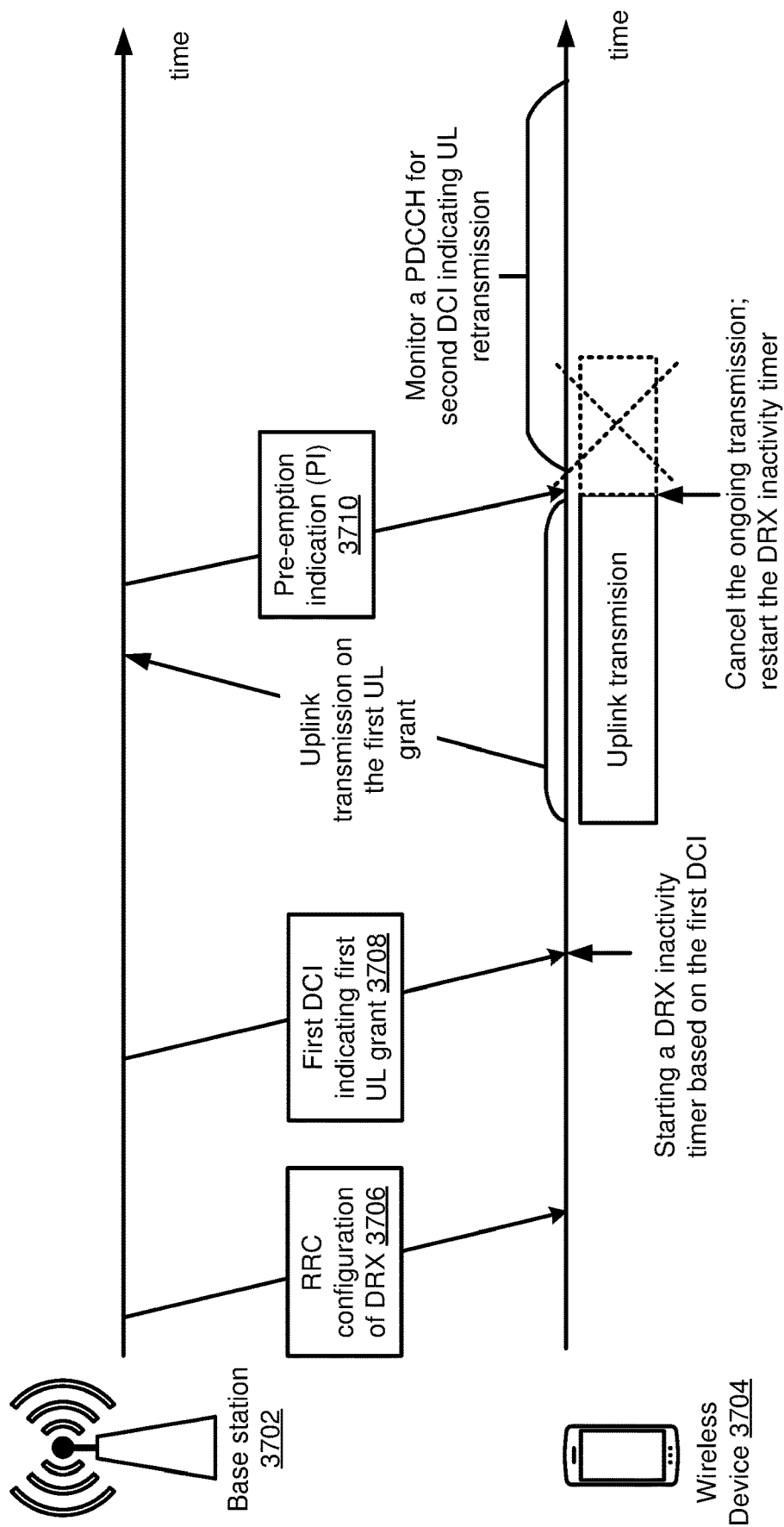
FIG. 37 shows an example DRX operation.

FIG. 37 shows example DRX operation. A base station 3702 may transmit to a wireless device 3704 one or more RRC messages 3706. The one or RRC messages 3706 may comprise configuration parameters of a DRX operation. The wireless device 3704 may activate the DRX operation based on the configuration parameters. The wireless device 3704 may implement, for example, one or examples described with reference to FIG. 24 and/or FIG. 25. The base station 3702 may transmit, to the wireless device 3704, first DCI 3708. The first DCI 3708 may comprise a first uplink grant. The wireless device 3704 may start a DRX inactivity timer (e.g., drx-InactivityTimer) with an initial timer value, for example, based on receiving the first DCI 3708. The initial timer value may be indicated in an RRC message. The wireless device 3704 may be in a DRX active state, for example, if the DRX inactivity timer is running.

The wireless device 3704 may start an initial (or a new) transmission on PUSCH resources (e.g., on an active BWP and/or an active cell), for example, based on an uplink grant comprised in the first DCI 3708. The wireless device 3704 may receive, from the base station 3702, an uplink pre-emption indication 3710, for example, if/when transmitting a first TB on PUSCH resources of the uplink grant. The uplink pre-emption indication 3710 may indicate that the wireless device 3704 may stop/suspend/cancel the transmission of the first TB on at least one of the PUSCH resources. The wireless device 3704 (e.g., a physical layer of the wireless device 3704) may stop an ongoing transmission of the first TB on the at least one of the PUSCH resources of the uplink grant, for example, based on (e.g., in response to) the uplink pre-emption indication 3710. The wireless device 3704 may finish a transmission of a first part of the first TB and may not start a transmission of a second part of the first TB, for example, based on the uplink pre-emption indication. The uplink pre-emption indication 3710 may indicate that the wireless may stop/suspend/cancel the transmission of the second part of the first TB on the at least one of the PUSCH resources. The wireless device 3704 may restart the DRX inactivity timer, for example, based on receiving the uplink pre-emption indication 3710. The wireless device 3704 may monitor a PDCCH on the active BWP and/or the active cell, for example, if the DRX inactivity timer is running.

The wireless device 3704 may receive second DCI comprising a second uplink grant. The wireless device may restart the DRX inactivity timer, and/or start uplink transmission based on the second uplink grant. The uplink transmission may be a retransmission of the first TB or an initial transmission of a second TB. The wireless device may determine that the uplink transmission is the retransmission of the first TB or an initial transmission of a second TB, for example, based on mechanisms described with respect to FIGS. 31-34. Restarting the DRX inactivity timer based on receiving an uplink pre-emption indication may avoid unnecessary switching from a DRX active state to DRX off/sleep mode/state. This may improve data transmission delay, and/or system throughput.

A wireless device may receive first DCI. The first DCI may indicate first uplink radio resources, a first HARQ process ID, and/or a first NDI value. The first uplink radio resources may comprise first uplink time/frequency resources and/or at least second uplink time/frequency resources. The wireless device may generate a first TB based on the first DCI. The wireless device may receive second DCI indicating that the first uplink time/frequency resources are pre-empted. The second DCI may be a group command DCI that is addressed to a group of wireless devices comprising the wireless device. The second DCI may be a wireless device-specific DCI addressed to the wireless device. The wireless device (e.g., a physical layer of the wireless device) may drop a transmission of the first TB on the first uplink time/frequency resources, for example, based on (e.g., in response to) the second DCI. The wireless device (e.g., the physical layer of the wireless device) may drop the transmission of the first TB on the first uplink time/frequency resources and/or the at least second uplink time/frequency resources. The wireless device (e.g., a MAC entity of the wireless device) may determine/assume that the first TB has been transmitted, even if the physical layer has dropped the transmission of the first TB based on the second DCI. The wireless device (e.g., the MAC entity of the wireless device) may store the first NDI value received in the first DCI and/or store a MAC PDU associated with the first TB, for example, if the physical layer has dropped the transmission of the first TB. The wireless device may store the first NDI value received in the first DCI, for example, if the physical layer does not drop the transmission of the first TB in response to the second DCI. The wireless device may receive third DCI. The third DCI may comprise second uplink radio resources, a same HARQ process ID as the first HARQ process ID, and/or a second NDI value. The wireless device may determine if the second NDI value is different from the stored NDI value/the first NDI value. The wireless device may determine if the second NDI value is toggled with respect to the stored NDI value/the first NDI value. The wireless device may determine that the second NDI value is toggled, for example, based on the second NDI value being different from the stored NDI value/the first NDI value. The wireless device may determine that the second NDI value is not toggled, for example, based on the second NDI value being same as the stored NDI value/the first NDI value. The wireless device may retransmit the first TB based on the second uplink radio resources, for example, if the second NDI value is not toggled. The wireless device may transmit a second TB based on the second uplink radio resources, for example, if the second NDI value is toggled.

A wireless device may receive first DCI. The first DCI may indicate first uplink radio resources, a first HARQ process ID, and/or a first NDI value. The first uplink radio resources may comprise first uplink time/frequency resources and/or at least second uplink time/frequency resources. The wireless device may generate a first TB based on the first DCI. The wireless device may start a transmission of the first TB on the first uplink radio resources. The wireless device may receive second DCI indicating the first uplink time/frequency resources are pre-empted. The wireless device may receive the second DCI, for example, if/when the wireless device is transmitting the first TB on the first uplink radio resources. The wireless device (e.g., a physical layer of the wireless device) may drop an ongoing transmission of the first TB at least on the first uplink time/frequency resources, for example, based on (e.g., after or in response to) the second DCI. The wireless device may drop the ongoing transmission of the first TB on the first uplink time/frequency resources and the at least second uplink time/frequency resources, for example, based on (e.g., in response to) the second DCI. The wireless device (e.g., a MAC entity of the wireless device) may determine/assume that the first TB has been transmitted of the first TB, even if the physical layer has dropped the ongoing transmission of the first TB based on the second DCI. The wireless device (e.g., the MAC entity of the wireless device) may store the first NDI value received in the first DCI and/or store the first TB in a HARQ buffer associated with a HARQ process identified by the first HARQ process ID, for example, if the physical layer has dropped the ongoing transmission of the first TB. The wireless device (e.g., the MAC entity of the wireless device) may store the first NDI value received in the first DCI, for example, if the physical layer does not drop the ongoing transmission of the first TB based on the second DCI. The wireless device may receive a third DCI. The third DCI may comprise second uplink radio resources, a same HARQ process ID as the first HARQ process ID, and/or a second NDI value. The wireless device may determine if the second NDI value is different from the stored NDI value/the first NDI value. The wireless device may determine if the second NDI value is toggled with respect to the stored NDI value/the first NDI value. The wireless device may determine that the second NDI value is toggled, for example, based on the second NDI value being different from the stored NDI value/the first NDI value. The wireless device may determine that the NDI is not toggled, for example, based on the second NDI value being same as the stored NDI value/the first NDI value. The wireless device may retransmit the first TB on the second uplink radio resources, for example, if the NDI is not toggled. The wireless device may transmit a second TB on the second uplink radio resources, for example, if the NDI is toggled.

A wireless device may receive first DCI comprising a first uplink grant. The wireless device may start (or restart) a BWP inactivity timer with an initial timer value, for example, based on (e.g., after or in response to) receiving the first DCI. The wireless device may receive second DCI. The second DCI may comprise an uplink pre-emption indication on an uplink radio resource. The uplink radio resource may overlap with one or more uplink radio resources of the first uplink grant. The wireless device may drop a transmission of a first TB on the uplink radio resource and/or start (or restart) the BWP inactivity timer, for example, based on the uplink pre-emption indication indicating that the uplink radio resource is pre-empted. The wireless device may monitor a PDCCH for a third DCI, for example, if the BWP inactivity timer is running. The wireless device may transmit a second TB or retransmit the first TB, for example, based on receiving the third DCI.

A wireless device may receive first DCI comprising a first uplink grant. The wireless device may start (or restart) a SCell deactivation timer with an initial timer value, for example, based on (e.g., after or in response to) receiving the first DCI. The wireless device may receive second DCI. The second DCI may comprise an uplink pre-emption indication on an uplink radio resource. The uplink radio resource may overlap with one or more uplink radio resources of the first uplink grant. The wireless device may drop a transmission of a first TB on the uplink radio resource and/or start (or restart) the SCell deactivation timer, for example, based on the uplink pre-emption indication indicating that the uplink radio resource is pre-empted. The wireless device may monitor a PDCCH for a third DCI, for example, if the SCell deactivation timer is running. The wireless device may transmit a second TB or retransmit the first TB, for example, based on receiving the third DCI.

A wireless device may receive first DCI comprising a first uplink grant. The wireless device may start (or restart) a DRX inactivity timer with an initial timer value, for example, based on (e.g., after or in response to) receiving the first DCI. The wireless device may receive second DCI. The second DCI may comprise an uplink pre-emption indication on an uplink radio resource. The uplink radio resource may overlap with one or more uplink radio resource of the first uplink grant. The wireless device may drop a transmission of a first TB on the uplink radio resource and/or start (or restart) the DRX inactivity timer, for example, based on the uplink pre-emption indication indicating that the uplink radio resource is pre-empted. The wireless device may monitor a PDCCH for a third DCI, for example, if the DRX inactivity timer is running. The wireless device may transmit a second TB or retransmit the first TB, for example, based on the third DCI.

Figure 38:
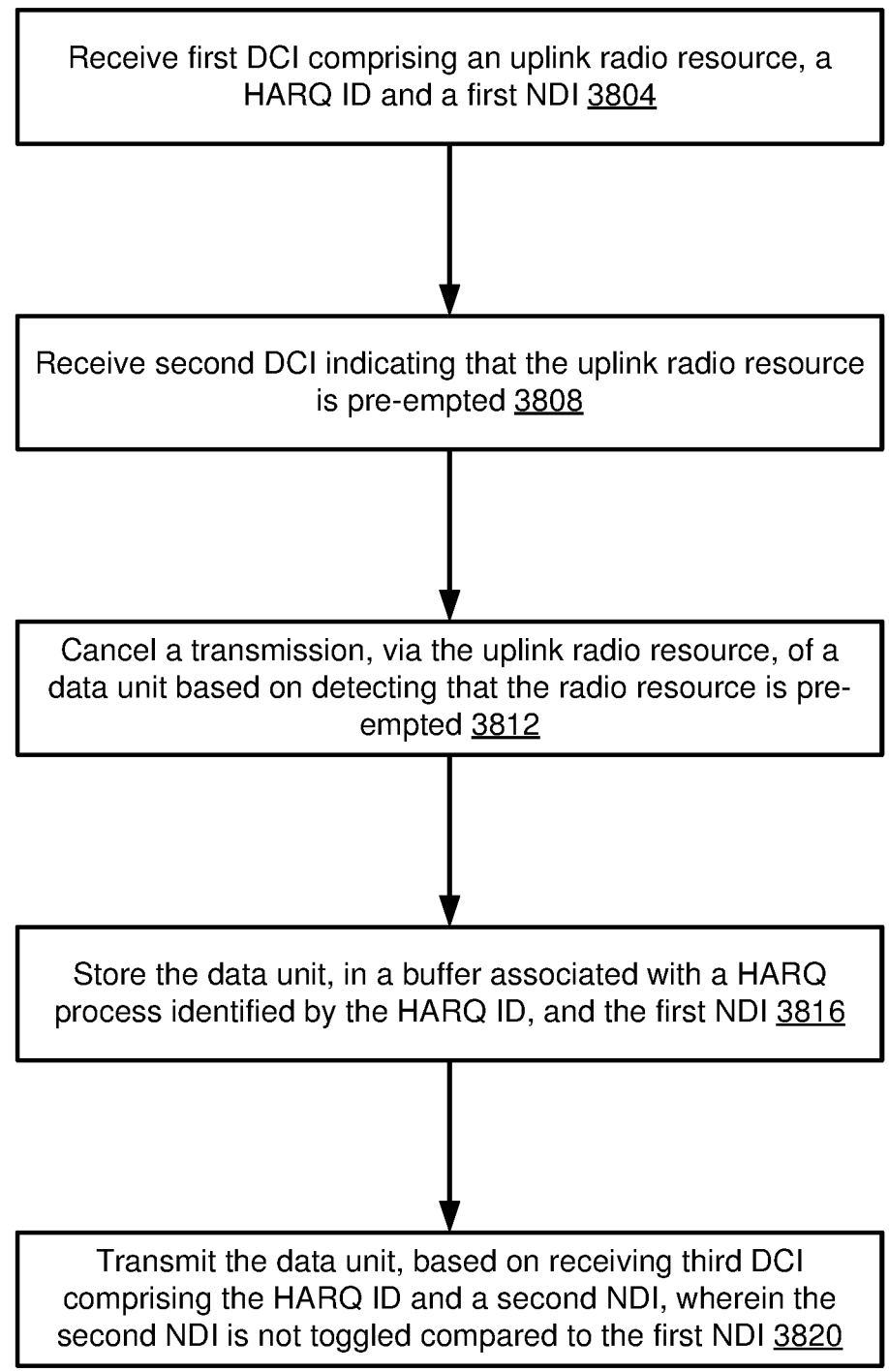
FIG. 38 shows an example method for an enhanced HARQ operation.

FIG. 38 shows an example method for an enhanced HARQ operation. At step 3804, a wireless device may receive (e.g., from a base station) first DCI. The first DCI may comprise an uplink radio resource, a HARQ ID, and a first NDI. At step 3808, the wireless device may receive second DCI. The second DCI may indicate that the uplink radio resource is pre-empted. At step 3812, the wireless device may cancel a transmission of a data unit, via the uplink radio resource, for example, based on detecting that the uplink radio resource is pre-empted. At step 3816, the wireless device may store the data unit in a buffer and/or store the first NDI. The buffer may be associated with a HARQ process that is identified by the HARQ ID. At step 3820, the wireless device may transmit the data unit based on receiving third DCI comprising the HARQ ID and a second NDI, wherein the second NDI is not toggled compared to the first NDI.

A wireless device may perform a method comprising multiple operations. The wireless device may receive first DCI that indicates: an uplink radio resource; a HARQ identifier; and a first NDI. The wireless device may receive second DCI that indicates that the uplink radio resource is pre-empted. The wireless device may, based on detecting that the uplink radio resource is pre-empted, cancel a transmission, via the uplink radio resource, of a MAC packet. The wireless device may transmit, based on receiving third DCI comprising the HARQ identifier and a second NDI, the MAC packet, wherein the second NDI is not toggled compared to the first NDI.

The wireless device may also perform one or more additional operations. The wireless device may store the MAC packet in a buffer associated with a HARQ process indicated by the HARQ identifier. The wireless device may receive fourth DCI. The wireless device may transmit, based on the third NDI being toggled compared to the second NDI, a second MAC packet. The first NDI may have a length of one bit. The wireless device may store the first NDI. The wireless device may determine that the second NDI is not toggled compared to first NDI based on the second NDI being same as stored first NDI. The cancelling the transmission of MAC packet may comprise transmitting, via the uplink radio resource and based on receiving the first DCI, a first portion of the MAC packet. The cancelling the transmission of the data unit may comprise dropping a scheduled transmission, via the uplink radio resource, of a second portion of the MAC packet. The wireless device may receive one or more radio resource control messages comprising configuration parameters, wherein the configuration parameters indicate an association between one or more pre-emption indicators and one or more uplink radio resources, and wherein the one or more uplink radio resources comprises the uplink radio resource. The second DCI may comprise the one or more pre-emption indicators, wherein a pre-emption indicator, of the one or more pre-emption indicators and associated with the uplink radio resource, indicates cancellation of a transmission of the MAC packet via the uplink radio resource. Based on the association, a pre-emption indicator of the one or more pre-emption indicators, corresponding to an associated uplink radio resource of the one or more uplink radio resources, may indicate whether the associated uplink radio resources is pre-empted. The uplink radio resource may comprise at least one of: a number of symbols; a number of resource blocks; or a number of demodulation reference signal ports. The uplink radio resource being pre-empted may comprise that transmission by the wireless device on the uplink radio resource is not allowed. The second DCI may comprise: a group common DCI addressed to a group of wireless devices comprising the wireless device, or a wireless device-specific DCI dedicatedly addressed to the wireless device. The wireless device may receive the second DCI based on cyclic redundancy check (CRC) bits of the second DCI being scrambled by a radio network temporary identifier (RNTI) dedicated for pre-emption indication.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the first DCI. A computer-readable medium may store instructions that, when executed, cause performance of the described method, additional operations and/or include the additional elements.

A wireless device may perform a method comprising multiple operations. The wireless device may receive first DCI that indicates an uplink radio resource and a first NDI. The wireless device may receive second DCI that indicates that the uplink radio resource is pre-empted. The wireless device may, based on detecting that the uplink radio resource is pre-empted, cancel a transmission, via the uplink radio resource, of a first transport block. The wireless device may receive third DCI that indicates a second NDI. The wireless device may transmit, based on the second NDI being toggled compared to the first NDI, a second transport block.

The wireless device may also perform one or more additional operations. The wireless device may start an inactivity timer. The wireless device may restart, based on the cancelling the transmission of the first data unit, the inactivity timer. The wireless device may monitor, based on the inactivity timer, a physical downlink control channel (PDCCH), wherein the receiving third DCI is based on the monitoring the PDCCH. The first NDI may have a length of one bit. The wireless device may store the first NDI. The cancelling the transmission of the data unit may comprise transmitting, via the uplink radio resource and based on receiving the first DCI, a first portion of the data unit. The cancelling the transmission of the data unit may comprise dropping a transmission of a second portion of the data unit via the uplink radio resource. The wireless device may receive one or more radio resource control messages comprising configuration parameters, wherein the configuration parameters indicate an association between one or more pre-emption indicators and one or more radio uplink resources, and wherein the one or more uplink radio resources comprises the uplink radio resource. The second DCI may comprise the one or more pre-emption indicators, wherein a pre-emption indicator, of the one or more preemption indicators and associated with the uplink radio resource indicates cancellation of a transmission of the first data unit via the uplink radio resource. The wireless device may receive fourth DCI that indicates the uplink radio resource and a third NDI. The wireless device may receive fifth DCI that indicates that the uplink radio resource is pre-empted. The wireless device may, based on detecting that the uplink radio resource is pre-empted, cancel a transmission, via the uplink radio resource, of a third transport block. The wireless device may receive sixth DCI, wherein the sixth DCI indicates a fourth NDI. The wireless device may transmit, based on the fourth NDI not being toggled compared to the third NDI, the third transport block.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the first DCI. A computer-readable medium may store instructions that, when executed, cause performance of the described method, additional operations and/or include the additional elements.

A wireless device may perform a method comprising multiple operations. The wireless device may receive first DCI that indicates an uplink radio resource. The wireless device may start an inactivity timer. The wireless device may receive second DCI that indicates that the uplink radio resource is pre-empted. The wireless device may, based on detecting that the uplink radio resource is pre-empted, cancel a transmission, via the uplink radio resource, of a first transport block. The wireless device may restart, based on the cancelling the transmission, the inactivity timer. The wireless device may receive, after restarting the inactivity timer, third DCI.

The wireless device may also perform one or more additional operations. The wireless device may, based on the inactivity timer, monitor a PDCCH. The inactivity timer may be at least one of a bandwidth part BWP inactivity timer or a DRX inactivity timer. The first DCI may indicate a HARQ identifier and a first NDI, and the third DCI may indicate the HARQ identifier and a second NDI. The wireless device may store the first transport block in a buffer of a HARQ process indicated by the HARQ identifier. The wireless device may transmit the first transport block based on determining that the second NDI is not toggled compared to the first NDI. The wireless device may transmit a second transport block based on determining that the second NDI is toggled compared to the first NDI. The cancelling the transmission of the first transport block may comprise transmitting, via the uplink radio resource and based on receiving the first DCI, a first portion of the first transport block. The cancelling the transmission of the first transport block may comprise dropping a scheduled transmission, via the uplink radio resource, of a second portion of the first transport block.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the first DCI. A computer-readable medium may store instructions that, when executed, cause performance of the described method, additional operations and/or include the additional elements.

A wireless device may receive first DCI comprising a radio resource and an NDI. The wireless device may receive second DCI indicating that the radio resource is pre-empted. The wireless device may, based on detecting that the uplink radio resource is pre-empted, cancel a transmission of a transport block on the uplink radio resource. The wireless device may receive a third DCI comprising a second NDI. The wireless device may transmit the transport block based on the second NDI not being toggled compared to the first NDI.

A wireless device may receive first DCI indicating: a first uplink radio resource; a first HARQ identifier; and a first NDI. The wireless device may receive receiving second DCI indicating that the first uplink radio resource is pre-empted. The wireless device may cancel, in response to the second DCI indicating that the first uplink radio resource is pre-empted, a transmission of a first transport block on the first uplink radio resource. The wireless device may determine, based on the cancelling the transmission, that the transmission of the first transport block has been performed. The wireless device may store, based on the determining that the transmission of the first transport block is performed and the cancelling the transmission, at least one of: a value of the first NDI; and a MAC PDU in a HARQ buffer of a HARQ process identified by the first HARQ identifier.

A wireless device may perform a method comprising multiple operations. The wireless device may receive first DCI. The first DCI may indicate: an uplink radio resource; a HARQ identifier; and a first NDI. The wireless device may receive second DCI, wherein the second DCI indicates that the uplink radio resource is pre-empted. The wireless device may, based on detecting that the radio resource is pre-empted, cancelling a transmission, via the uplink radio resource, of a data unit. The wireless device may, based on the cancelling the transmission, considering that the transmission of the data unit has been performed. The wireless device may transmit the data unit, based on receiving third DCI.

Figure 39:
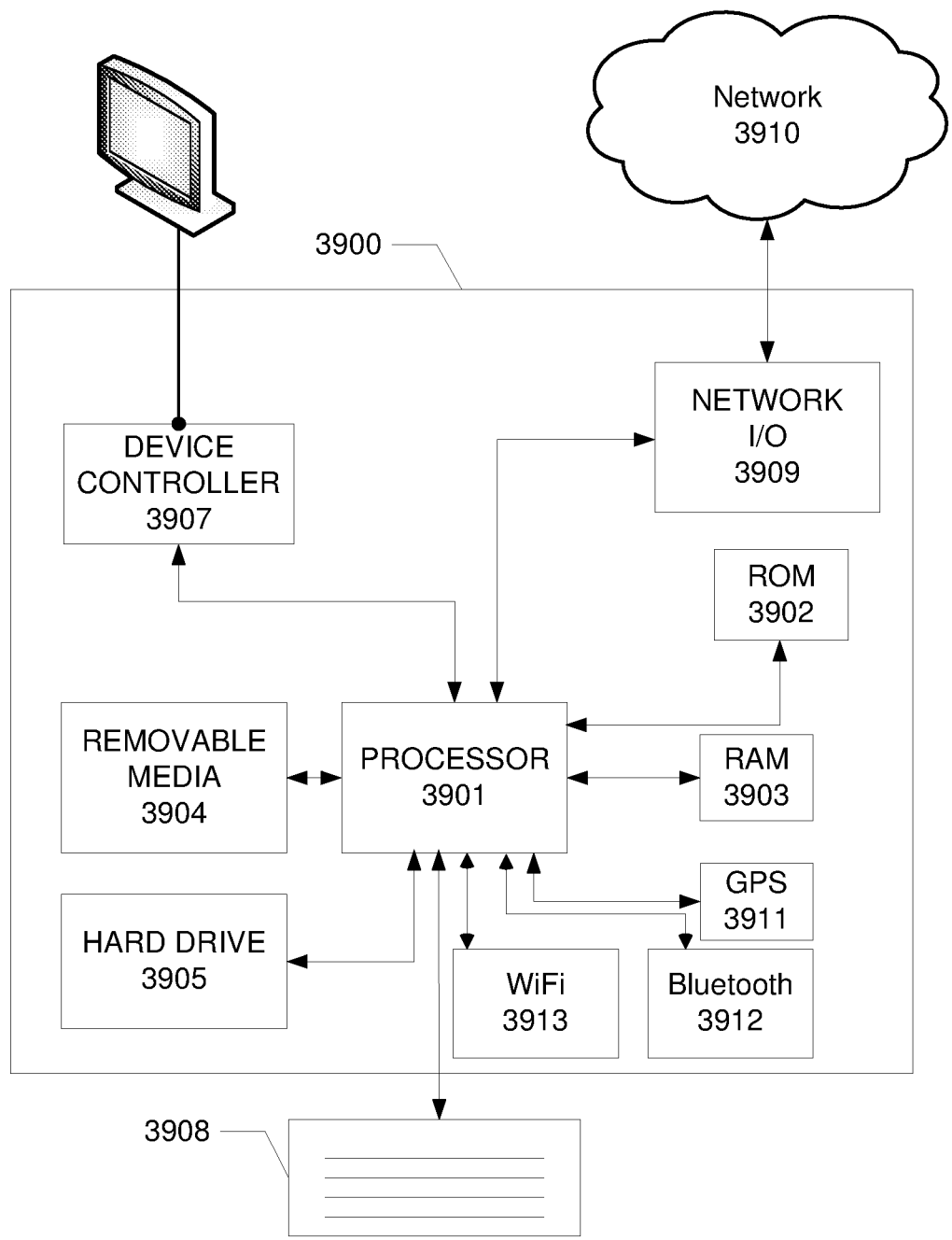
FIG. 39 shows example elements of a computing device that may be used to implement any of the various devices described herein.

FIG. 39 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3900 may include one or more processors 3901, which may execute instructions stored in the random-access memory (RAM) 3903, the removable media 3904 (such as a Universal Serial Bus (USB) drive, compact disk (CD) or digital versatile disk (DVD), or floppy disk drive), or any other desired storage medium. Instructions may also be stored in an attached (or internal) hard drive 3905. The computing device 3900 may also include a security processor (not shown), which may execute instructions of one or more computer programs to monitor the processes executing on the processor 3901 and any process that requests access to any hardware and/or software components of the computing device 3900 (e.g., ROM 3902, RAM 3903, the removable media 3904, the hard drive 3905, the device controller 3907, a network interface 3909, a GPS 3911, a Bluetooth interface 3912, a WiFi interface 3913, etc.). The computing device 3900 may include one or more output devices, such as the display 3906 (e.g., a screen, a display device, a monitor, a television, etc.), and may include one or more output device controllers 3907, such as a video processor. There may also be one or more user input devices 3908, such as a remote control, keyboard, mouse, touch screen, microphone, etc. The computing device 3900 may also include one or more network interfaces, such as a network interface 3909, which may be a wired interface, a wireless interface, or a combination of the two. The network interface 3909 may provide an interface for the computing device 3900 to communicate with a network 3910 (e.g., a RAN, or any other network). The network interface 3909 may include a modem (e.g., a cable modem), and the external network 3910 may include communication links, an external network, an in-home network, a provider's wireless, coaxial, fiber, or hybrid fiber/coaxial distribution system (e.g., a DOCSIS network), or any other desired network. Additionally, the computing device 3900 may include a location-detecting device, such as a global positioning system (GPS) microprocessor 3911, which may be configured to receive and process global positioning signals and determine, with possible assistance from an external server and antenna, a geographic position of the computing device 3900.

The example in FIG. 39 may be a hardware configuration, although the components shown may be implemented as software as well. Modifications may be made to add, remove, combine, divide, etc. components of the computing device 3900 as desired. Additionally, the components may be implemented using basic computing devices and components, and the same components (e.g., processor 3901, ROM storage 3902, display 3906, etc.) may be used to implement any of the other computing devices and components described herein. For example, the various components described herein may be implemented using computing devices having components such as a processor executing computer-executable instructions stored on a computer-readable medium, as shown in FIG. 39. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device, first downlink control information (DCI) that indicates:
an uplink radio resource; and
a new data indicator (NDI);
receiving second group common DCI comprising a cancellation indication for an uplink transmission associated with the uplink radio resource;
cancelling, based on the second group common DCI, the uplink transmission associated with the uplink radio resource; and
based on a comparison of the NDI to a value, transmitting one of:
a first uplink transmission corresponding to the canceled uplink transmission, or
a second uplink transmission.

2. The method of claim 1, wherein the first uplink transmission corresponding to the canceled uplink transmission is transmitted based on a result of the comparison of the NDI to the value indicating at least one of:
the value and the NDI having a same value, or
the value not being toggled compared to a value of the NDI.

3. The method of claim 1, wherein the second uplink transmission is transmitted based on a result of the comparison of the NDI to the value indicating at least one of:
the value and the NDI having a different value, or
the value being toggled compared to a value of the NDI.

4. The method of claim 1, wherein the second uplink transmission comprises a medium access control (MAC) protocol data unit (PDU) different from the first uplink transmission.

5. The method of claim 1, wherein the transmitting the first uplink transmission comprises retransmitting a medium access control (MAC) protocol data unit (PDU) corresponding to the canceled uplink transmission.

6. The method of claim 1, wherein the first DCI further indicates a hybrid automatic repeat request (HARQ) identifier, and wherein the method further comprises:
receiving third DCI that comprises a second NDI, wherein:
the value is the same as a value of the second NDI, and
the third DCI indicates the HARQ identifier.

7. The method of claim 1, wherein the second group common DCI is addressed to a group of wireless devices comprising the wireless device.

8. A wireless device comprising:
one or more processors; and
memory storing instructions that, when executed by the one or more processors, cause the wireless device to:
receive first downlink control information (DCI) that indicates:
an uplink radio resource; and
a new data indicator (NDI);
receive second group common DCI comprising a cancellation indication for an uplink transmission associated with the uplink radio resource;
cancel, based on the second group common DCI, the uplink transmission associated with the uplink radio resource; and
based on a comparison of the NDI to a value, transmit one of:
a first uplink transmission corresponding to the canceled uplink transmission, or
a second uplink transmission.

9. The wireless device of claim 8, wherein the first uplink transmission corresponding to the canceled uplink transmission is transmitted based on a result of the comparison of the NDI to the value indicating at least one of:
the value and the NDI having a same value, or
the value not being toggled compared to a value of the NDI.

10. The wireless device of claim 8, wherein the second uplink transmission is transmitted based on a result of the comparison of the NDI to the value indicating at least one of:

the value and the NDI having a different value, or
the value being toggled compared to a value of the NDI.

11. The wireless device of claim 8, wherein the second uplink transmission comprises a medium access control (MAC) protocol data unit (PDU) different from the first uplink transmission.

12. The wireless device of claim 8, wherein the instructions, when executed by the one or more processors, cause the wireless device to transmit the first uplink transmission by retransmitting a medium access control (MAC) protocol data unit (PDU) corresponding to the canceled uplink transmission.

13. The wireless device of claim 8, wherein the first DCI further indicates a hybrid automatic repeat request (HARQ) identifier, and wherein the instructions, when executed by the one or more processors, further cause the wireless device to:
receive third DCI that comprises a second NDI, wherein:
the value is the same as a value of the second NDI, and
the third DCI indicates the HARQ identifier.

14. The wireless device of claim 8, wherein the second group common DCI is addressed to a group wireless devices comprising the wireless devices.

15. A method comprising:
sending, by a base station, first downlink control information (DCI) that indicates:
an uplink radio resource; and
a new data indicator (NDI);
sending second group common DCI comprising a cancellation indication for an uplink transmission associated with the uplink radio resource;
cancelling reception of the uplink transmission associated with the uplink radio resource; and
based on a comparison of the NDI to a value, receiving one of:
a first uplink transmission corresponding to the canceled reception of the uplink transmission, or
a second uplink transmission.

16. The method of claim 15, wherein the first uplink transmission corresponding to the canceled reception of the uplink transmission is received based on a result of the comparison of the NDI to the value indicating at least one of:
the value and the NDI having a same value, or
the value not being toggled compared to a value of the NDI.

17. The method of claim 15, wherein the second uplink transmission is received based on a result of the comparison of the NDI to the value indicating at least one of:
the value and the NDI having a different value, or
the value being toggled compared to a value of the NDI.

18. The method of claim 15, wherein the second uplink transmission comprises a medium access control (MAC) protocol data unit (PDU) different from the first uplink transmission.

19. The method of claim 15, wherein the receiving the first uplink transmission comprises receiving a medium access control (MAC) protocol data unit (PDU) corresponding to the uplink transmission.

20. The method of claim 15, wherein the first DCI further indicates a hybrid automatic repeat request (HARQ) identifier, and wherein the method further comprising:
sending a third DCI that comprises a second NDI, wherein:
the value is the same as a value of the second NDI, and
the third DCI indicates the HARQ identifier.

21. The method of claim 15, wherein the second group common DCI is addressed to a group of wireless devices.

22. A base station comprising:
one or more processors; and
memory storing instructions that, when executed by the one or more processors, cause the base station to:
send first downlink control information (DCI) that indicates:
an uplink radio resource; and
a new data indicator (NDI);
send second group common DCI comprising a cancellation indication for an uplink transmission associated with the uplink radio resource;
cancel reception of the uplink transmission associated with the uplink radio resource; and
based on a comparison of the NDI to a value, receive one of:
a first uplink transmission corresponding to the canceled reception of the uplink transmission, or
a second uplink transmission.

23. The base station of claim 22, wherein the first uplink transmission corresponding to the canceled reception of the uplink transmission is received based on a result of the comparison of the NDI to the value indicating at least one of:
the value and the NDI having a same value, or
the value not being toggled compared to a value of the NDI.

24. The base station of claim 22, wherein the second uplink transmission is received based on a result of the comparison of the NDI to the value indicating at least one of:
the value and the NDI having a different value, or
the value being toggled compared to a value of the NDI.

25. The base station of claim 22, wherein the second uplink transmission comprises a medium access control (MAC) protocol data unit (PDU) different from the first uplink transmission.

26. The base station of claim 22, wherein the receiving the first uplink transmission comprises receiving a medium access control (MAC) protocol data unit (PDU) corresponding to the uplink transmission.

27. The base station of claim 22, wherein the first DCI further indicates a hybrid automatic repeat request (HARQ) identifier, and wherein the instructions, when executed by the one or more processors, further cause the base station to:
send a third DCI that comprises a second NDI, wherein:
the value is the same as a value of the second NDI, and
the third DCI indicates the HARQ identifier.

28. The base station of claim 22, wherein the second group common DCI is addressed to a group of wireless devices.

29. One or more non-transitory computer-readable media storing instructions that, when executed, cause a wireless device to:
receive first downlink control information (DCI) that indicates:
an uplink radio resource; and
a new data indicator (NDI);
receive second group common DCI comprising a cancellation indication for an uplink transmission associated with the uplink radio resource;
cancel, based on the second group common DCI, the uplink transmission associated with the uplink radio resource; and
based on a comparison of the NDI to a value, transmit one of:
a first uplink transmission corresponding to the canceled uplink transmission, or
a second uplink transmission.

30. The one or more non-transitory computer-readable media of claim 29, wherein the first uplink transmission corresponding to the canceled uplink transmission is transmitted based on a result of the comparison of the NDI to the value indicating at least one of:
   the value and the NDI having a same value, or
   the value not being toggled compared to a value of the NDI.

31. The one or more non-transitory computer-readable media of claim 29, wherein the second uplink transmission is transmitted based on a result of the comparison of the NDI to the value indicating at least one of:
   the value and the NDI having a different value, or
   the value being toggled compared to a value of the NDI.

32. The one or more non-transitory computer-readable media of claim 29, wherein the second uplink transmission comprises a medium access control (MAC) protocol data unit (PDU) different from the first uplink transmission.

33. The one or more non-transitory computer-readable media of claim 29, wherein the instructions, when executed, cause the wireless device to transmit the first uplink transmission by retransmitting a medium access control (MAC) protocol data unit (PDU) corresponding to the canceled uplink transmission.

34. The one or more non-transitory computer-readable media of claim 29, wherein the first DCI further indicates a hybrid automatic repeat request (HARQ) identifier, and wherein the instructions, when executed, further cause the wireless device to:
   receive third DCI that comprises a second NDI, wherein:
      the value is the same as a value of the second NDI, and
      the third DCI indicates the HARQ identifier.

35. The one or more non-transitory computer-readable media of claim 29, wherein the second group common DCI is addressed to a group of wireless devices comprising the wireless devices.

36. One or more non-transitory computer-readable media storing instructions that, when executed, cause a base station to:
   send first downlink control information (DCI) that indicates:
      an uplink radio resource; and
      a new data indicator (NDI);
   send second group common DCI comprising a cancellation indication for an uplink transmission associated with the uplink radio resource;
   cancel reception of the uplink transmission associated with the uplink radio resource; and
   based on a comparison of the NDI to a value, receive one of:
      a first uplink transmission corresponding to the canceled reception of the uplink transmission, or
      a second uplink transmission.

37. The one or more non-transitory computer-readable media of claim 36, wherein the first uplink transmission corresponding to the canceled reception of the uplink transmission is received based on a result of the comparison of the NDI to the value indicating at least one of:
   the value and the NDI having a same value, or
   the value not being toggled compared to a value of the NDI.

38. The one or more non-transitory computer-readable media of claim 36, wherein the second uplink transmission is received based on a result of the comparison of the NDI to the value indicating at least one of:
   the value and the NDI having a different value, or
   the value being toggled compared to a value of the NDI.

39. The one or more non-transitory computer-readable media of claim 36, wherein the second uplink transmission comprises a medium access control (MAC) protocol data unit (PDU) different from the first uplink transmission.

40. The one or more non-transitory computer-readable media of claim 36, wherein the instructions, when executed, cause the base station to receive the first uplink transmission by receiving a medium access control (MAC) protocol data unit (PDU) corresponding to the uplink transmission.

41. The one or more non-transitory computer-readable media of claim 36, wherein the first DCI further indicates a hybrid automatic repeat request (HARQ) identifier, and wherein the instructions, when executed, further cause the base station to:
   send a third DCI that comprises a second NDI, wherein:
      the value is the same as a value of the second NDI, and
      the third DCI indicates the HARQ identifier.

42. The one or more non-transitory computer-readable media of claim 36, wherein the second group common DCI is addressed to a group of wireless devices.

43. A system comprising:
   a wireless device; and
   a base station configured to:
      send first downlink control information (DCI) that indicates:
         an uplink radio resource; and
         a new data indicator (NDI);
      send second group common DCI comprising a cancellation indication for an uplink transmission associated with the uplink radio resource,
   wherein the wireless device comprises:
      one or more processors; and
      memory storing instructions that, when executed by the one or more processors, cause the wireless device to:
         receive the first DCI;
         receive the second group common DCI;
         cancel, based on the second common DCI, the uplink transmission associated with the uplink radio resource; and
         based on a comparison of the NDI to a value, transmit one of:
            a first uplink transmission corresponding to the canceled uplink transmission, or
            a second uplink transmission.

44. The system of claim 43, wherein the first uplink transmission corresponding to the canceled uplink transmission is transmitted based on a result of the comparison of the NDI to the value indicating at least one of:
   the value and the NDI having a same value, or
   the value not being toggled compared to a value of the NDI.

45. The system of claim 43, wherein the second uplink transmission is transmitted based on a result of the comparison of the NDI to the value indicating at least one of:
   the value and the NDI having a different value, or
   the value being toggled compared to a value of the NDI.

46. The system of claim 43, wherein the second uplink transmission comprises a medium access control (MAC) protocol data unit (PDU) different from the first uplink transmission.

47. The system of claim 43, wherein the instructions, when executed by the one or more processors, cause the wireless device to transmit the first uplink transmission by retransmitting a medium access control (MAC) protocol data unit (PDU) corresponding to the canceled uplink transmission.

48. The system of claim 43, wherein the first DCI further indicates a hybrid automatic repeat request (HARQ) identifier, and wherein the instructions, when executed by the one or more processors, further cause the wireless device to:
receive third DCI that comprises a second NDI, wherein:
the value is the same as a value of the second NDI, and
the third DCI indicates the HARQ identifier.

49. The system of claim 43, wherein the on DCI is addressed to a group of wireless devices comprising the wire devices.

* * * * *